United States Patent
Göktepe et al.

(10) Patent No.: US 12,382,435 B2
(45) Date of Patent: *Aug. 5, 2025

(54) COMMUNICATION DEVICE, SYSTEM AND METHOD FOR COMMUNICATION USING FEEBACK

(71) Applicant: KONINKLIJKE PHILIPS N.V., Eindhoven (NL)

(72) Inventors: Baris Göktepe, Berlin (DE); Thomas Fehrenbach, Berlin (DE); Cornelius Hellge, Berlin (DE); Thomas Schierl, Berlin (DE); Robin Thomas, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,380

(22) Filed: May 20, 2024

(65) Prior Publication Data

US 2024/0381324 A1  Nov. 14, 2024

Related U.S. Application Data

(63) Continuation of application No. 18/125,159, filed on Mar. 23, 2023, now Pat. No. 12,004,127, which is a
(Continued)

(30) Foreign Application Priority Data

Jul. 13, 2017  (EP) ...................................... 17181315
Aug. 14, 2017  (EP) ...................................... 17186157

(51) Int. Cl.
 *H04W 4/06* (2009.01)
 *H04L 1/1812* (2023.01)
(Continued)

(52) U.S. Cl.
 CPC ........... *H04W 72/04* (2013.01); *H04L 1/1812* (2013.01); *H04L 5/0053* (2013.01); *H04W 4/06* (2013.01);
(Continued)

(58) Field of Classification Search
 CPC ... H04W 28/04; H04W 72/04; H04W 72/042; H04W 88/08; H04W 4/06;
(Continued)

(56) References Cited

U.S. PATENT DOCUMENTS

| 8,688,054 B2 | 4/2014 | Pietraski et al. |
| 10,075,972 B2 | 9/2018 | Chae et al. |

(Continued)

FOREIGN PATENT DOCUMENTS

| CN | 101867467 A | 10/2010 |
| CN | 102075313 A | 5/2011 |

(Continued)

OTHER PUBLICATIONS

Lenovo-Motorola Mobility, Sidelink feedback information, 3GPP Technical Document-R1-1707773, Hangzhou-P.R. China, May 2017.
(Continued)

*Primary Examiner* — Peter G Solinsky
*Assistant Examiner* — Sanjay K Dewan

(57) ABSTRACT

Communication devices are provided that facilitate receiving information units and providing feedback to other communication devices.

28 Claims, 24 Drawing Sheets

Related U.S. Application Data continuation of application No. 16/739,867, filed on Jan. 10, 2020, now Pat. No. 11,627,557, which is a continuation of application No. PCT/EP2018/068935, filed on Jul. 12, 2018.

(51) Int. Cl.
*H04L 5/00* (2006.01)
*H04L 12/18* (2006.01)
*H04W 72/04* (2023.01)
*H04W 72/044* (2023.01)

(52) U.S. Cl.
CPC ....... *H04W 72/0466* (2013.01); *H04L 12/189* (2013.01)

(58) Field of Classification Search
CPC ............. H04W 72/0466; H04L 5/0007; H04L 1/1812; H04L 5/0053; H04L 12/189
USPC ........................................................ 370/329
See application file for complete search history.

(56) References Cited

U.S. PATENT DOCUMENTS

| | | | |
|---|---|---|---|
| 11,323,207 B2 | 5/2022 | Kwak | |
| 11,323,209 B2 | 5/2022 | Ji | |
| 11,632,744 B2* | 4/2023 | Hosseini | H04L 1/1854 370/329 |
| 11,638,129 B2* | 4/2023 | Lee | H04L 5/0055 370/329 |
| 11,689,325 B2* | 6/2023 | Hosseini | H04L 5/001 370/329 |
| 11,716,786 B2* | 8/2023 | Lee | H04W 88/04 370/329 |
| 11,722,255 B2* | 8/2023 | Park | H04L 1/1812 370/329 |
| 2006/0114848 A1* | 6/2006 | Eberle | H04L 12/1868 370/312 |
| 2007/0248117 A1 | 10/2007 | Zuniga et al. | |
| 2008/0107054 A1 | 5/2008 | Parts | |
| 2008/0259891 A1 | 10/2008 | Dent | |
| 2009/0154392 A1 | 6/2009 | Park | |
| 2012/0020322 A1 | 1/2012 | Fan et al. | |
| 2012/0026935 A1 | 2/2012 | Park et al. | |
| 2012/0182914 A1 | 7/2012 | Harinharan et al. | |
| 2014/0112406 A1 | 4/2014 | Zhu et al. | |
| 2016/0066337 A1* | 3/2016 | Sartori | H04W 76/14 370/329 |
| 2016/0135143 A1 | 5/2016 | Won | |
| 2016/0330630 A1 | 11/2016 | Yoo et al. | |
| 2016/0359588 A1 | 12/2016 | Pawar et al. | |
| 2017/0346605 A1 | 11/2017 | Chendamarai | |
| 2017/0353946 A1 | 12/2017 | Rico Alvarino | |
| 2017/0372368 A1 | 12/2017 | Kwon | |
| 2018/0077518 A1 | 3/2018 | Nguyen | |
| 2018/0192441 A1 | 7/2018 | Yang et al. | |
| 2019/0090218 A1 | 3/2019 | Noh | |
| 2019/0150135 A1 | 5/2019 | Lee | |
| 2019/0239118 A1 | 8/2019 | Baghel | |
| 2019/0350045 A1* | 11/2019 | Lee | H04L 1/0003 |
| 2020/0107312 A1* | 4/2020 | Baghel | H04L 27/2601 |
| 2020/0120458 A1 | 4/2020 | Aldana | |
| 2020/0314953 A1* | 10/2020 | Lin | H04W 72/56 |
| 2020/0389257 A1* | 12/2020 | Kung | H04W 4/06 |
| 2021/0376963 A1 | 12/2021 | Liang | |
| 2023/0111372 A1* | 4/2023 | Liu | H04W 72/20 370/329 |
| 2023/0113672 A1* | 4/2023 | Wu | H04L 1/1861 370/329 |
| 2023/0115228 A1* | 4/2023 | Zhou | H04L 1/1861 370/329 |
| 2023/0198673 A1* | 6/2023 | Hahn | H04W 72/25 370/329 |

FOREIGN PATENT DOCUMENTS

| | | |
|---|---|---|
| CN | 102598572 A | 7/2012 |
| CN | 103493391 A | 1/2014 |
| EP | 2137863 A1 | 12/2009 |
| JP | 2008508818 | 3/2008 |
| JP | 2015518309 | 6/2015 |
| JP | 2015133646 A1 | 11/2015 |
| JP | 2016076301 | 5/2016 |
| JP | 2017079339 | 4/2017 |
| KR | 20080038551 | 5/2008 |
| KR | 20130113485 | 10/2013 |
| WO | 2008127164 A1 | 10/2008 |
| WO | 2011129611 A2 | 10/2011 |
| WO | 2014076552 A2 | 5/2014 |
| WO | 2016078905 A1 | 5/2016 |
| WO | 2017026973 A1 | 2/2017 |
| WO | 2007021122 A1 | 3/2017 |
| WO | 2017050996 A1 | 3/2017 |

OTHER PUBLICATIONS

Huawei, Sidelink link adaptation with feedback information for FeD2D, 3GPP Technical Document-R1-1707041, Hangzhou-P.R. China, May 2017.

ZTE, Discussion on FeD2D Feedback scheme, 3GPP Technical Document-R1-1707210, Hangzhou-P.R. China, May 2017.

Intel, Sidelink Feedback Information and Signalling for Wearable and IoT Use Cases, 3GPP Technical Document-R1-1707335, Hangzhou-P.R. China, May 2017.

LG Electronics, Discussion on feedback information on sidelink, 3GPP Technical Document-R1-1707586, Hangzhou-P.R. China, May 2017.

Sony, Discussion on sidelink adaptation and feedback information, 3GPP Technical Document-R1-1708265, Hangzhou-P.R. China, May 2017.

J. Schlienz and A. Roessler, Device to Device Communication in LTE, Whitepaper, Rohde-Schwarz, pp. 1-36 unknown.

RAN 1 Chairman's Notes, 3GPP TSG RAN WG1 RAN1#88bis. Spokane, USA Apr. 3-7, 2017.

E. Dahlman, S. Parkvall and J. Skold, "4G LTE-Advanced Pro and the Road to 5G", Elsevier, 3rd Edition, 2016.

3GPP, "Physical Layer Measurements", TS 36.214 v. 14.2.0, Apr. 2017.

3GPP, 3rd Generation Partnership Project Proximity-based services (ProSe); Stage 2; 3GPP TS 23.303, Release 12, V 12.0.0 Feb. 2014.

* cited by examiner

2900 option 1 - group multicast HARQ resource allocation

- indicates which resource to expect HARQ information and bit positions for each UE
- HARQ resource is pre-allocated after UE 2-5 has transmitted

COMMUNICATION DEVICE, SYSTEM AND METHOD FOR COMMUNICATION USING FEEBACK

CROSS-REFERENCES TO RELATED APPLICATIONS

This application is a continuation of a U.S. patent application Ser. No. 16/739,867 filed on Jan. 10, 2020, which is a continuation of International Application No. PCT/EP2018/068935, filed Jul. 12, 2018, which claims the benefit of EP Patent Application No. EP 17186157.8, filed on Aug. 14, 2017 and EP Patent Application No. EP 17181315.7, filed on Jul. 13, 2017. These applications are hereby incorporated by reference herein.

BACKGROUND OF THE INVENTION

The present invention relates to communication devices, for example to communication devices that facilitate communication over a broadcast based communication connection.

Communication between mobile devices in a communication system usually involves the mobile devices communicating via a base station (BS). Note, the term eNB is a general term for a base station (BS) of the communication network and is used in the LTE, LTE-A (4G) and LTE-A Pro (4.5G) context as well as future LTE-based standards. For 5G "New Radio" (NR) communication networks, the term gNB is used as synonym for a base station. Therefore, all terms BS, eNB and gNB may be used as synonyms throughout this description. Alternatively, the communication may also be performed between the mobile devices directly without involving the base station as a kind of relay. This kind of communication is also referred to as device-to-device, D2D, or Vehicle-to-everything, V2X, communication and may involve broadcast-based sidelink (SL) communications.

A mobile device is also referred to as user equipment (UE). This term can refer to all types of mobile devices with different computing capabilities including mobile phones, laptops, computers with modem cards/functionality, handhelds, tablets, Internet-of-Things (IoT) devices, low power devices, narrowband-IoT devices (NB1, NB2, etc.), communication devices mounted on UAVs (drones, planes, helicopters), or vehicles (e.g. cars, trucks, busses, trains, etc.). The sidelink can also allow asymmetric computing capabilities, where one device is a smart phone or laptop with high computing powers, and the other node is a low-power IoT device. This link can also support communications among vehicles. Furthermore, communication nodes may be classified according to their power class (in terms of transmit power) or in terms of power availability (such as battery power, fixed-power-plugs) and depending on power capabilities utilized the technology defined below.

Broadcast-based sidelink (SL) communication has been defined without any kind of feedback mechanism, like e.g. HARQ feedback or CQI, and in order to increase reliability in such a scenario, fixed (re) transmissions of data have been specified [1]. However, within the scope FeD2D and V2X, unicast communication between SL devices has been agreed upon in order to meet the stringent QoS and reliability constraints. Therefore, additional reliability enhancements may include feedback mechanisms to improve overall performance. According to the RAN1 #88bis [8] meeting, there is a desire that no additional channel will be specifically introduced for feedback.

It has been found that 'piggyback' strategies to convey this feedback information may be desirable.

The D2D based Proximity service (ProSe) communication, which was first standardized in Release 12 of the 3GPP standard included no feedback and hence no link adaptation mechanism due to the broadcast nature of the SL in this D2D scenario. Similarly, V2X communication has also been designed not to include feedback. In order to improve reliability, the system would instead consecutively blindly retransmit the broadcast transport blocks (TBs) in three consecutive subframes on the SL, with each retransmission having a different redundancy version based on a predefined pattern. In V2X communication, a UE blindly retransmit the TBs in 2 consecutive subframes on the SL. The first retransmission configuration (pattern) is indicated in the Sidelink Control Indicator (SCI) of the first retransmission enabling the receiving user equipment (UE) to demodulate the needed data from all retransmissions [1,7].

The concept of resource pools (RPs) in SL communication is defined as a set of physical resources available to enable D2D and V2X communications. These RPs can comprise of resource blocks and subframes. In the context of SL communication there are a few types of resource pools:
1) PSCCH subframe pool: A set of subframes for PSCCH transmission
2) PSCCH resource block pool: A set of resource blocks available for PSCCH transmission within a PSCCH subframe pool.
3) PSSCH subframe pool: Set of subframes for PSSCH transmissions.
4) PSSCH resource block pool: Set of available resource blocks for PSSCH transmissions within a PSSCH subframe pool.

FIG. 31 shows the general structure of the subframe and resource block pool 3100. It is shown that a part 3110 of the resource block pool is reserved for cellular services, and another part 3120 is reserved for the proximity service ProSe. In D2D Mode 1, a device's resource pools are already explicitly assigned by the eNB via a scheduling grant, while in Mode 2 (distributed scheduling) the device itself selects the set of PSCCH/PSSCH resources from a subset of resource pools defined in Mode 1. Mode 1 is only for in-coverage UEs in the RRC Connected state, while Mode 2 can be both in the in RRC Idle and RRC Connected state. The Time Repetition Pattern (TRP) is an indication for the subframes that can be used for PSSCH transmission. The same UE cannot simultaneously utilize the given subcarrier/subframe for both cellular communications and SL communications. In V2X, mode 3 configuration involves the scheduling and interference management of resources by the base station (BS/eNB/gNB) for vehicular UEs within the coverage of the said BS to enable sidelink (SL) (vehicle-to-vehicle (V2V)) communications. The control signaling is provided to the UE over the Uu interface (via downlink control indicator (DCI)) and dynamically assigned by the base station. Mode 4 configuration for SL communications is autonomously performed using distributed (de-centralized) algorithms among UEs based on a pre-configured resource configuration.

TRP's provides an indication of which resources (subframes) are reserved for SL transmission/reception and does not take into account if these resources are actually in use. In V2X, the channel busy ratio (CBR) determines the load of the wireless channel (serves as a loading metric). A UE can adapt its transmission parameters for each resource pool based on the CBR and can thus control the channel utilization. The channel occupancy ratio (CR) measurement reports the percentage of measurement samples that the RSSI is above a pre-defined threshold, which would indicate occupancy of the particular channel. As it currently stands, the channel occupancy ratio is calculated after each (re)-transmission [10].

Retransmission schemes (ACK/NACK) have been proposed in unicast D2D and V2X devices for the in-coverage and the out-of-coverage mode. It has been agreed that there will be no dedicated HARQ feedback channel [3]. It has been suggested that basic HARQ feedback be transmitted on the control channel (SCI) of the SL [1,2,4] or part of the scheduling assignment (in autonomous mode) [2]. It has also been proposed that the feedback be transmitted by puncturing a portion of the PUSCH resource elements and uplink control indicator (UCI) (when in eNB scheduled mode) [5].

Aspects mentioned above may optionally be combined with the aspects and embodiments of the invention mentioned in the following. Also, definitions mentioned above may optionally be taken over in the aspects and embodiments of the invention.

In view of the above, there is a desire to create communication concept which provides for an improved tradeoff between reliability, resource usage and complexity.

SUMMARY

An embodiment may have a communication device, wherein the communication device is configured to receive one or more information units from a plurality of other communication devices, wherein the communication device is configured to receive a resource allocation message from a managing communication device, wherein the resource allocation message defines an allocation of bit positions associated with an acknowledgement of information units received from the plurality of other communication devices in a combined acknowledgement information unit; and wherein the communication device is configured to transmit a combined acknowledgement information unit in response to a reception of information units from a plurality of other communication devices using the allocation of bit positions defined in the resource allocation message.

According to another embodiment, a method for communication may have the steps of: receiving, at a communication device, one or more information units from a plurality of other communication devices, receiving a resource allocation message from a managing communication device, wherein the resource allocation message defines an allocation of bit positions associated with an acknowledgement of information units received from the plurality of other communication devices in a combined acknowledgement information unit; and transmitting a combined acknowledgement information unit in response to a reception of information units from a plurality of other communication using the allocation of bit positions defined in the resource allocation message.

Another embodiment may have a non-transitory digital storage medium having a computer program stored thereon to perform the method for communication, wherein the method has the steps of: receiving, at a communication device, one or more information units from a plurality of other communication devices, receiving a resource allocation message from a managing communication device, wherein the resource allocation message defines an allocation of bit positions associated with an acknowledgement of information units received from the plurality of other communication devices in a combined acknowledgement information unit; and transmitting a combined acknowledgement information unit in response to a reception of information units from a plurality of other communication using the allocation of bit positions defined in the resource allocation message, when said computer program is run by a computer.

According to an embodiment, there is provided a communication device, e.g. a so-called receiving communication device, that receives one or more information units from a second communication device, wherein the communication device amends a check value associated with the information unit transmitted by the communication device in dependence on whether an information unit received from the second communication device has been properly received by the communication device or not, to thereby provide a signaling whether the information unit received from the second communication device has been properly received or not. For example, the communication device may be a mobile communication device such as a user equipment, UE. In examples, the information units may be data blocks or data packets and/or control blocks or control packets. These information units may have been sent via a direct link, but it is also possible that the information units have been sent via a sidelink. In examples, the check value may be a cyclic redundancy check, CRC, value, but also any other kind of check values may be used like a longitudinal parity check value, Fletcher's checksum value or the like. The check value may be associated with control information in a PSCCH or with data in a PSSCH. The information unit transmitted by the communication device may be transmitted to a base station, gNB, or to another user equipment.

This embodiment according to the invention is based on the finding that it is advantageous to signal whether an information unit has been properly received from another (second) communication device by selectively amending a check value of a subsequent transmission, because this allows for providing an acknowledgement/non-acknowledgement feedback without requiring a dedicated resource for the signaling (i.e. for the provision of the acknowledgement/non-acknowledgement information). Moreover, it has been found that "modulating" (amending) the check value in dependence on the fact whether a proper reception of an information unit should be signaled or not does not significantly degrade the usability of the check value for a detection of an error in an information to which the check value is associated. For example, a number of possible states or possible values of the check value may be significantly larger (for example, at least by a factor of 10) than the number of states of the acknowledgement information (for example, 2 states for a simple acknowledgement or 4 states for a joint acknowledgement of two data units), such that the amendment of the check value does not substantially degrade the usability of the check value for error detection. Moreover, the amendment of the check value may be computationally simple (for example, using a reversible arithmetic or logical operation), such that another communication device receiving the amended check value can easily detect whether the check value has been amended (to thereby conclude whether an acknowledgement or a non-acknowledgement is to be signaled) and/or what the original (non-amended) check value has been (to thereby effectively use the amended check value for a detection of a bit error).

To conclude, it has been found that a signaling whether the information unit received from the second communication device has been properly received or not can be "piggybacked" on a check value computed using a (typically multi-bit) conventional check value computed using a conventional check value computation algorithm (like a CRC algorithm), thereby allowing to transmit the signaling without extra bitrate demand while not significantly compromising the usability of the check value and while keeping complexity reasonably small.

In a further embodiment, the check value allows for a detection of one or more bit errors within the information unit to which the check value is associated. For example, the check value may allow detecting bit errors up to a predetermined number of bit errors, and optionally may also allow for a correction of these bit errors.

In a further embodiment, the check value is a cyclic redundancy check value.

In a yet further embodiment, the communication device computes the check value on the basis of the information unit to be transmitted using a predetermined computation rule to obtain a computed check value, wherein the communication device selects a reversible modification rule out of a plurality of reversible modification rules in dependence on whether one or more information units received from the second communication device have been properly received by the communication device or not, wherein the communication device applies the selected reversible modification rule to the computed check value in order to obtain the amended check value. For example, the reversible modification rule may be an XOR mask value out of a plurality of XOR mask values. In a general, illustrative case, there may be two states to be signaled, acknowledgement (ACK) or non-acknowledgement (NACK). However, in examples, there may be more states, e.g., two code blocks or two code block groups or two HARQ processes. In an example, if the reception of two information units is to be acknowledged by UE1, a first reversible modification rule, or a first XOR mask value, may be chosen if both information units have been properly received, a second reversible modification rule, or a second XOR mask value, may be chosen if a first information unit has been properly received and a second information unit has not been properly received, a third reversible modification rule or a third XOR mask value may be chosen if the first information unit has not been properly received and the second information unit has been properly received, and a fourth reversible modification rule or a fourth XOR mask value may be chosen if both the first and second information units have not been properly received. Additionally, one of the reversible modification rules may leave the check value unchanged what may be equivalent to an XOR with a word/bit-pattern containing only '0' values.

In a further embodiment, the communication device computes the check value on the basis of the information to be transmitted using a predetermined computation rule to obtain a computed check value, wherein the communication device selectively applies a reversible modification to the computed check value in dependence of whether the information unit received from the second communication device has been properly received by the communication device or not, in order to obtain the amended check value, or wherein the communication device selectively applies a first reversible modification or a second reversible modification to the computed check value independent of whether the information unit received from the second communication device has been properly received by the communication device or not, in order to obtain the amended check value. For example, the predetermined computation rule may be a generator polynomial. Also in examples, the reversible modification may refer to an XOR operation with a predetermined value, for example, the first reversible modification may be an XOR operation with a first predetermined value in the case a packet received from the second communication device has been properly received, or the second reversible modification may be an XOR operation with a second predetermined value in the case a packet received from the second communication device has not been properly received. In a general case, there may be two states, ACK/NACK, however, some embodiments may allow for more states, e.g., two code blocks or two code block groups or two HARQ processes, these more than two states may be signaled using more than two reversible modification operations.

In a further embodiment, the communication device may communicate with a base station and also communicates directly with the second communication device. For example, the base station may be a gNB or an eNB. The base station may be configured to perform a centralized resource allocation. In examples where the communication device directly communicates with the second communication device, the communication is performed without an involvement of the base station. The second communication device may be different from the base station. In examples, this direct communication may be performed using a sidelink communication. This sidelink communication may be, for example, performed by transmitting without a grant, namely grant-free access, using an autonomous scheduling scheme.

In a further embodiment, the communication device receives one or more information units from the second device via a sidelink which does not involve a base station. For example, the base station may be a gNB, and/or the receiving may be performed by transmitting without a grant using an autonomous scheduling scheme.

In a further embodiment, the communication device amends a check value associated with a control information unit transmitted by the communication device via a control channel in dependence of whether the information unit received from the second communication device has been properly received by the communication device or not to thereby provide a signaling whether the information unit received from the second communication device has been properly received or not, or the communication device amends the check value associated with a data unit transmitted by the communication device via a data channel in dependence of whether the information unit received from the second communication device has been properly received or not, to thereby provide a signaling whether the packet received from the second communication device has been properly received or not, or wherein the communication device amends a check value associated with a control information unit transmitted by the communication device via a control channel and amends a check value associated with a data unit transmitted by the communication device via a data channel in dependence of whether the information unit received from the second communication device has been properly received by the communication device or not to thereby provide a signaling whether the information unit received from the second communication device has been properly received or not. As an example, the check value may be a CRC value or another check value mentioned before. The control information unit may be control information in a Physical Sidelink Control Channel, PSCCH. In examples, the control information unit may have been transmitted to a base station (BS) or to the second user equipment. In examples, the data unit may be data sent in a Physical Sidelink Shared Channel, PSSCH, and may have been transmitted to a base station (BS) or to the second user equipment.

In a further embodiment, the communication device transmits the information unit, the check value of which is amended in order to provide a signaling whether the information unit received from the second communication device has been properly received or not, to the second communication device only via the sidelink which does not involve a base station, or the communication device transmits the information unit, the check value of which is amended in order to provide a signaling whether the information unit received from the second communication device has been properly received or not to a base station only, or the communication device transmits the information unit, the check value of which is amended in order to provide a signaling whether the information unit received from the second communication device has been properly received or not, to the second communication device via a sidelink, which does not involve a base station, and also transmits another information unit, the check value of which is amended in order to provide a signaling whether the information unit received from the second communication device has been properly received or not, to a base station. For example, the information unit may be transmitted to the base station using an uplink channel.

In an embodiment, the communication device decides whether to transmit the information unit, the check value of which is amended in order to provide a signaling whether the information unit received from the second communication device has been properly received or not, to the second communication device via a sidelink, or whether to transmit said information unit to a base station in dependence on an information describing whether a resource is allocated to the communication device for a direct transmission to the second communication device via a sidelink which does not involve the base station.

In an embodiment, the communication device computes the check value on the basis of the information unit to be transmitted using a cyclic redundancy check computation rule to obtain a computed check value, and selectively applies an XOR operation with a predetermined value to the computed check value in dependence of whether the information unit received from the second communication device has been properly received or not, in order to obtain the amended check value, or selectively applies a first XOR operation with a first predetermined value to the computed check value in case the information unit received from the second communication device has been properly received and selectively applies a second XOR operation with a second predetermined value, which is different from the first predetermined value, to the computed check value in case the information unit received from the second communication device has not been properly received, in order to obtain the amended check value. For example, the cyclic redundancy check computation rule may be obtained using a generator polynomial.

According to another embodiment, a communication device, e.g. a so-called sending communication device, is provided that transmits one or more information units to another communication device and receives one or more information units having associated one or more check values and derives information indicating whether the one or more information units transmitted by the communication device have been properly received by another communication device or not, in dependence on the one or more check values. For example, the communication devices may be user equipments. Also, the information units may be data blocks or packets and/or control blocks or packets. The communication device may communicate with another (i.e. the another) communication device directly via a sidelink without involving the base station, but it is also possible that the communication device communicates to the base station. In examples, the check values may be multibit binary values, e.g. CRC values.

This embodiment according to the invention is also based on the finding that it is advantageous to signal an ACK/NACK condition, which signals whether an information unit sent by a sending communication device has been properly received by the receiving communication device, using an amended or modified check value of a following transmission, because this may help making the communication process more reliable by providing the mentioned feedback information, and also may save bandwidth because the ACK/NACK information may be piggybacked on the check value part of the following transmission, thereby not increasing the overhead, but double-use the overhead for its original purpose, namely error detection or correction, and for the purpose of providing feedback. By using a reversible operation that facilitates the signaling, the check value can still be used with no or no substantial limitation.

In a further embodiment, the check value may allow for a detection of one or more bit errors within the information unit to which the respective check value is associated. For example, the check value may allow for the detection to at least a predetermined number of bit errors, and may also, optionally, allow for a correction of bit errors.

In a further embodiment, the check values are cyclic redundancy check, CRC, values.

In another embodiment, the communication device determines whether the one or more check values correspond with respective information units according to one out of the plurality of different predetermined derivation rules or according to one out of a total or four predetermined derivation rules or do not correspond with the respective information units and the communication device derives the information indicating the one or more information units transmitted by the communication device have been properly received by the another communication device or not from a result of said determination. For example, the different predetermined derivation rules may comprise two predetermined derivation rules if, for example, a single ACK/NACK is to be signaled or may comprise for determined derivation rules, for example if two ACKs/NACKs are to be signaled. For example, it may be determined that the check values do not correspond with the respective information units according to any of the predetermined derivation rules, or even according to one out of a total of more than four predetermined derivation rules. In general, a feedback information that comprises more than two states can, for example, be piggybacked using the check value, if more than two different predetermined derivation rules are considered, e.g., more than two different values with which the CRC value is XOR-ed.

In another embodiment, the communication device determines whether the one or more check values correspond with respective information units according to a first predetermined derivation rule or according to a second predetermined derivation rule or do not correspond with the respective information units, and the communication device derives the information indicating whether the one or more information units transmitted by the communication device have been properly received by the another communication device or not from a result of said determination. For example, the derivation rule may be a rule for deriving a CRC at another (i.e. the another) communication device in case that a NACK condition is to be signaled. The second predetermined derivation rule may be a rule for deriving a CRC at another communication device in the case that an ACK condition is to be signaled. It may be determined that the one or more check values do not correspond with the respective information units according to any of the predetermined derivation rules.

In a further embodiment, the communication device performs a retransmission of the one or more transmitted information units in response to finding out that the one or more check values do not correspond with the respective information units according to a predetermined derivation rule associated with a proper reception.

In another embodiment, the communication device performs a retransmission with an increased robustness when compared to a previous transmission if the one or more check values do not correspond with the respective information units according to any of the predetermined derivation rules. For example, the retransmission may be performed with a lower MCS, with higher power or with a repetition coding. It may be determined that the one or more check values do not correspond with the respective information units according to neither the derivation rules corresponding to the signaling of an ACK nor with derivation rule corresponding with the signaling of a NACK. In different words, if a data packet cannot be correctly corrected, i.e. no CRC mask is matching, a more robust retransmission is sent, e.g., with a lower MCS, higher power or repetition coding.

In a further embodiment, the communication device retransmits the one or more information units transmitted to another (i.e. the another) communication device in response to finding that the one or more check values correspond with respective information units according the first predetermined derivation rule. For example, the information units may be data blocks or packets and/or control blocks or packets. The predetermined derivation rule may be a rule for deriving a check value, for example, it may be a rule deriving a CRC at the site of another communication device in case that a NACK condition is to be signaled.

In another embodiment, the communication device receives the one or more information units from which the information indicating whether the one or more information units transmitted by the communication device has been properly received by the another communication device or not is derived from the another communication device to which the communication device has transmitted the one or more data units to be acknowledged, wherein the communication device receives the one or more information units from which the information indicating whether the one or more information units transmitted by the communication device have been properly received by the another communication device or not from a base station. For example, the communication device may transmit the one or more data units via a sidelink without involving a base station. The base station may be e.g. a gNB, and the base station may be adapted to coordinate a resource allocation to the communication devices, and possibly to other communication devices.

In another embodiment, the communication device derives the information indicating whether the one or more information units transmitted by the communication device have been properly received by the another communication device or not in dependence on the one or more check values associated with the one or more data information units, and wherein the communication device derives the information indicating whether the one or more information units transmitted by the communication device have been properly received by the another communication device in dependence on the one or more check values associated with the one or more control information units, or wherein the communication device derives the information indicating whether the one or more information units transmitted by the communication device have been properly received by the another communication device or not in dependence on one or more check values associated with one or more data information units and in dependence on one or more check values associate with one or more control information units.

In a further embodiment, the communication device computes a check value on the basis of a given one of the one or more information units using a cyclic redundancy check computation rule to obtain a computed check value and wherein the communication device compares the computed check value with a received check value associated with the given one of the one or more information units and checks whether the computed check value is identical with the received check value associated with the given one of the one or more information units except for an XOR combination with a predetermined value, and wherein the communication device recognizes a proper reception by the another communication device in dependence on whether the computed check value is identical with the received the check value or whether the computed check value is identical with the received check value associated with the given one of the one or more information units except for an XOR combination with a predetermined value. For example, using a cyclic redundancy check computation rule may comprise using a generator polynomial. The communication device may compare the computed check value with a received check value by checking for identity. The XOR combination may comprise the computed check value or the received check value. The communication device may recognize a proper reception of the one or more information units transmitted by the communication device.

In an embodiment, the communication device recognizes a reception error if the computed check value is different from the received check value and if the computed check value differs from the received check value associated with a given one of the one or more information units by more than an XOR combination with the predetermined value. For example, the reception error may refer to an error in the reception of an information unit by the communication device itself. The reception error may be recognized if the computed check value is different from the received check value and if the computed check value differs from the received check value also by more than XOR combinations.

In an embodiment, the communication device computes a check value on the basis of a given one of the one or more information units using cyclic redundancy check computation rule to obtain a computed check value, and the communication device checks whether the computed check value is identical with received check value associated with a given one of the one or more information units except for an XOR combination with a first predetermined value, and checks whether the computed check value is identical with the received check value associated with the given one of the one or more information units except for an XOR combination with a second predetermined value, and the communication device recognizes a proper reception by the another communication device independence on whether the computed check value is identical with the received check value associated with the given one of the one or more information units except for the XOR combination with the first predetermined value or whether the computed check value is identical with the received check value associated with the given one of the one or more information units except for the XOR combination with the second predetermined value. For example, using a cyclic redundancy check computation rule may comprise using a generator polynomial. The XOR combination may refer to the computed check value or the received check value. The proper reception may be recognized by the one or more information units transmitted by the communication device.

In a further embodiment, the communication device recognizes a reception error if the computed check value differs from the received check value associated with the given one of the one or more information units by more than the XOR combination with the first predetermined value and if the computed check value differs from the received check value associated with the given one of the one or more information units by a more than the XOR combination with the second predetermined value. For example, the reception error may be recognized in the reception of the information unit by the communication device itself. The XOR combination may be with the computed check value or received check value. The reception error may be recognized if the computed check value differs by more than the XOR combination with the first predetermined value and by the XOR combination with the second predetermined value.

According to another embodiment, a communication device is provided that receives one or more information units having associated one or more check values from a first communication device, and determines whether the one or more check values correspond with a respective information unit according a first predetermined derivation rule or according to a second predetermined derivation rule or do not correspond with the respective information unit, and initiates a retransmission of an information unit to the first communication device in dependence on the determination. For example, the communication device may be a network node, a base station or a gNB. The first and second communication devices may be mobile communication devices, for example a first and a second user equipment, UE. The first predetermined derivation rule may be a rule for deriving a CRC at the side of the first communication device in the case that a NACK condition is to be signaled, the second predetermined derivation rule may be a rule for deriving a CRC at the side of the first communication device in case that an ACK condition is to be signaled. The communication device may selectively initiate a retransmission. The determination may comprise a determination whether the one or more check values correspond with a respective information unit according to a first predetermined derivation rule or according to a second predetermined derivation rule or do not correspond with the respective information unit.

This embodiment according to the invention is also based on the finding that it is advantageous to provide a signaling of a ACK/NACK information as to whether a received information unit has been properly received by a receiving communication device or not by using an alteration/modification of a check value of another information unit that is sent after the received information unit has been received, because such signaling may increase reliability and effectivity of the whole communication while the needed bandwidth is not increased as the overhead, in this case the check value, is not increased. Rather, the check value is double-used by piggybacking this information onto the check value using a reversible operation. This embodiment provides the advantage that the feedback is not sent using a direct link between the sending communication device and the receiving communication device, but is relayed via a base station, what may help saving the bandwidth of the sidelink communication channel, and it is not necessary that the receiving communication device has to wait until it has an information unit to send to the sending communication device to be able to piggyback the feedback information onto this information unit, rather an information unit for a different communication device can be used for piggybacking and the base station can extract the respective feedback information from it, thereby no additional bandwidth usage occurs.

In an embodiment, the communication device amends a check value associated with an information unit transmitted by the communication device in dependence on the determination. For example, the check value may be a CRC value, but any other check value may be used. The information unit may be control information in a PSCCH or data in a PSSCH. The information unit may be transmitted to the second communication device, which may be for example a second user equipment (UE). The determination may comprise as to whether the one more check values correspond with a respective information unit according to a first predetermined derivation rule or according to a second predetermined derivation rule or do not correspond with the respective information unit, this may be used to selectively initiate the retransmission.

In a further embodiment, the communication device schedules an allocation of resources to multiple communication devices, wherein the communication device allocates a communication resource for the retransmission in dependence on the determination. For example, the determination comprises whether the one or more check values correspond with respective information units according a first predetermined derivation rule or according to a second predetermined derivation rule or do not correspond with the respective information unit, this may be used to selectively initiate the retransmission.

In a further embodiment, the check value may allow for a detection of bit errors within the information unit to which the check value is associated. For example, the check value allows for a detection of bit errors at least up to a predetermined number of bit errors, and may optionally allow for the correction of bit errors, in order to improve the communication.

In an embodiment, the check value is cyclic redundancy check value, CRC.

In an embodiment, the communication device computes the check value associated with an information unit transmitted by the communication device on the basis of the information unit using a predetermined computation rule to obtain a computed check value, the communication device selectively applies a reversible modification to the computed check value in dependence on the determination to thereby obtain an amended check value for transmission or the communication device is configured to selectively apply a first reversible modification or a second reversible modification to the computed check value in dependence on the determination to thereby obtain an amended check value for transmission. For example, the information unit may be control information in a PSCCH or data in a PSSCH. The predetermined computation rule may be a generator polynomial. The reversible modification may comprise an XOR operation with a predetermined value. The determination may comprise a determination whether the one or more received check values correspond with a respective receive information unit according to a first predetermined derivation rule or according to a second predetermined derivation rule or whether they do not correspond with the respective information unit. The first and second reversible modifications may comprise XOR operations with first and second predetermined values respectively in the case a packet received from the second communication device has been properly received or has not been properly received, respectively. The determination may comprise a determination whether the one or more received check values correspond with a respective receive information unit according to a first predetermined derivation rule or according to a second predetermined derivation rule or do not correspond with respective information unit.

In an embodiment, the communication device cooperates with a sending communication device (for example, as discussed above) and with a receiving communication device (for example, as discussed above).

According to another embodiment, a system is provided that comprises a communication device that serves as a base station, a communication device that serves as a data sender communication device and a communication device that serves as data receiver communication device, wherein the data sender communication device transmits one or more information units directly to the data receiver communication device via a sidelink and the data receiver communication device piggybacks an acknowledgement information signaling whether an information unit has been properly received from the data sender communication device or not in a check value information.

This embodiment according to the invention is also based on the finding that it is advantageous to signal an ACK/NACK condition using an amended or modified checksum of a following transmission, thereby making the communication process more reliable without increasing complexity or the need for additional bandwidth.

According to another further embodiment, there is provided a method for communication comprising receiving, at a communication device, one or more information units from a second communication device, and amended a check value associated with an information unit transmitted by the communication device in dependence on whether the information unit received from a second communication device has been properly received by the communication device or not, to thereby provide a signaling whether the information unit received from the second communication device has been properly received or not. For example, the information units may refer to data blocks or packets and/or control blocks or packets or any other suitable units used to convey information. The information units may be received from the second communication device, which may be a user equipment, via a direct link, but it is also possible to receive the information units via a base station. The information unit transmitted by the communication device may be control information in a PSCCH or data in a PSSCH, and may be transmitted by the communication device to a base station, e.g., a gNB, or to the second communication device.

This method is based on the same considerations as the corresponding communication device.

According to another embodiment, a method is provided that comprises transmitting, by a communication device, one or more information units to another communication device, receiving, at the communication device, one or more information units having associated one or more check values, and deriving an information indicating whether the one or more information units transmitted by the communication device have been properly received by the another communication device or not in dependence on the one or more check values. For example, the information units may be data blocks or data packets and/or control blocks or control packets. The transmitting may be performed directly via a sidelink without involving a base station, to which the communication device could also communicate. The check values may be multibit binary values, e.g., CRC values.

This method is based on the same considerations as the corresponding communication device.

According to another embodiment, a method for communication is provided that comprises receiving, at a communication device, one or more information units having associated one or more check values from a first communication device and determining whether the one or more check values correspond with the respective information unit according to a first predetermined derivation rule or according to a second predetermined derivation rule or do not correspond with the respective information unit, and initiating a retransmission of an information unit to the first communication device in dependence on the determination. For example, the communication devices may be mobile communication devices, e.g., user equipment. The step of determining may be performed at the communication device, and the first predetermined derivation rule may be a rule for deriving a CRC at the site of the first communication device in case a NACK condition is to be signaled, the second predetermined derivation rule may be a rule for deriving a CRC at the site of the first communication device in the case that an ACK condition is to be signaled. The determination may comprise determining whether the one or more check values correspond with a respective information unit according to a first predetermined derivation rule or according to the second predetermined derivation rule or do not correspond with the respective information unit.

This method is based on the same considerations as the corresponding communication device.

The above-mentioned methods are optionally be supplemented by one of the features and functionalities described herein with respect to the corresponding communication devices.

In a further embodiment, a computer program is provided for performing one of the aforementioned methods.

In accordance with a further embodiment, a communication device, e.g. a so-called receiving communication device, is provided which is receiving one or more information units from a second communication device, and which transmits a feedback information in a wireless resource unit which is reserved for a transmission of a different communication device but which is not used or only partly used by the different communication device. For example, the information units may be data blocks or packets and/or control blocks or packets. The communication devices may be mobile communication devices, e.g., user equipment. The communication device may receive the information units from the second communication device via a direct link, e.g., using a sidelink. The feedback information may comprise an acknowledgement information and/or a channel quality indicator, CQI, information and/or a rank indicator, RI, information indicating, e.g., in a MIMO device or system, how many spatial layers to transmit, the RI may be used for devices for multiple antennas for sidelink transmission. Further, the feedback information may be a precoding matrix indicator, PMI, information and/or channel state information, CSI. The wireless resource unit may refer to a resource block pool which is reserved, i.e., allocated or scheduled for example by a base station making the resource allocation, for the transmission to a different communication device, this different communication device may be one of a plurality of communication devices like a second, third, fourth or fifth user equipment. The reserved wireless resource unit may be unused or only partly used, i.e., not completely used, in general, which means at least partly unused.

This embodiment according to the invention is based on the finding that it is advantageous to signal a feedback information by using an, at least partly, unused part of a resource unit that is not reserved for the receiving communication device but for a different communication device, because this allows for the provision of feedback without requiring that an own resource is dedicated for such feedback, thereby helping to save bandwidth and resources while helping to increase reliability. Moreover, it has been found that using such a resource that is reserved for a different communication device but not used by the different communication device for the signaling of feedback information does not affect the usability or availability of the resource for the communication device for which the resource is reserved because the feedback is inserted only into unused resources, e.g. into parts of the bandwidth that are 'empty', i.e. not carrying a payload, anyway. By this technique, a double-use of a resource unit that is reserved for a different communication device is provided without having to increase complexity of the resource unit or without having to reserve or allocate a resource for the communication device that wished to transmit feedback information. In particular, the fact that resources are allocated to devices in a "precautionary" manner, without having certainty that the devices will actually use the resources, can be exploited. In case the different communication device has a resource demand, it will typically not be affected, but in case it does not actually use a precautionary allocated wireless resource, this wireless resource will nevertheless be used for the feedback (by another device, other than the device for which the wireless resource is reserved).

In an embodiment, the communication device transmits, as the feedback information, an acknowledgment information indicating whether the one or more information units received from the second communication device have been properly received or not.

In another embodiment, the communication device transmits, as the feedback information, a channel quality indicator, CQI, information describing a channel quality, which may be in the form of a scalar channel value, the communication device transmitting, as the feedback information, a rank indicator, RI, information describing a transmission rank to use or a number of spatial layers to use by the transmitter to transmit data, and/or the communication device transmits, as the feedback information, a precoding matrix indicator, PMI, information describing which precoding matrix would be used for transmission towards the communication device, and/or the communication device transmits, as feedback information, a channel state information, CSI, describing a state of a channel, for example for multiple antennas, this information may be transmitted in the form of a set of a plurality of channel coefficients.

In another embodiment, the communication device identifies a wireless resource unit which is reserved for a transmission of a different communication device and which is at least partly unused for the transmission of the feedback information. Reserved, may, for example, refer to allocated or scheduled, for example by a base station making the resource allocation. The identifying may be performed, for example, by detecting whether the resource unit is used or by sensing occupancy of the resourced unit.

In an embodiment, the communication device monitors a transmission activity in a wireless resource unit which is reserved for a transmission of the different communication device, and wherein the communication device is configured to identify the monitored wireless resource unit for the transmission of the feedback information if it is found that the wireless transmission unit is at least partially unused. The monitoring may be performed by listening to a transmission activity, e.g., utilizing listen-before-talk (LBT) or CSMA/CA techniques. The wireless resource unit may be a physical wireless resource unit reserve, e.g., allocated or scheduled for example, by a base station making the resource allocation.

In a further embodiment, the communication device determines whether a portion of the wireless resource unit, the wireless resource unit being reserved for a transmission of a different communication device, is unused and using a subsequent portion of said wireless resource unit for the transmission of the feedback information. The portion of the wireless resource unit may refer to a first part of a subframe or shortened transmission time interval (STTI) consisting of a few symbols, and reserve may refer to allocated or schedule, for example, by a base station making the resource allocation. The subsequent portion may refer to a portion immediately following the portion which has been identified as unused, for example, a second part of the subframe.

In another embodiment, the communication device monitors a plurality of wireless resource units which are reserved for a transmission of one or more different communication devices in order to identify a wireless resource unit which is at least partially unused for the transmission of the feedback information. The wireless resource unit which is at least partially unused may even be completely unused.

In a further embodiment, a communication device receives a resource allocation information from a managing communication device, this may be a base station, e.g., a gNB, wherein the resource allocation information describes an allocation of wireless communication resources, for example, of wireless resource units to different communication devices, which may be, in examples, a reservation of wireless communication resources, and indicates which wireless communication resources are useable for transmission of feedback information by communication devices other than the communication devices to which the respective wireless communication resources are allocated. For example, it may be indicated which wireless communication resources are usable in the case that the communication device to which the wireless communication resource is allocated to does not make use, or does not make full use, of the wireless communication resource.

In another embodiment, the communication device is configured to use the received resource allocation information for deciding which wireless resource unit to use for the transmission of the feedback information. For example, the communication device may be configured to transmit given the resource allocation information from the feedback transmitting communication device, which may be a user equipment. In examples, the space to transmit feedback may be limited, in order to save bandwidth, for example, to wireless resource units indicated in a resource allocation information.

In an embodiment, the communication device selectively monitors a transmission activity in wireless resource units, which may be physical wireless resource units, which are reserved for a transmission of a different communication device in the received resource allocation information and which are marked to be usable for transmission of feedback information in the received resource allocation information, to identify an at least partially unused wireless resource unit for the transmission of the feedback information. For example, the reserved wireless resource units may be allocated or schedule, for example by a base station making resource allocation.

According to another embodiment, a communication device, e.g. a so-called sending communication device, is provided that transmits one or more information units to another communication device, e.g. a so-called receiving communication device, and monitors a resource unit, which is not allocated to the another communication device, but reserved for a transmission of a communication device which is different from the another communication device for a feedback information from the another communication device. For example, the information units may be data blocks or packets and/or control blocks or packets, and the communication devices may be mobile communication devices such as user equipment. The communication device may transmit to another (i.e. the another) communication device directly via a sidelink without involving a base station to which the communication device could also communicate. In examples, the resource unit may be a wireless resource unit, and/or the resource unit may be reserved for a transmission of the communication device or any of further communication devices, which also may be user equipment.

This embodiment according to the invention is also based on the finding that it is advantageous to provide feedback information to a receiving communication device that has received an information unit(s) sent by the sending communication device by using an, at least in part, unused part of a resource unit which is not reserved for the receiving communication device but for a different communication device, because this allows for the provision of feedback without requiring that a resource is dedicated for such feedback what may help saving bandwidth and resources while increasing reliability. Moreover, it has been found that using such a resource that is reserved for a different communication device but not used by the different communication device for the signaling of feedback information does not affect the usability or availability of the resource for its original purpose. Moreover, it has been found that such a double-usage of the resource may maintain the size of the reserved bandwidth or may even increase the ratio between the amount of data transmitted and the reserved bandwidth.

Moreover, the same considerations mentioned above for the corresponding receiving communication device also apply.

In a further embodiment, the communication device monitors a resource unit, which is not allocated to another (i.e. the another) communication device, but is reserved for a transmission of a communication device which is different from the another communication device for an acknowledgment information signaling whether the one or more information units transmitted by the another communication device have been properly received by the another communication device. For example, the resource unit may be reserved for transmission of the communication device or of any other communication devices. In examples, said acknowledgement information constitutes the signaling information or is a part of the feedback information.

In a further embodiment, the communication device receives, as the feedback information, a channel quality indicator, CQI, information describing a channel quality, which may, in an example, be in the form of a scalar channel value, and/or wherein the communication device receives, as the feedback information, a rank indicator, RI, information describing the transmission rank to use or the number of spatial layers to use by the transmitter, e.g., of the communication device, to transmit data, and/or wherein the communication device receives as the feedback information a precoding matrix indicator, PMI, information describing which precoding matrix should be used for transmission towards the communication device, e.g. for multiple antenna MIMO sidelink communication, and/or wherein the communication device receives as the feedback information a channel state information, CSI, describing a state of a channel. For example, this may be in the form of a set of a plurality channel coefficients, e.g. for multiple antenna MIMO sidelink communications.

In another embodiment, the communication device monitors a plurality of wireless resource units which are reserved for a transmission of a different communication device which is different from another (i.e. the another) communication device, e.g., different from another user equipment, in order to identify a wireless resource unit which is used by another communication device, which may also be a user equipment, for the transmission of the feedback information. A wireless resource unit may e.g. include the NR numerology, time-freq-space with flexible subcarrier spacing (SCS), wideband and narrowband (NB), if a number of aggregated carriers. For narrowband IoT devices, aggregates NBs should be supported. For example, wireless resource unit may include, e.g., NR numerology, time-frequency-space, optionally with flexible subcarrier spacing (SCS), wideband as well as narrowband (NB). In the case that e.g. narrowband IoT devices are involved, aggregated NBs should be supported.

In yet another embodiment, the communication device detects a characteristic pattern which is allocated to another (i.e. the another) communication device, to recognize a transmission of a feedback information by another communication device, for example, the characteristic pattern may be a characteristic scrambling sequence.

In another embodiment, the communication device receives a resource allocation information for a managing communication device, which may be a base station, e.g., a gNB, wherein the resource allocation information describes an allocation of wireless communication resources to different communication devices and indicates which wireless communication resources are useable for a transmission of feedback information by communication devices other than the communication devices to which the respective wireless communication resources are allocated. For example, the wireless communication resources may be wireless resource units, and the allocation of the wireless communication resources may be referred to a reservation of wireless communication resources. The indication which wireless communication resources are usable may be for the case that the communication device, to which the wireless communication resources are allocated, does not make use, or does make full use, of the wireless communication resource.

In another embodiment, the communication device uses the received resource allocation information for limiting a number of wireless resource units monitored for feedback from another (i.e. the another) communication device. For example, only such wireless resource units may be monitored which are indicated as usable for transmission of feedback information by communication devices other than the communication device to which the respective wireless communication resources are allocated.

In another embodiment, the communication device selectively monitors a transmission activity in wireless resource units, which may be physical wireless resource units which are reserved, e.g., allocated or scheduled for example by a base station making the resource allocation, for transmission of a different communication device, which may be different from the another communication device, in the received resource allocation information in which are marked to be usable for transmission of a feedback information in the received resource allocation information, to find the feedback information.

In a further embodiment, the communication device searches, e.g., selectively, for the feedback information in one or more wireless resource units which are at least partially unused, for example in a portion of a wireless resource unit following an unused initial portion of said wireless resource unit.

In another embodiment, the communication device only searches wireless resource units, an initial portion of which is unused, for the feedback information.

According to another embodiment, a communication device coordinates a resource allocation to a plurality of communication devices and communicates with the plurality of communication devices, wherein the communication device provides a resource allocation information to the plurality of communication devices, wherein the resource allocation information describes an allocation of wireless communication resources to different communication devices and indicates which wireless communication resources are usable for transmission of feedback information by communication devices other than the communication devices to which the respective wireless communication resources are allocated. For example, the communication device may be a base station, e.g., a gNB. The allocation of wireless communication resources may refer to a reservation of wireless communication resources, and wireless communication resources may refer to wireless resource units. Indicating which wireless communication resources are usable may be performed in the case that the communication device to which the wireless communication resource is allocated does not make use, or does make full use, of the wireless communication resource, for example.

This embodiment according to the invention is also based on the finding that it is advantageous to transmit a feedback information from a receiving communication device by using a part of a resource unit, the part being unused by the communication device for which it is (primarily or preferentially) reserved, the resource unit not being reserved for the receiving communication device but for a different communication device. It has been found that informing the communication devices about a current resource allocation by providing a resource allocation information helps to double-use a resource allocated to a different communication device, the resource being allocated but not fully used by the communication device for which it is reserved without an increase complexity of the resource unit or without need to reserve or allocate a resource for the communication device that wished to transmit feedback information. For example, it may be signaled that a wireless resource is preferentially (or prior-ranking) reserved for a given communication device, but that this wireless resource may be (in a lower-ranking manner) used by one or more other communication devices for a feedback. Thus, resource efficiency is improved. On the other hand, communication devices who want to transmit a signaling or communication devices expecting a feedback do no longer need to monitor all available wireless resources for free wireless resources or for wireless resources comprising a feedback information. Rather, the signaling of wireless resources with may be used (in a lower ranking manner) for a transmission of feedback reduces the "search space" for identifying wireless resources useable or used for feedback transmission.

In an embodiment, the communication device identifies wireless resource units which are only partially used by the communication devices to which the respective wireless resource units are allocated, and marks the wireless communication units which are only partially used by the communication devices to which they are allocated as being usable for transmission of feedback information by communication devices other than the communication devices to which the respective wireless communication resources are allocated in the allocation information. For example, the communication device may be a base station, e.g., a gNB, and the wireless communication resources may refer to wireless resource units.

In another embodiment, the communication device monitors a usage of wireless resource units by the plurality of communication devices and marks wireless resource units, a usage of which is below or equal to a predetermined threshold value as being usable for transmission of feedback information by communication devices other than the communication devices to which the respective wireless resource units are allocated in the allocation information, or the communication device marks one or more wireless resource units having a relatively small usage as being usable for transmission of feedback information by communication devices other than the communication devices to which the respective wireless resource units are allocated in the allocation information.

According to another embodiment, a system is provided comprising a communication device which serves as a base station, a communication device serving a data sender communication device and a communication device serving as a data receiver communication device, wherein the data sender communication device transmits one or more data units directly to the data receiver communication devices via a sidelink, and wherein the data receiver communication device is configured to transmit an acknowledgement information signaling whether an information unit has been properly received from the data sender communication device or not.

This embodiment according to the invention is also based on the finding that it is advantageous to signal a feedback information by using an, at least partly, unused part of a resource unit that is not reserved for the receiving communication device but for a different communication device, because this allows for the provision of feedback without requiring that an own resource is dedicated for such feedback thereby helping to save bandwidth and resources while helping to increase reliability.

According to another embodiment, a method for communication is provided that comprises receiving, at a communication device, one or more information units from a second communication device, further comprising transmitting a feedback information in a wireless resource unit which is reserved for transmission of a different communication device but which is not used or only partially used by the different communication device. For example, the method may be performed by a first communication device which may be a user equipment. The one or more information units may be data blocks or packets and/or control blocks or packets and may be received from a second communication device, e.g., user equipment 2, via a direct link. The feedback information may for example refer to acknowledgment information and/or channel quality indicator, CQI, information and/or rank indicator, RI, information or a precoding matrix indicator, PMI, information and/or channel state information, CSI. A wireless resource unit may be a unit of a resource block pool which is reserved, e.g., allocated or scheduled for example, by a base station making resource allocation. The different communication device may be different from the wireless communication device, e.g., the first wireless communication device. Not used or only partially used may refer to not completely used, generally speaking, which is at least partly unused.

This method is based on the same considerations as the corresponding communication device.

According to another embodiment, the method for communication comprises transmitting, by a communication device, one or more information units to another communication device, and comprises monitoring a resource unit, which may be a wireless resource unit, which is not allocated to the another communication device, but reserved for a transmission of a communication device which is different from the another communication device for a feedback information from the another communication device. For example, the communication devices may be mobile communication devices such as user equipment. The information units may refer to data blocks or packets and/or control blocks or packets, the transmitting may be performed directly via a sidelink without involving a base station, to which the communication device could also communicate. The monitoring may be performed, e.g., by the communication device and the resource unit may be reserved for transmission of the communication device or any other of further communication devices.

This method is based on the same considerations as the corresponding communication device.

According to another embodiment, a method for communication comprises coordinating a resource allocation to a plurality of communication devices, the method comprises providing a resource allocation information to the plurality of communication devices, wherein the resource allocation information describes an allocation of wireless communication resources to different communication devices and indicates which wireless communication resources are usable for transmission of feedback information by communication devices other than the communication devices to which the respective wireless communication resources are allocated. For example, the coordinating may be performed by a communication device base station, e.g., a gNB. The allocation may refer to a reservation of wireless communication resource, wireless communication resources may refer to wireless resource units. The indication may be performed in the case that the communication device to which the wireless communication resource is allocated does not make use, or does not make full use, of the wireless communication resource.

This method is based on the same considerations as the corresponding communication device.

The above-mentioned methods are optionally be supplemented by one of the features and functionalities described herein with respect to the corresponding communication devices.

According to another embodiment, a computer program is provided for performing the method of the previous embodiments.

In accordance with another embodiment, a communication device is provided that receives one or more information units, which may be data blocks or packets and/or control blocks or packets, from a plurality of other communication devices, wherein the communication device receives a resource allocation message from a managing communication device, wherein the resource allocation message defines an allocation of bit positions associated with an acknowledgement of information units received from the plurality of other communication devices in a combined acknowledgement information unit, and wherein the communication device transmits a combined acknowledgement information unit in response to a reception of information units from a plurality of other communication devices using the allocation of bit positions defined in the resource allocation message. For example, the communication device may be a mobile communication device, e.g., a user equipment UE. The technique used may refer to the concept of multicast HARQ. The communication device may receive the information units via a direct link without involvement of a base station, e.g., multiple unicast transmissions from a number of transmitting communication devices, which may be user equipment. The combined acknowledgement information unit may refer to a D2D/V2X bundled broadcast, a multicast, a groupcast or a unicast HARQ. The bit positions may refer to an UE acknowledgement bit, which may be defined in the resource allocation message, for example, such that one bit in a multibit packet or transmission unit is associated with a reception status, ACK/NACK of a respective information unit received from a respective one of the other communication devices.

This embodiment according to the invention is based on the finding that it is advantageous to provide a signaling of an acknowledgement information in a combined acknowledgement information unit because this allows that in a system where a communication device communicates with a plurality of communication devices, a single combined acknowledgement information unit can be used for signaling respective acknowledgement information, the structure (i.e. bit positions of acknowledgement information for each of the plurality of communication devices) of the combined acknowledgement information unit being defined in a resource allocation message being communicated to the plurality of communication devices. Using a single combined acknowledgement information unit may help to save resources that would be used by an individual provision of feedback information by each of the plurality of communication devices at the cost of transmitting the resource allocation message. Moreover, it has been found that using such a combined acknowledgement information unit may give a quick and efficient overview for a managing communication device as to which communication device may be needed to trigger a retransmission or to adapt a communication mode to a more robust or reliable communication. Also, having a flexibly configurable allocation of bit positions to communication devices allows for an adaptation to the communication environment, for example on the basis of knowledge which of the communication devices will receive information units from many other communication devices and from which subset of a full set of communication devices the information units will be received.

In another embodiment, the communication device broadcasts or multicasts or groupcasts the combine acknowledgement information unit. For example, this may be a feedback of multicast/groupcast UE with a multibit HARQ. For example, broadcasting may imply that every device in the area of coverage gets this HARQ.

In another embodiment, the communication device broadcasts the combined acknowledgment information unit to the other communication devices via a sidelink which does involve a base station (BS), are a managing communication device. For example, the multicast/groupcast HARQ may be transmitted via sidelink.

In an embodiment, the communication device sets bits at bit positions associated with one or more other communication devices from which one or more information units were properly received to a first bit value and set bits at bit positions associated with one or more other communication devices from which one or more information units were not properly received or from which no information units were received to a second value which is different from the first value. For example, the bit positions may be bit positions of the combined acknowledgment information unit, and the first bit value may be one and the second bit value may be zero. In an embodiment, this may be a configuration to set up a multicast/groupcast message for all other UEs.

In another embodiment, the communication device transmits a combined acknowledgment unit for information units received from different other communication devices within a predetermined period of time, e.g., within a certain time interval. For example, the transmission should occur within a certain predetermined time interval.

In another embodiment, the resource allocation message also defines in which wireless resource unit, e.g., timeslot, time-frequency region, time-frequency-code region, numerology etc., the combined acknowledgement information unit is to be transmitted, and wherein the communication device transmits the combined acknowledgement information unit in the wireless resource unit specified by the resource allocation message. For example, the multicast/groupcast message could be transmitted with a certain allocated resource. Optionally, as an update or extension, a multicast/groupcast HARQ to be transmitted in an autonomous mode as well as for an out of coverage mode, is defined.

In another embodiment, the communication device evaluates a resource allocation message which is piggy-backed on data. For example, this resource allocation message may be advantageously received from a base station, which may optionally comprise a feedback toggle information which may switch between a provision of individual feedback and a provision of a combined acknowledgement information unit.

According to another embodiment, there is provided a communication device that transmits one or more information units to another communication device and receives a resource allocation message from a managing communication device, wherein the resource allocation message defines an allocation of bit positions associated with an acknowledgement of information units received by the another communication device in a combined acknowledgement information unit and wherein the communication device receives a combined acknowledgement information unit and evaluates at a bit position defined by the resource allocation message in order to derive an information whether one or more information units transmitted by the communication device have been properly received by the another communication device or not. For example, the communication device may be one of a number of mobile communication devices, for example many feedback-receiving user equipment. The information units may be data blocks or packets and/or control blocks or packets and may be transmitted directly via a sidelink, without involving a base station, to which the communication device could also communicate. The bit at a bit position defined by the resource allocation message may be defined as being associated with an acknowledgement of an information unit received by another (i.e. the another) communication device, e.g., user equipment 1, from the communication device itself.

This embodiment according to the invention is also based on the finding that it is advantageous to signal an acknowledgement information in a combined acknowledgement information unit, this allows that in a system in which a communication device communicates with a plurality of communication devices, a single combined acknowledgement information unit can be used for signaling respective acknowledgement information. The structure (i.e. bit positions of acknowledgement information for each of the plurality of communication devices) of the combined acknowledgement information unit being defined in a resource allocation message may be communicated to the plurality of communication devices.

In an embodiment, the communication device retransmits an information unit to another (i.e. the another) communication device in case the evaluated bit of the combined acknowledgement information units indicates the previous transmission of said information unit was not properly received by another communication device. The communication device may, for example, selectively retransmit the information unit, it is also possible to retransmit the HARQ broadcast as unicast. For example, the evaluated bit may be at the bit position defined by the resource allocation message.

In an embodiment, the resource allocation message also defines in which wireless resource unit, e.g., timeslot, time-frequency region, time-frequency-code region, etc., the combined acknowledgement information unit is to be transmitted and wherein the communication device receives the combined acknowledgement information unit in the wireless resource unit specified by the resource allocation message. For example, a receiving communication device, e.g., a receiving UE, could monitor resources needed to receive the HARQ information.

In an embodiment, the communication device evaluates a resource allocation message which is piggybacked on data. The resource allocation message may be advantageously received from a base station, and may optionally comprise a feedback toggle information which may switch between a reception of individual feedback and a reception of a combine acknowledgment information unit.

According to a further embodiment, a communication device, e.g. a managing communication device, coordinates a resource allocation to a plurality of communication devices and communicates with the plurality of communication devices wherein the communication device provides a resource allocation information to the plurality of communication devices, wherein the resource allocation information defines an allocation of bit positions associated with an acknowledgement of information units received by a given communication device from a plurality of other communication devices in the combined acknowledgement information unit to be transmitted by the given communication device in response to a reception of information units from a plurality of the other communication devices. For example, the communication device may be a base station, for example a gNB or an eNB scheduling the resources and bit positions. The given communication device and the plurality of other communication devices may be mobile communication devices, e.g., user equipments.

This embodiment according to the invention is also based on the finding that it is advantageous to signal an acknowledgement information in a combined acknowledgement information unit, this allows that in a system in which a communication device communicates with a plurality of communication devices, a single combined acknowledgement information unit can be used for signaling respective acknowledgement information. The structure (i.e. bit positions of acknowledgement information for each of the plurality of communication devices) of the combined acknowledgement information unit being defined in a resource allocation message is communicated by the managing to the plurality of communication devices. Moreover, it has been found that using such a combined acknowledgement information unit may give a quick and efficient overview for the managing communication device as to which communication device of the plurality of communication devices may be needed to trigger a retransmission or to adapt a communication mode to a more robust or reliable communication.

In another embodiment, the communication device provides resource allocation information allocating wireless resource units for transmissions from multiple other communication devices to the given communication device via a sidelink which does not involve the communication device itself. For example, the communication device may be a base station, e.g. a gNB. The other communication devices may be user equipments. For example, the communication device allocates resources and does not participate in the communication of the data over sidelink.

In another embodiment, the communication device identifies a communication device to which a plurality of other communication devices can send information units on the basis of allocation of wireless resource units, the communication device may be a gNB, and the other communication devices may be mobile communication devices, e.g., user equipments, wherein the communication device reserves a wireless resource unit for the combined acknowledgement information unit to be transmitted by the identified communication device in response to the identification of the communication device, and allocates the bit positions within the acknowledgement information unit in dependence on a knowledge which other communication devices have wireless resource units allocated for transmission to the identified communication device. For example, the base station, e.g. gNB, may use its knowledge about the allocation of wireless resource units, and the base station, identifies feedback multicasting user equipments and feedback receiving user equipments, also it may reserve the allocated resource for this bundled HARQ.

In an embodiment, the communication device includes the resource allocation information into an individual device downlink control information, e.g., a 5G DCI, or into a group downlink control information, e.g., 5G group DCI. In examples, the communication device or base station may utilize downlink control information to convey this resource allocation information.

In another embodiment, the communication device multicasts/groupcasts the resource allocation information to a plurality of communication devices, which may be user equipments, wherein the resource allocation information comprises an allocation of a wireless resource unit for the combined acknowledge information unit, e.g., sidelink transmission resources for which to transmit the broadcast HARQ feedback message for a user equipment and/or sidelink reception pool resources for which to receive the broadcast HARQ feedback message from the user equipment, e.g., an information in which wireless resource unit the combined acknowledgement information unit is to be transmitted, and allocation of positions, e.g., HARQ bit position information, associated with an acknowledgement of information units received by a given communication device, e.g., a user equipment, from a plurality of other communication devices, e.g., further user equipment, in a combined acknowledgement information unit, and a message size information, e.g., the message size of an aggregated HARQ feedback, describing a message size of the combined acknowledgment information unit. This may define, for example, the properties of this resource allocation information message.

In an embodiment, the communication device, e.g., a gNB, dynamically updates the resource allocation information, for example the resource information may be dynamically allocated.

In another embodiment, the communication device, e.g., the gNB, monitors a communication between other communication devices, e.g., between user equipments, and identifies a communication device, e.g., a first user equipment, to which a plurality of other communication devices, e.g., the other user equipments, send information units within a predetermined period of time on the basis of the monitoring, and reserves a wireless resource unit for the combined acknowledgement information unit to be transmitted by the identified communication device in response to the identification of the communication device, and allocates the bit positions within the combined acknowledgement information unit in dependence on a knowledge which other communication devices have transmitted information units to the identified communication device within the predetermined period of time. In an example, the base station may monitor the resources for dynamic allocation and reservation, including bit positional information.

In another embodiment, the communication device provides at least a part of the resource allocation information piggybacked on data. This may optionally comprise a feedback toggle information which may switch other communication devices between a provision of individual feedback and a provision of a combined acknowledgement information unit.

According to a further embodiment, there is provided a method for communication comprising receiving, at a communication device, one or more information units from a plurality of other communication devices, the method comprising receiving, e.g. at the communication device, a resource allocation message from a managing communication device, wherein the resource allocation message defines an allocation of bit positions associated with an acknowledgement of information units received from the plurality of other communication devices in a combined acknowledgement information unit, and the method comprising transmitting a combined acknowledgement information unit, e.g., a D2D bundled broadcast HARQ, in response to a reception of information units from a plurality of other communication devices using the allocation of bit positions defined in the resource allocation message. The information units may, for example, be data blocks or packets and/or control blocks or packets and may be received via direct links, without involvement of base station, e.g., multiple unicast transmission from a number of transmitting communication devices, the communication devices may for example be user equipments. The allocation of bit position may be respective user equipment acknowledgment bits, and the resource allocation message may specify for example that one bit in a multibit packet or transmission unit is associated with a reception status, ACK/NACK, of a respective information unit received from a respective one of the other communication devices.

This method is based on the same considerations as the corresponding communication device.

According to an embodiment, there is provided a method for communication, the method comprising transmitting, by a communication device, which may be a user equipment, one or more information units, which may be data blocks or packets and/or control blocks or packets to another communication device, which may be a user equipment, and the method comprising receiving, e.g., at the communication device, a resource allocation message from a managing device, wherein the resource allocation message defines an allocation of bit positions associated with an acknowledgement of information units received, by the another communication device, from a plurality of communication devices in a combined acknowledgement information unit, and the method comprising receiving, e.g., at the communication device, a combined acknowledgement information unit, and evaluating a bit at a bit position defined by the resource allocation message in order derive information whether one or more information units transmitted by the communication device has been properly received by the another communication device or not. For example, the one or more information units may be transmitted directly via a sidelink without involving a base station, to which the communication device could also communicate. In an example, the bit position may be defined as being associated with an acknowledgment of an information unit from the communication device.

This method is based on the same considerations as the corresponding communication device.

According to an embodiment, a method for communication is provided, comprising coordinating, by a communication device, a resource allocation to a plurality of communication devices, comprising providing a resource allocation information to the plurality of communication devices, wherein the resource allocation information defines an allocation of bit positions associated with an acknowledgement of information units received by a given communication device, e.g., a first user equipment, from a plurality of other communication devices, e.g. further user equipments, in a combined acknowledgement information unit to be transmitted by the given communication device in response to a reception of information units from a plurality of the other communication devices.

This method is based on the same considerations as the corresponding communication device.

The above-mentioned methods are optionally be supplemented by one of the features and functionalities described herein with respect to the corresponding communication devices.

According to an embodiment, a computer program is provided for performing a method according to the previously mentioned embodiments, when the computer program is run on a computer.

BRIEF DESCRIPTION OF THE DRAWINGS

Embodiments of the present invention will be detailed subsequently referring to the appended drawings, in which.

DETAILED DESCRIPTION OF THE INVENTION

In the following, different embodiments according to the invention will be described. However, it should be noted that functionalities described with respect to different of the embodiments can also be combined. Also, the embodiments described here should not be considered as limiting the scope.

First, some general consideration, which should be considered as advantageous but not as being necessary, with respect to a communication environment, in which embodiments according to the invention can be used, will be described.

In communication systems, it is possible that communication devices send their transmissions via a base station to each other, or they can communication directly. In either case, it is advantageous to provide a signaling as to whether or not data packets have been properly received. Such signaling may enhance the reliability of the communication process.

An illustrative communication system comprises a single base station supporting sidelink (SL) transmissions and two communication devices, UE1 and UE2, where UE 2 is transmitting to UE 1 (in a typical D2D or V2X scenario). UE1 has received some data from UE2 via a unicast SL transmission. UE2 is expecting a hybrid automatic repeat request, HARQ, feedback, from UE1 regarding the outcome of its first transmission, each transmission may be defined a HARQ process ID.

Scrambling Feedback with UE Blind Decoding

In the following, some embodiments according to the invention will be described which use an amended check sum for a signaling.

In order to provide for a HARQ signaling, communication resources may be reserved for this kind of signaling. If such a resource is not provided, it is more difficult to find a way to provide this signaling. According to the present application, there are two scenarios for embedding HARQ feedback and transmitting it back to the appropriate user equipment.

A) The HARQ feedback may be embedded and transmitted along the SL in either the control channel or the next scheduled data transmission to UE2 from UE1. The control channel PSCCH may be prioritized since the next scheduled data transmission by UE1 is not known. However, the data channel PSSCH is not precluded.

Figure 8:
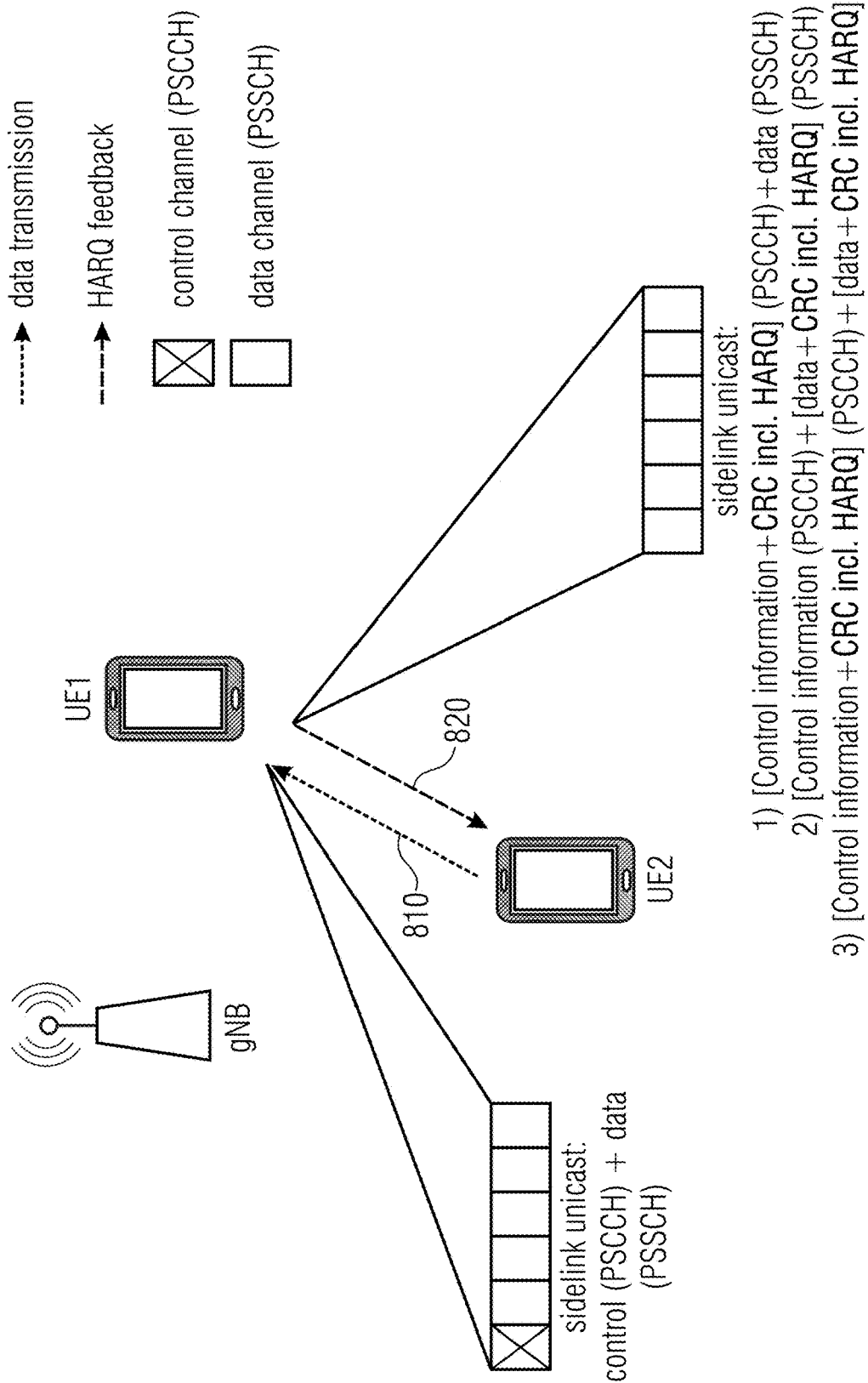
FIG. 8 shows a layout of an illustrative system to convey HARQ feedback information according to an embodiment of the present invention.

This is depicted in FIG. 8, where the case is shown in which the HARQ feedback (for example, a feedback signaling whether an information unit has been properly received or not, also designated as ACK/NACK feedback) is transmitted via sidelink. UE2 transmits data using a unicast sidelink transmission 810, as depicted by the left arrow pointing from UE2 to UE1. The sidelink unicast transmission 810 may comprise a control channel PSCCH and a data channel PSSCH. After UE1 has received the transmission, it sends back appropriate HARQ feedback information, as depicted by the right hand arrow 820 pointing from UE1 to UE2. The HARQ feedback may be signaled using a check value that has been appropriately amended according to whether or not the information from UE2 has been properly received or not. This feedback may be embedded into control information, e.g. the PSCCH only, the data channel PSSCH is not used. In another scenario, the control information PSCCH is not used, but the feedback is embedded into the data channel PSSCH. In a further alternative, the feedback is embedded into both control information PSCCH and data PSSCH.

Regarding FIG. 8, in other words, three different ways are illustrated in which the HARQ feedback can be piggybacked on existing control and data channels of the sidelink. In the first and second options, the HARQ are transmitted on the checksum of the control and data channel respectively. The third option is not precluded but entails doubling the blind decoding effort to extract the HARQ information. This could be applicable to out of coverage, autonomous, mode of D2D/V2X transmissions as well, which is also known as mode 2/mode 4, respectively.

B) The uplink HARQ feedback transmissions are relayed via the base station, e.g. gNB, to UE1, which is then relayed to UE2. This is shown in FIG. 9.

Figure 9:
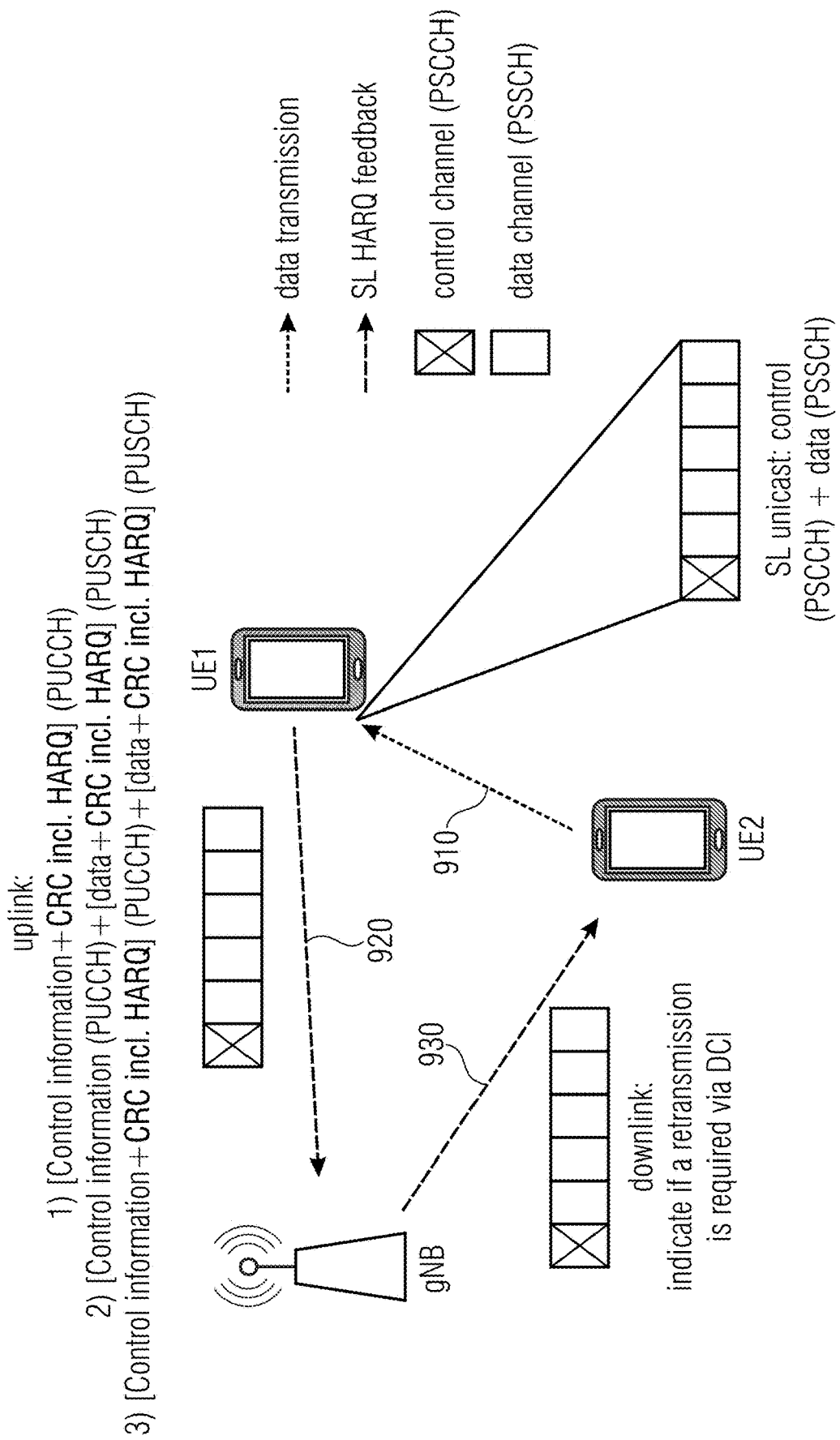
FIG. 9 shows a layout of another illustrative system to convey HARQ feedback information according to an embodiment of the present invention.

FIG. 9 shows the case in which the HARQ feedback is transmitted via uplink/downlink, it presents an alternative method to convey the CRC embedded HARQ feedback to UE 2, i.e. via the uplink through the base station (eNB/gNB). The uplink control and data channels are used to provide the HARQ indications, in the case that the SL of UE 1-UE 2 is unavailable/weak or not scheduled for any transmissions. In detail, UE2 transmits data using a unicast sidelink transmission, as depicted by the arrow 910 pointing from UE2 to UE1. The sidelink unicast transmission 910 may comprise a control channel PSCCH and a data channel PSSCH. After UE1 has received the transmission 910, it sends back appropriate HARQ feedback information, as depicted by the arrow 920 pointing from UE1 to a base station, e.g. gNB. The HARQ feedback may be signaled using a check value that has been appropriately amended according to whether or not the information from UE2 has been properly received or not by UE1. This feedback may be embedded into control information of the uplink, e.g. the PUCCH only, the data channel PUSCH is not used. In another scenario, the control information PUCCH is not used, but the feedback is embedded into the uplink data channel PUSCH. In a further alternative, the feedback is embedded into both uplink control information PUCCH and data PUSCH. The gNB then forwards an indication whether a retransmission is needed or not using the downlink 930 to UE2.

In other words, FIG. 9 shows that, according to an embodiment, the HARQ feedback may be sent (or forwarded) via a base station. The communication may proceed as follows. First, a data transmission is sent from UE2 to UE1, this transmission may be made via a sidelink unicast connection 910. For this transmission, a control channel PSCCH and a data channel PSSCH may be used. After the transmission, UE1 amends a check value associated with the data transmission so as to contain HARQ feedback information. This HARQ feedback information may be sent to the base station gNB. In a first embodiment, the control channel PUCCH may contain the checksum including the HARQ feedback. In another embodiment, the checksum including the HARQ feedback may be sent using the data channel PUSCH. In a third embodiment, the checksum with the HARQ information may be sent by both the control and data channels PUCCH and PUSCH. Hence, the embodiment according to FIG. 9 presents an alternative method to convey the CRC embedded HARQ feedback to UE2, i.e., via the uplink through the base station. The uplink control and data channels are used to provide the HARQ indications, for example in the case that the sidelink of UE1 to UE2 is unavailable/weak or not scheduled for any transmissions.

In both cases, the idea is to embed the HARQ feedback into a check value, e.g. a CRC, of a control channel transmission or subsequent scheduled data transmission from UE1, such that UE2 or the base station can, for example, employ blind decoding to extract its own HARQ feedback (e.g. a HARQ feedback intended for the respective communication device) in order to initiate a decision on whether to perform a retransmission or not.

An advantage of embedding the HARQ feedback into the check value (e.g. CRC) is that the control information/data does not need to be decoded to determine a HARQ-ACK information, but rather, from the outcome of the check value. For example, the checksum may be a cyclic redundancy check, CRC value. The check value will then serve two purposes:
  i) Serve as an error detection mechanism to preserve the integrity of the transmitted control or data information;
  ii) Indicate whether a retransmission is needed via an additional ACK/NACK indication.

In this case, one or more additional bits would in some cases have to be included into the checksum. But in this case, support for legacy users may be at risk of exclusion with such an amended checksum format. Thus, inclusion of more bits into the checksum should be considered as being optional.

Figure 10:
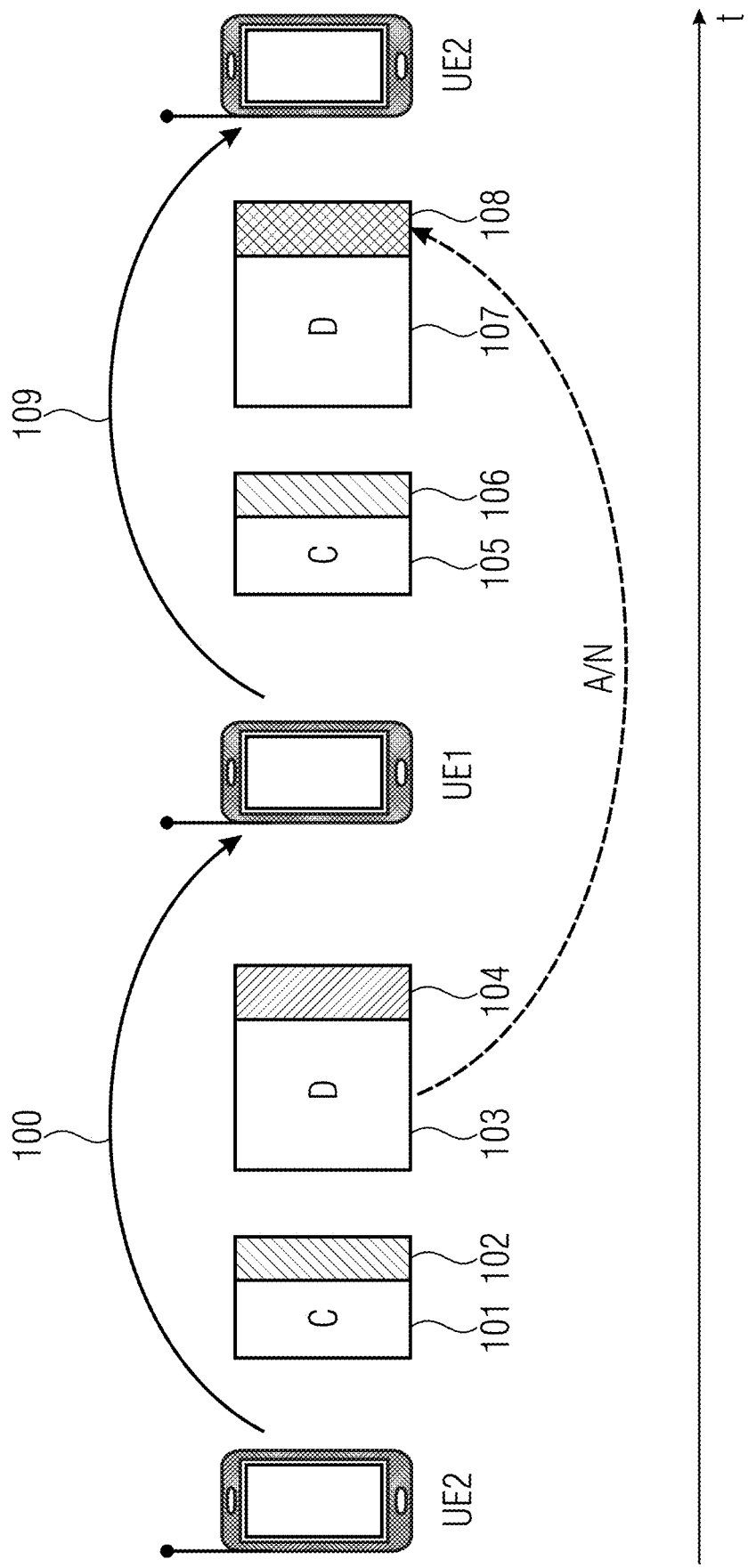
FIG. 10 shows a conceptual illustration on how the HARQ feedback is conveyed according to an embodiment of the present invention.

In order to more clearly illustrate an example of the feedback transmission, embedding and extraction, FIG. 10 shows a timeline of the HARQ procedure. In a first step, UE2 sends a transmission 100 to UE1. This transmission comprises control information as well as a data. Both the control information 101 and the data 103 comprise each a respective checksum 102 and 104, control information 101 comprises the checksum 102, the data 103 comprises checksum 104. UE1 determines as to whether or not the transmission has been properly received. Based on this determination, a checksum of another transmission 109 may be altered. As depicted in FIG. 10, UE1 sends a transmission 109 to UE2, this transmission comprises control information 105 with checksum 106 and data 107 with checksum 108. In this particular case, the checksum 108 of the data 107 is altered (when compared to an original check sum, or when compared to a check sum which would be transmitted for the same data for a different outcome of the determination) in order to reflect the outcome of the determination. For signaling this outcome, UE1 sends control information 105 together with its checksum 106, and data 107 together with the altered checksum 108 to UE2. It is apparent that the alteration of the checksum of the data is merely an example, and instead of this checksum 108, also the checksum of the control information 106 or even both checksums 106 and 108 could have been altered.

Accordingly, UE1 can conclude on the basis of a common evaluation of the data 107 and the (altered) checksum 108 whether the transmission 100 was properly received by UE2.

Figure 11:
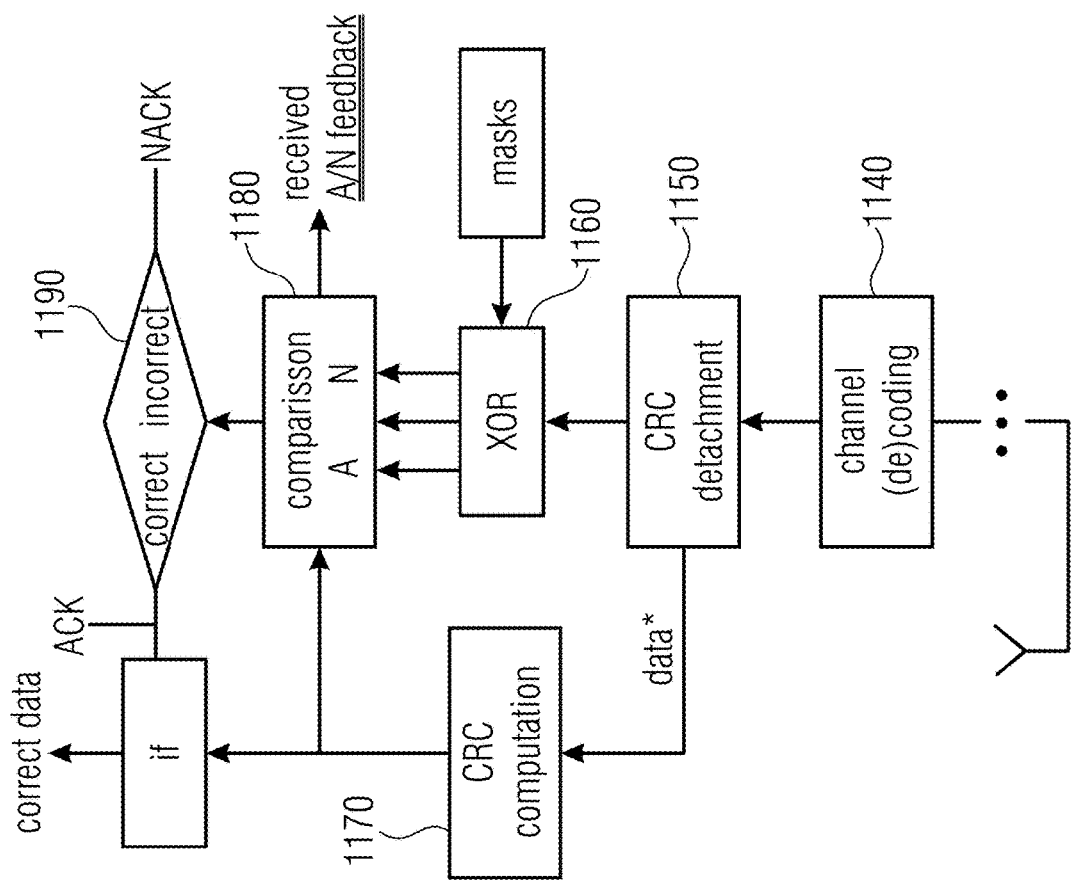
FIG. 11 shows a conceptual block diagram of a method performed by transmitter and receiver according to an embodiment of the present invention.
Figure 11:
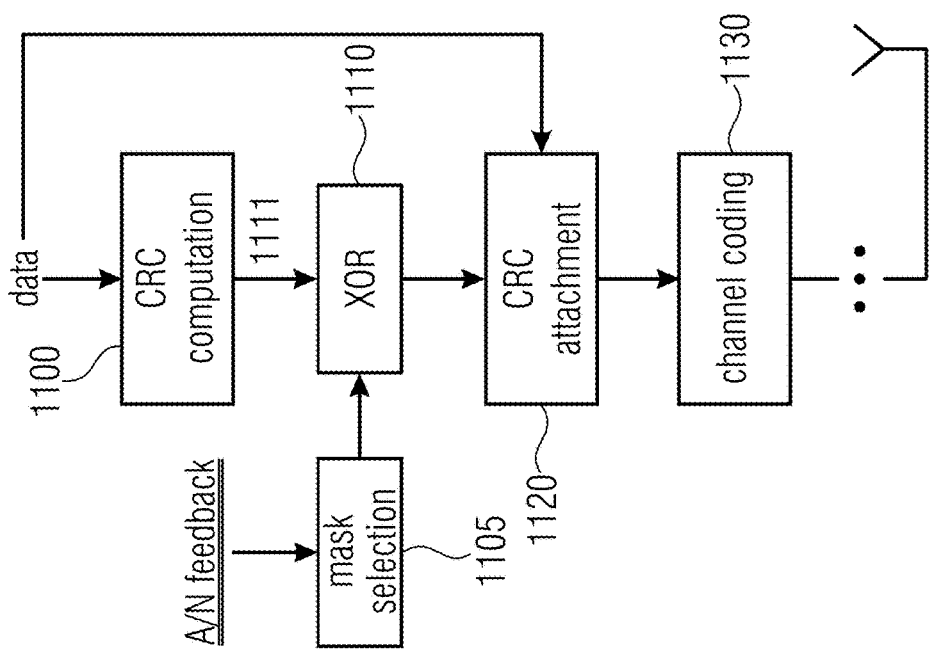

FIG. 11 shows a conceptual block diagram of the steps performed by the transmitter and receiver. For example, the functionality shown at reference numerals 1100 to 1130 may be performed by UE1 (for example as shown in FIG. 8 or in FIG. 9 or in FIG. 10) and the functionality shown at reference numerals 1140 to 1190 may be performed by UE2 (for example as shown in FIG. 8 or in FIG. 9 or in FIG. 10).

Initially, data to be transmitted (for example from UE2 to UE1 depicted in FIG. 10) is provided. In a first step 1100, a checksum of the data is computed. As mentioned before the checksum may be in embodiments a cyclic redundancy check CRC value, but it is apparent for the person skilled in the art that also other checksums (advantageously multi-bit checksums) are possible like the so-called longitudinal parity check, Fletcher's checksum or the like. Further, based on whether or not a previous data packet (for example, transmitted in transmission 810 or 910) has been received properly or not, a mask is selected in step 1105, and this mask is used for amending the checksum value. In step 1110, the computed CRC value is amended based on the selected mask. In this illustrative case, an XOR operation is performed on the checksum. The mask used for the XOR operation may be '1100' for ACK and '0011' for NACK in the illustrative case that the checksum has the length of four bits. It is clear that any other combination of masks can be used, and that the size of the mask has to be adapted to the size of the computed checksum. After performing the XOR operation, the checksum is attached to the data in step 1120. In step 1130, the information comprising the data as well as the attached checksum are channel coded and transmitted (for example, in transmission 820 or 920).

The receiver (for example, UE2 or gNB) receives the information and performs a channel decoding in step 1140. In the next step, the information is broken down into the checksum and the data in step 1150. The detached checksum is subjected to an XOR operation, whereby the checksum is XORed with the masks corresponding to ACK and NACK in step 1160. The extracted data is used to perform the computation of the checksum, in this case a CRC, in step 1170. In step 1180, the computed checksum is compared to the checksums that have been detached from the information and subjected to the XOR operations to determine whether the received information comprised a checksum amended by a mask corresponding to ACK or by a mask corresponding NACK. Based on the result of the comparison, it is determined in step 1190 whether an ACK or a NACK case is present. In the case of ACK, it is found that the previously transmitted data (for example, transmitted by UE2) has been received properly (for example, by UE1) and no retransmission is necessary. In the case that a NACK is determined, a retransmission may be triggered. In the case that the computed checksum (computed in step 1170) neither corresponds to the checksum amended with the mask corresponding to ACK nor with checksum amended with the mask corresponding to NACK, it can be concluded, by the communication device UE2, that the data transmitted from UE1 to UE2 (for example, date transmitted with transmission 820 or with transmission 920, or data 107) have been corrupted. In the latter case, it is typically not possible to determine whether data transmitted from UE2 to UE1 with transmission 810 or with transmission 910 (for example, data 103) has been properly received by UE1. Accordingly, in a conservative approach, re-transmission may also be made in this case.

Figure 12:
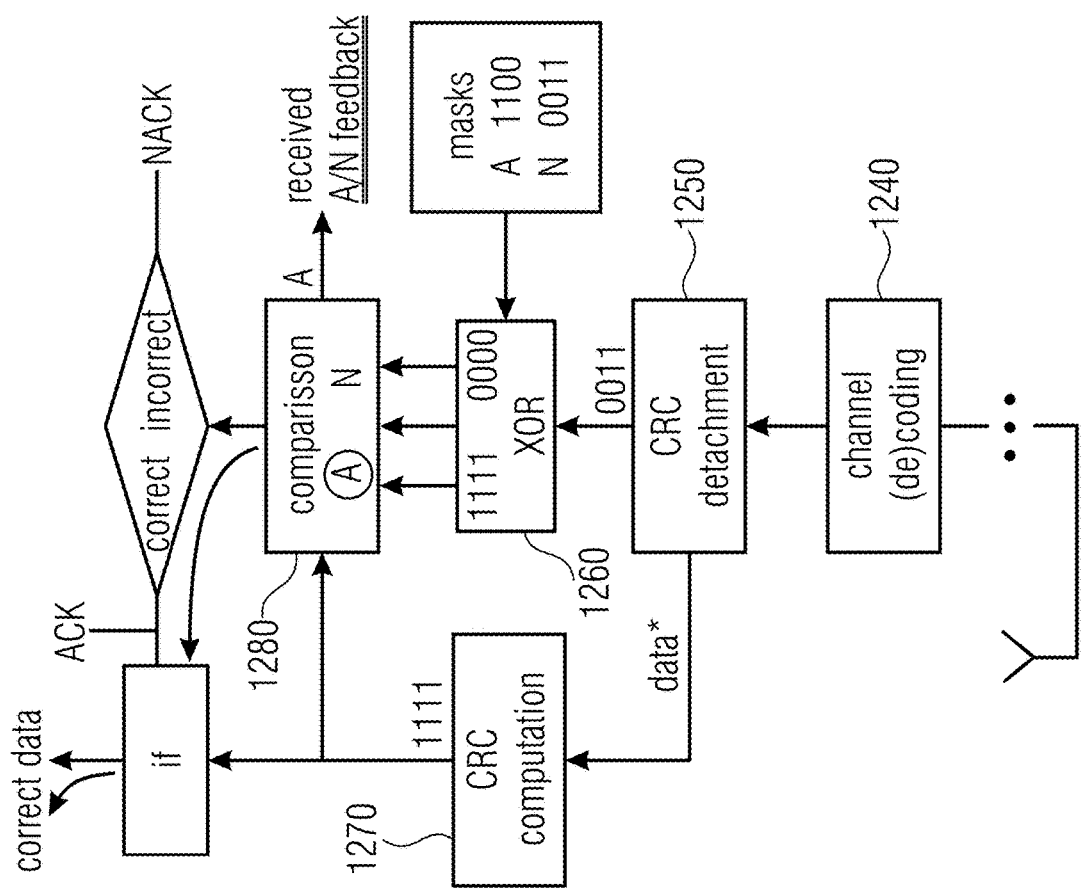
FIG. 12 shows the conceptual block diagram of FIG. 11 in the case that an ACK indication is to be sent according to an embodiment of the present invention.
Figure 12:
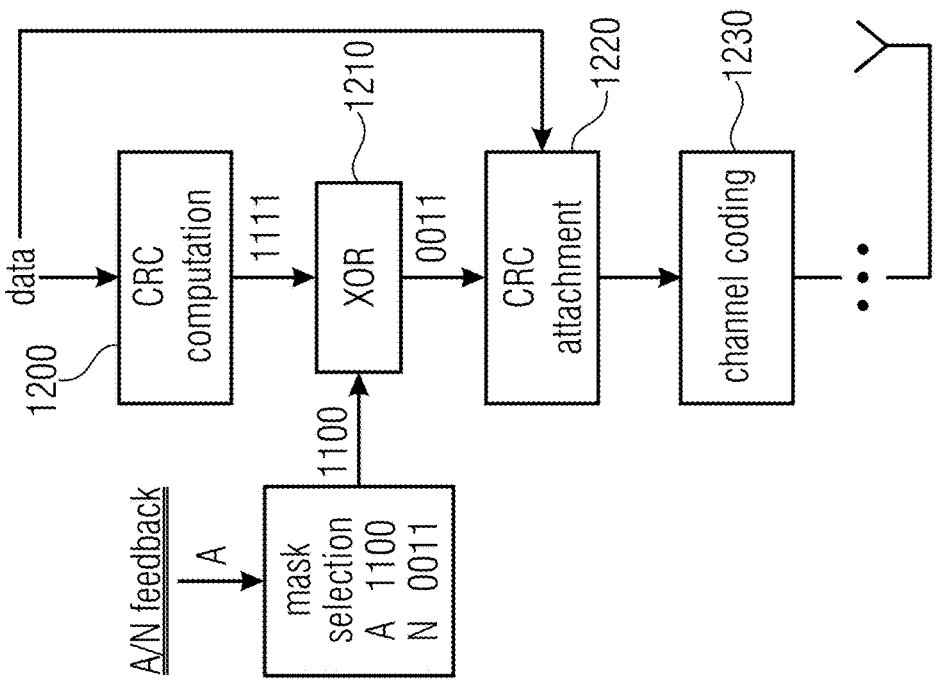

FIG. 12 illustrates an example in which an ACK indication is to be sent in a system corresponding to the block diagram of FIG. 11. As an example, the checksum, e.g. a CRC, computed in step 1200, is '1111'. The masks for step 1205 are '1100' for an ACK and '0011' for a NACK. Hence, in order to signal an ACK, the '1100' mask is used in step 1210. The result of XOR in the checksum '1111' with the mask '1100' is '0011'. The XOR result is attached to the data in step 1220 and channel coded in step 1230. After transmission, the receiver decodes the information instep 1240 and detaches in step 1250 the checksum which is in this example '0011'. Thereafter, an XOR operation is performed in step 1260 on the checksum with both the masks values '1100' and '0011'. The respective outcomes are '1111' and '0000'. These two outcomes are compared in step 1280 to a checksum that has been calculated in step 1270 based on the decoded data with the result '1111'. A comparison of the values yields that an ACK has been conveyed. Hence, in step 1290, it can be determined that an ACK has been transmitted and that a previously transmitted data has been properly received.

In the following, different embodiments are presented that provide a HARQ signaling according to the principles discussed above. It should be noted that any of the details mentioned above may optionally be introduced into the embodiments described in the following, either individually or in combination.

Figure 1:
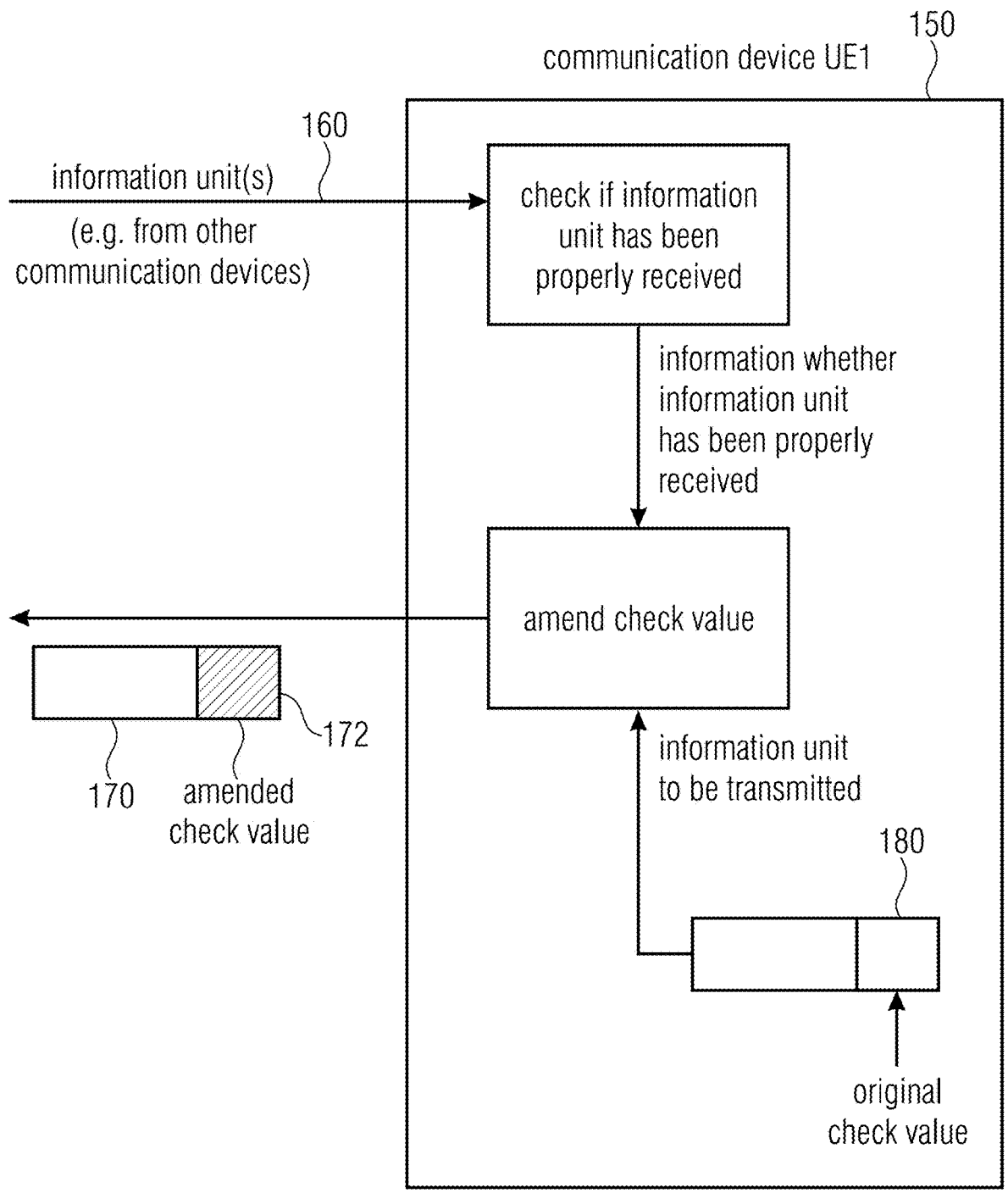
FIG. 1 shows a block diagram of a communication device according to an embodiment of the present invention.

FIG. 1 shows a communication device 150 in accordance with an embodiment of the present application. A communication device, UE1, is receiving one or more information units 160, which may be data blocks or packets or also control blocks or packets from a second communication device (e.g. from UE2). The communication devices may, for example, be mobile communication devices like user equipments, or, in a general case, cellular phones, tablets, PDAs, wearables, IoT devices or any other communication device that is communicating with other communication devices. The communication device performs a check as to whether the information unit has been properly received. There exists different techniques for checking whether an information has been properly received, one of these tests may be using a check sum such as a cyclic redundancy check, longitudinal parity check, Fletcher's checksum or the like. Based on the result of the determination whether the information unit has been properly received, the communication device UE1 amends a check value 180 associated to an information unit 170 to be transmitted by the communication device UE1. This information unit has associated a check value 180, this check value is selectively amended so as to reflect the result of the determination whether the information unit has been properly received. After the check value has been amended, the information unit with the amended check value 172 is transmitted. With this technique, a signaling has been established that can be used to signal to the receiving communication device whether or not a previous information unit has been properly received or not.

The check value 172, that is amended as described above, may allow for the detection of one or more bit errors after reception of the information unit 170, and depending on the kind of check value, bit errors at least up to a predetermined number of bit errors can be detected, and in cases depending on the check value used, even the correction of bit errors is possible.

The signaling as to whether the information unit 160 has been properly received may, for example, be performed using a particular manipulation of the check value associated with an information unit 170. For example, this amending may comprise performing an XOR operation with an appropriate bit mask. In the case that the information has been properly received, and acknowledgement is to be signaled, usually referred to as ACK. This ACK may be signaled by using a bit mask of a number of '0' s, which would leave the original check value unchanged. In the other case, that it has to be signaled that the information unit 160 has not been properly received, a non-acknowledgement, NACK, has to be signaled. For signaling a NACK, a bit mask consisting of a number of '1' s may be used, which inverts the original check value when applying the XOR operation.

This kind of feedback, also referred to HARQ feedback, can be piggybacked on control or data channels. The communication device UE1 shown in FIG. 1 may, for example, correspond to UE1 shown e.g. in FIG. 8, and it is depicted in FIG. 8 that the HARQ feedback can be piggybacked onto an information unit transmitted in a control channel PSCCH, can also be transmitted in a data channel PSSCH and can also be both transmitted in control and data channels PSCCH and PSSCH. While using only one channel for piggybacking this information may help to save the computational effort, piggybacking the information to both control and data channel increases the reliability of the signaling process.

Figure 2:
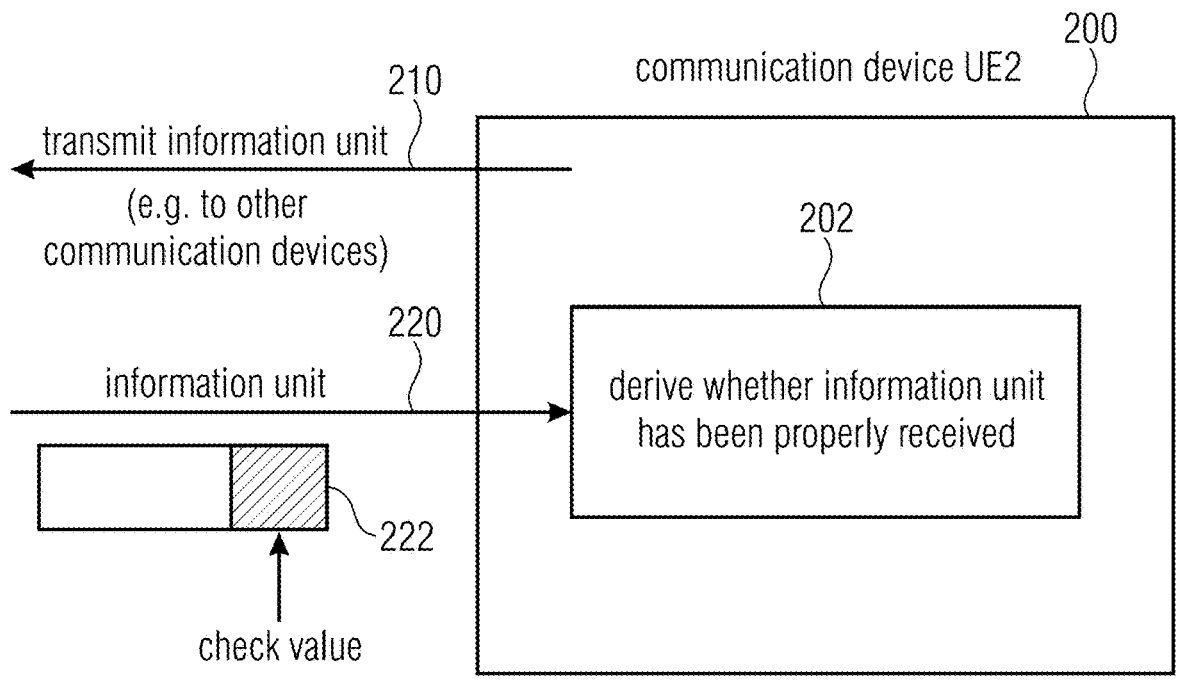
FIG. 2 shows a block diagram of a of a communication device according to an embodiment of the present invention.

FIG. 2 shows a conceptual drawing of the communication device UE2 200. As described in relation to FIG. 1, also the communication device UE2 200 may be a mobile communication device, for example, a user equipment or the like. Communication device UE2 200 transmits one or more information units 210 to another communication device, which may be for example UE1. The communication may be performed directly via a sidelink connection, in this case, a base station does not need to be involved in the communication process. Also here, the information units may be data blocks or packets, or may also be control blocks or packets. This communication device receives 220 one or more information units having associated one or more check values 222. These check values 222 may be multibit binary values like for example, CRC values. Based on the check values 222, the communication device 200 derives (block 202) whether the information units 210 that have been previously transmitted, have been properly received by the other communication device.

As described above, the check value 222 may be used for detecting bit errors up to a certain number of bit errors, and also may be in cases used for correction of these bit errors. Based on the check value 222, the communication device UE2 200 may determine whether or not a previously transmitted information unit has been properly received or not using a number of predetermined derivation rules. If a single ACK/NACK condition is to be signaled, there may be two predetermined derivation rules, but it is also possible to signal a different number of ACK/NACK states, then an appropriate number of derivation rules has to be used. If for example not two but four or six acknowledgement conditions have to be signaled, four or six derivation rules may be used. The derivation may be performed using the check sum 222 received with the information unit 220, namely by comparing the received check sum 222 with a check sum that is calculated by the communication device UE2 based on the information unit. In case that an XOR operation is used, the communication device may perform the same XOR operation on the calculated check sum and compare the result to the received check sum 222. By this comparison, it can be determined which particular kind of bit mask has been used to alter the check sum which allows to conclude whether an ACK or a NACK is intended to be signaled.

Figure 3:
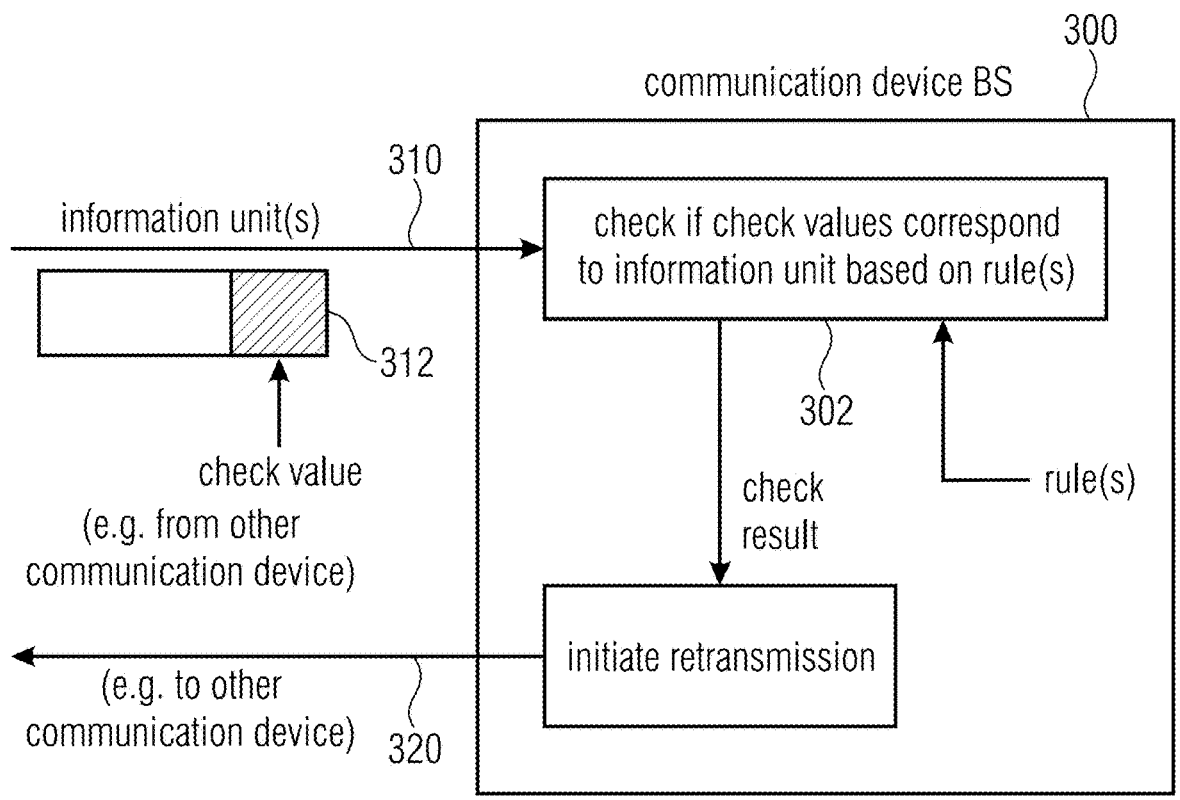
FIG. 3 shows a block diagram of a further communication device according to an embodiment of the present invention.

FIG. 3 shows a conceptual drawing of a further communication device 300 according to the present application. This communication device may be a network node or a base station, for example a gNB. The communication device 300 receives one or more information units 310 having associated one or more check values 312 e.g. from a first communication device (e.g. from the communication device 150, UE1). The communication device 300 determines (block 302) whether the one or more check values 312 correspond with a respective information unit (or, to be precise, with a useful data content of the respective information unit), that may have been previously transmitted, according to a first predetermined derivation rule or according to a second predetermined derivation rule or do not correspond with the respective information unit at all. The communication device 300 initiates a retransmission of a corresponding information unit to the first communication device UE1 in dependence on the determination (for example using an appropriate message or information unit 320), e.g. in the case that it is determined that the previously transmitted information unit has not been properly received (by UE1).

As shown in FIG. 3, the information unit 310 received by the communication device 300 has associated a check value 312, this information unit may be transmitted from another communication device, e.g., UE1. The information may be control information in a PUCCH or data in a PUSCH. As mentioned before, it is possible to use control information or data information (or, more precisely, a check value associated with the control information or a check value associated with the data) for conveying the ACK/NACK signaling, but it is also possible to use both the control and data channel (or, more precisely, check values associated with the control and data channels) in parallel in order to increase reliability of the signaling. As mentioned before, the check value 312 may be a cyclic redundancy check value or any other value created according to any type of check. The check value may help to identify bit errors up to a certain number of bit errors, and may even help to correct bit errors.

Figure 4:
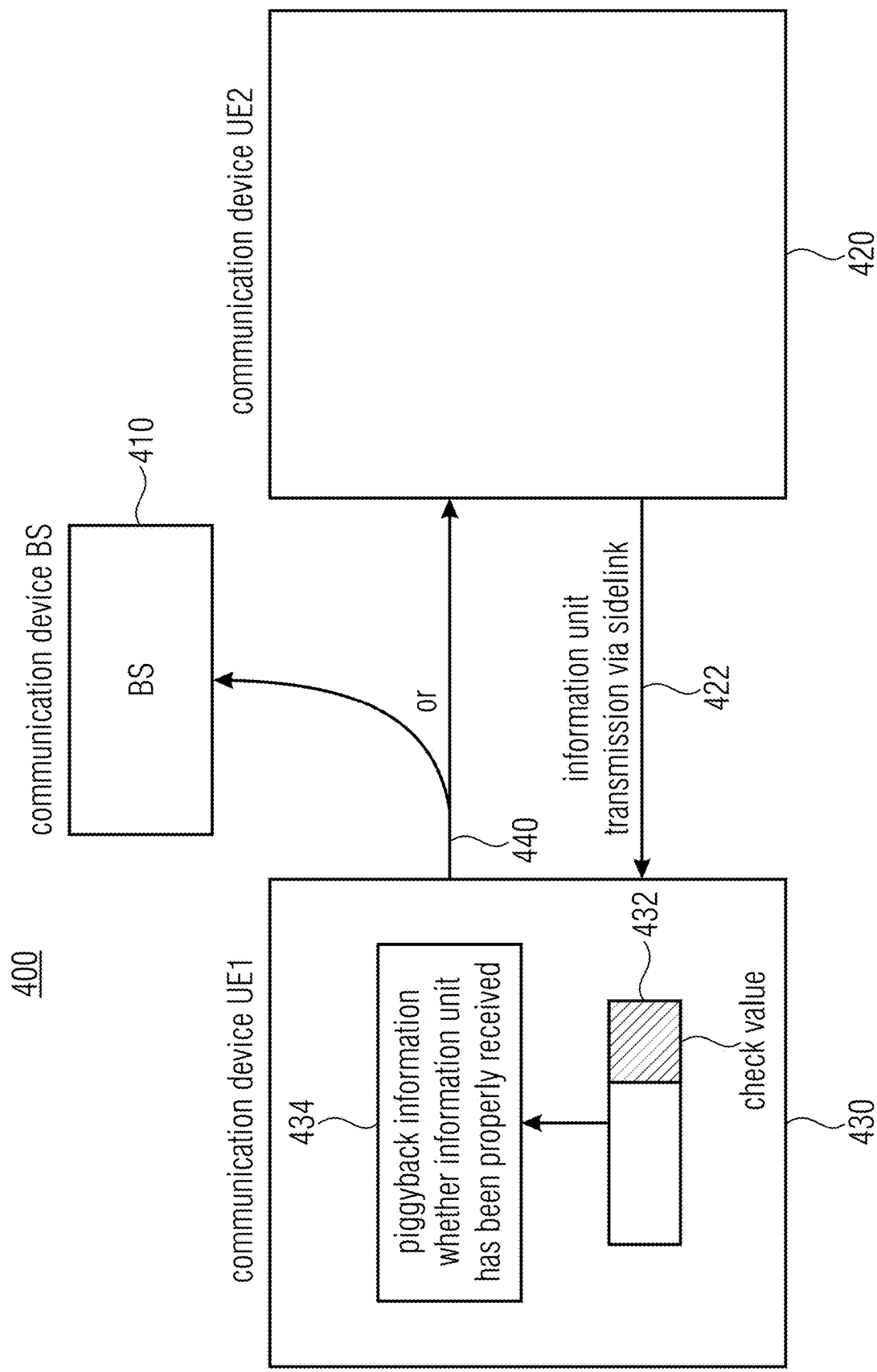
FIG. 4 shows a conceptual layout of a system according to an embodiment of the present invention.

FIG. 4 shows the conceptual layout of a system 400 comprising a communication device 410 according to FIG. 3 serving as a base station, a communication device 420 according to FIG. 2 serving as a data sender communication device and a communication device 430 according to FIG. 1, which serves as a data receiver communication device. The data sender communication device 420 transmits one or more information units 422 directly to the data receiver communication device 430 via a sidelink connection. The data receiver communication device 430 piggybacks (block 434) an acknowledgement information, signaling whether an information unit has been properly received from the data sender communication device or not, in a check value information 432.

This check value information 432 may be transmitted to the data sender communication device 420, along with a respective information unit 440, directly, or may be sent to the communication device 410 which serves as a base station.

Figure 5:
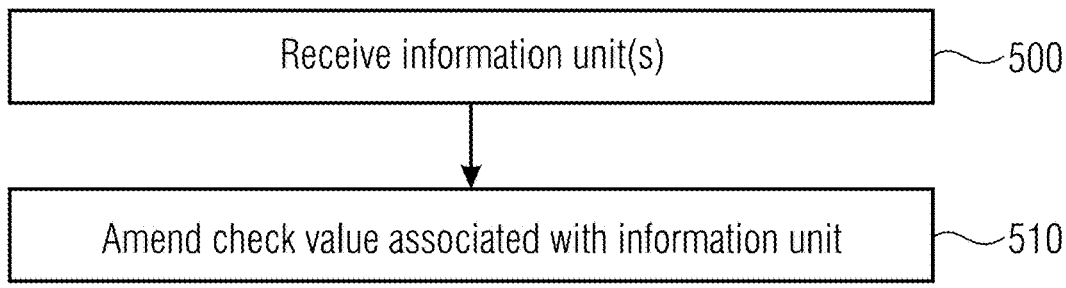
FIG. 5 shows a flow chart of a method for a communication device according to an embodiment of the present invention.

FIG. 5 shows a flow chart of a method, e.g. for the communication device of FIG. 1. In a first step 500, the communication device (e.g. UE1) receives one or more information units from a second communication device (e.g. UE2). These information units may, for example, be received via a direct link, such as a sidelink. As mentioned above, the information units may be data blocks or packets, or may also be control blocks or packets. In step 510, it is shown that a check value is amended, the check value is associated with an information unit transmitted by the communication device, and may be transmitted to a base station, gNB for example, or to the second user equipment, UE2. The check value is amended in dependence on whether the information unit received from the second communication device UE2 has been properly received by the communication device UE1 or not, to thereby provide a signaling whether the information unit received from the second communication device UE2 has been properly received or not. This signaling may be performed as mentioned before, for example by performing an XOR operation on the check value using an appropriate bit mask.

Figure 6:
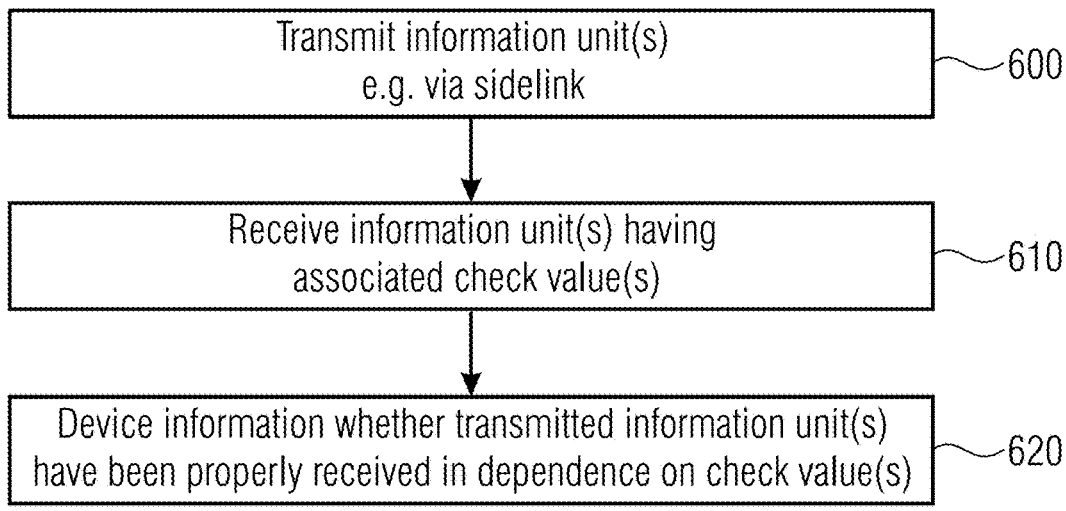
FIG. 6 shows a flow chart of a method for a communication device according to an embodiment of the present invention.

FIG. 6 shows a method, e.g. for a communication device according to FIG. 2. In step 600, the communication device UE2 transmits one or more information units, e.g., via a sidelink, to another communication device UE1. When for example, the information units are transmitted via a sidelink, this may not involve a base station, to which the communication device UE2 could also communicate. In step 610, the communication device UE2 receives one or more information units having associated one or more check values. These check values may be multibit binary values, such as the CRC values mentioned before. As mentioned above, also other check values are possible. In step 620, the communication device UE2 derives an information indicating whether the one or more information units transmitted by the communication device UE2 have been properly received by the other communication device UE1 or not in dependence on the one or more check values. This deriving may be performed using certain rules, like the before mentioned rules applying to XOR operations performed on the one or more check values.

Figure 7:
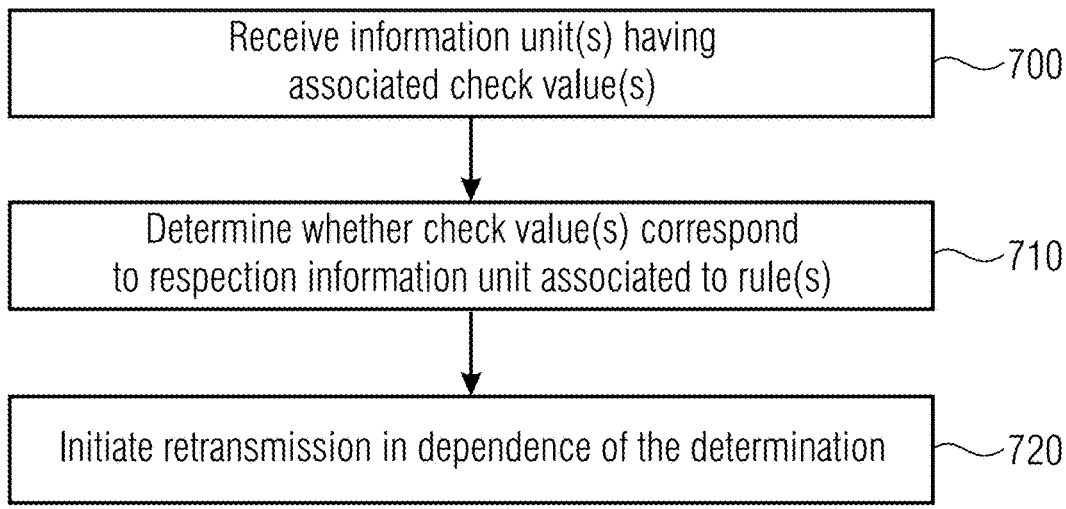
FIG. 7 shows a flow chart of a method for communication for a communication device according to an embodiment of the present invention.

FIG. 7 shows a method for communication, e.g. for a communication device shown in FIG. 3. In step 700, the communication device BS receives one or more information units having associated one or more check values, from a first communication device UE1. In step 710, the communication device BS determines whether the one or more check values correspond with a respective information unit according a first predetermined derivation rule, or according to a second predetermined derivation rule, or do not correspond with the respective information unit. The first predetermined derivation rule may refer to the case that a NACK condition is to be signaled, and the second derivation rule may be used for signaling an ACK condition. In step 720, the communication device BS initiates a retransmission of an information unit to the first communication device UE1 in dependence on the result of the determination. For example, the retransmission may be initiated depending on whether the one or more check values correspond with a respective information unit according to a first predetermined derivation rule or according to the second predetermined derivation rule, or whether they do not correspond with the respective information unit at all.

Unused Transmission Resource Pools for Feedback Transmission

Further embodiments also address the transmission of feedback information.

According to these embodiments, unused resource blocks are, for example, detected by a mobile communication device, for example UE1 known from FIGS. 1-3. For example, user equipment UE1 listens to a resource (for example, monitors one or more wireless resource units) for detecting unused resource block pools (or unused wireless resource units). If such an unused resource block pool is found by UE1, the feedback is transmitted on this empty resource.

For example, congestion control in vehicle to everything, V2X, may be performed according to these embodiments by detecting if a physical resource is used by other V2V user equipment in order prevent collisions. For example, in some embodiments a mechanism which is (substantially) identical to congestion control used in vehicle-to-everything-communication may be used to detect an unused (or at least partially unused) wireless resource. The CR is one of the metrics used to determine the occupancy of a physical resource.

Figure 20:
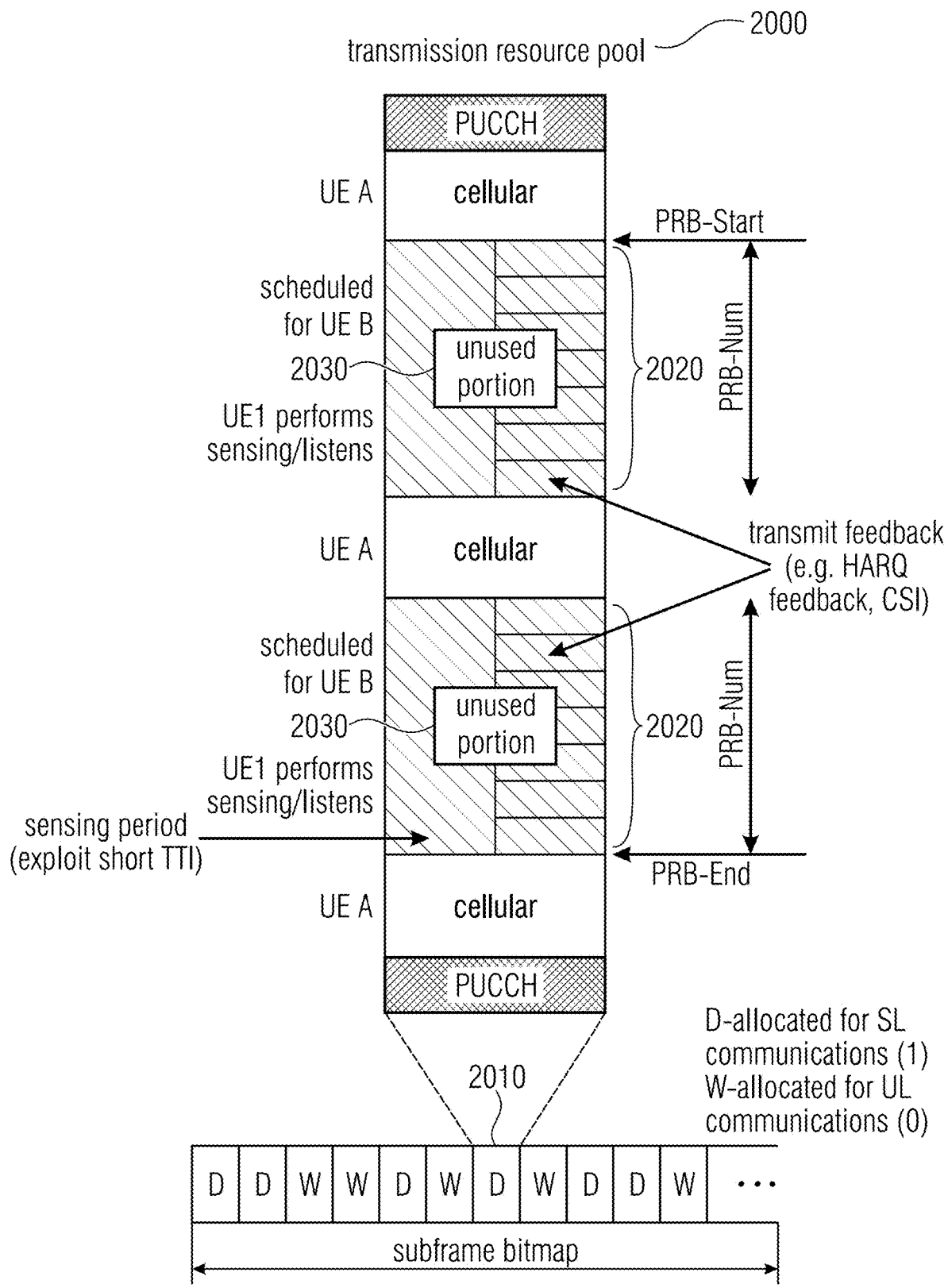
FIG. 20 shows a schematic diagram of a slot of a subframe allocated for sidelink communications according to an embodiment of the present invention.

FIG. 20 illustrates the concept of the "listen before transmit" feedback mechanism according to an aspect of the present application. It enables unused scheduled resources of other UEs to be used for sidelink feedback.

In other words, UE1 initially senses the occupancy of UE B (or UE2, or another communication device) on the first part of the subframe (i.e. determines whether UE2 transmits in the first part of the subframe), before transmitting its feedback information on the second part of the subframe. If UE1 detects the "absence" of UE B (or UE2, or another communication device), then the feedback may be transmitted (by UE1) using the resource. It is apparent that the feedback is not limited to only HARQ, but can also include CQI and/or RI and/or PMI, for example in the future likelihood MIMO D2D/V2X unicast transmissions.

In some embodiments, a technique is optionally provided that allows the feedback receiving UE to know which resources to search for this type of dynamic feedback transmission.

Figure 13:
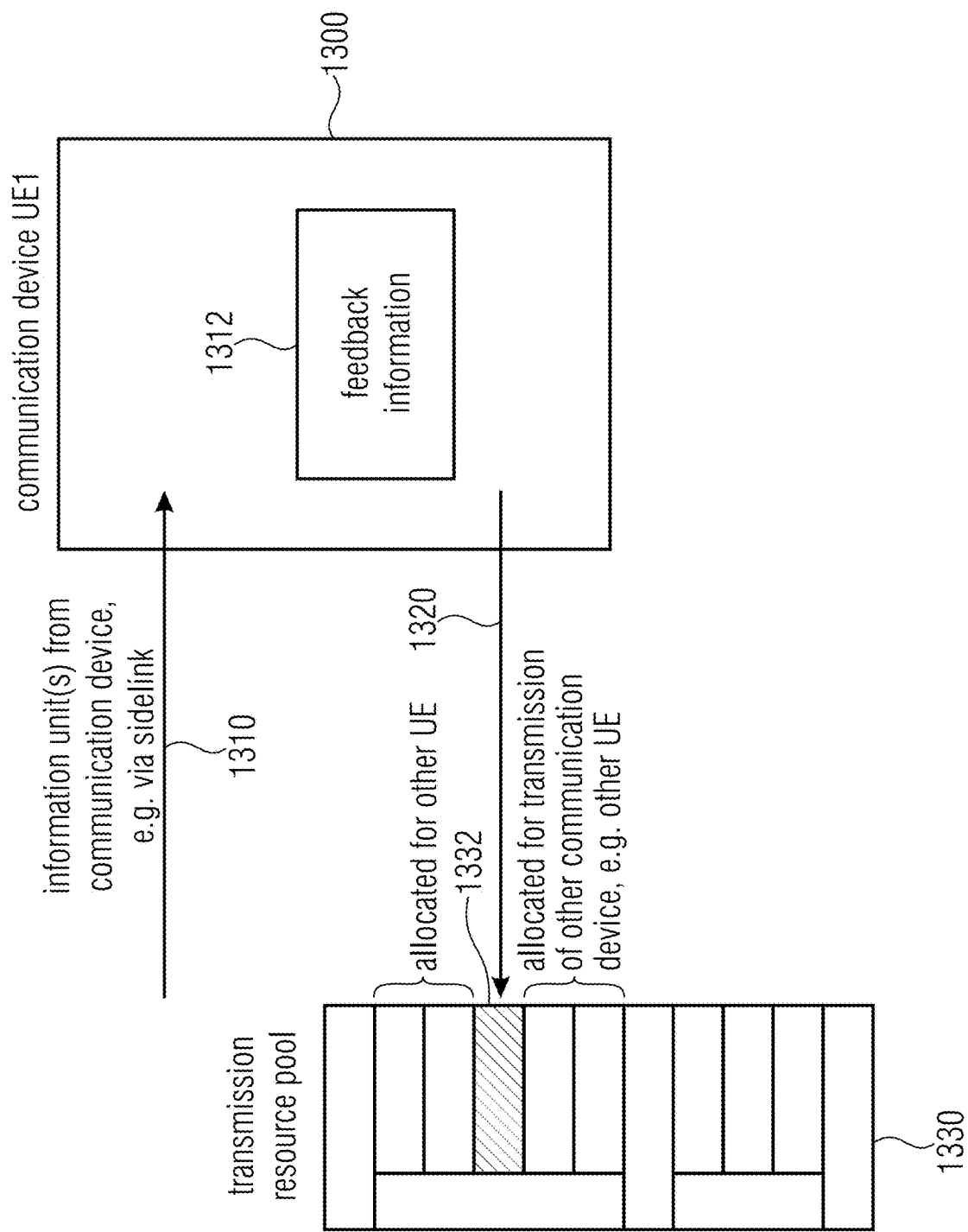
FIG. 13 shows a block diagram of a communication device according to an embodiment of the present invention.

FIG. 13 shows an illustrative communication device 1300 according to the present application, which may be a user equipment UE1, that receives one or more information units 1310, which may be data blocks or packets or control blocks or packets, from a second communication device, for example, user equipment UE2. These information units 1310 may be received via a direct link. Communication device UE1 generates a feedback information 1312, which may for example be an acknowledgement message. It is also possible that the feedback information 1312 is (or comprises) a channel quality indicator, and/or a rank indicator, and/or a precoding matrix indicator and/or channel state information. This feedback information 1312 is then transmitted (by an appropriate signal 1320) in a wireless resource unit, e.g., of a resource block pool or transmission resource pool 1330, that is reserved (e.g. preferentially or prior-rankingly) for a transmission of a different communication device but is not used or only partly used. The resource block pool 1330, which may be a transmission resource pool, is explained in greater detail in connection with FIGS. 20 and 21. In general, such a transmission resource pool 1330 comprises portions (e.g. wireless resource units) that may be reserved, that means allocated or scheduled by a base station for a certain communication device (or for preferential use by the certain communication device). In situations where a part 1332 of the transmission resource pool 1330, a wireless resource unit, is reserved for a communication device (or for preferential use by the communication device), but not used or only partly used by this communication device, it is possible that the unused part 1332 of the transmission resource pool 1330, namely the unused wireless resource unit, is used for transmitting the above mentioned feedback information. In this regard, FIG. 13 shows that the feedback information 1312 is inserted by the communication device 1300 into an unused part of the transmission resource pool 1330 (even though this part is reserved or allocated for preferential use by another communication device).

Figure 14:
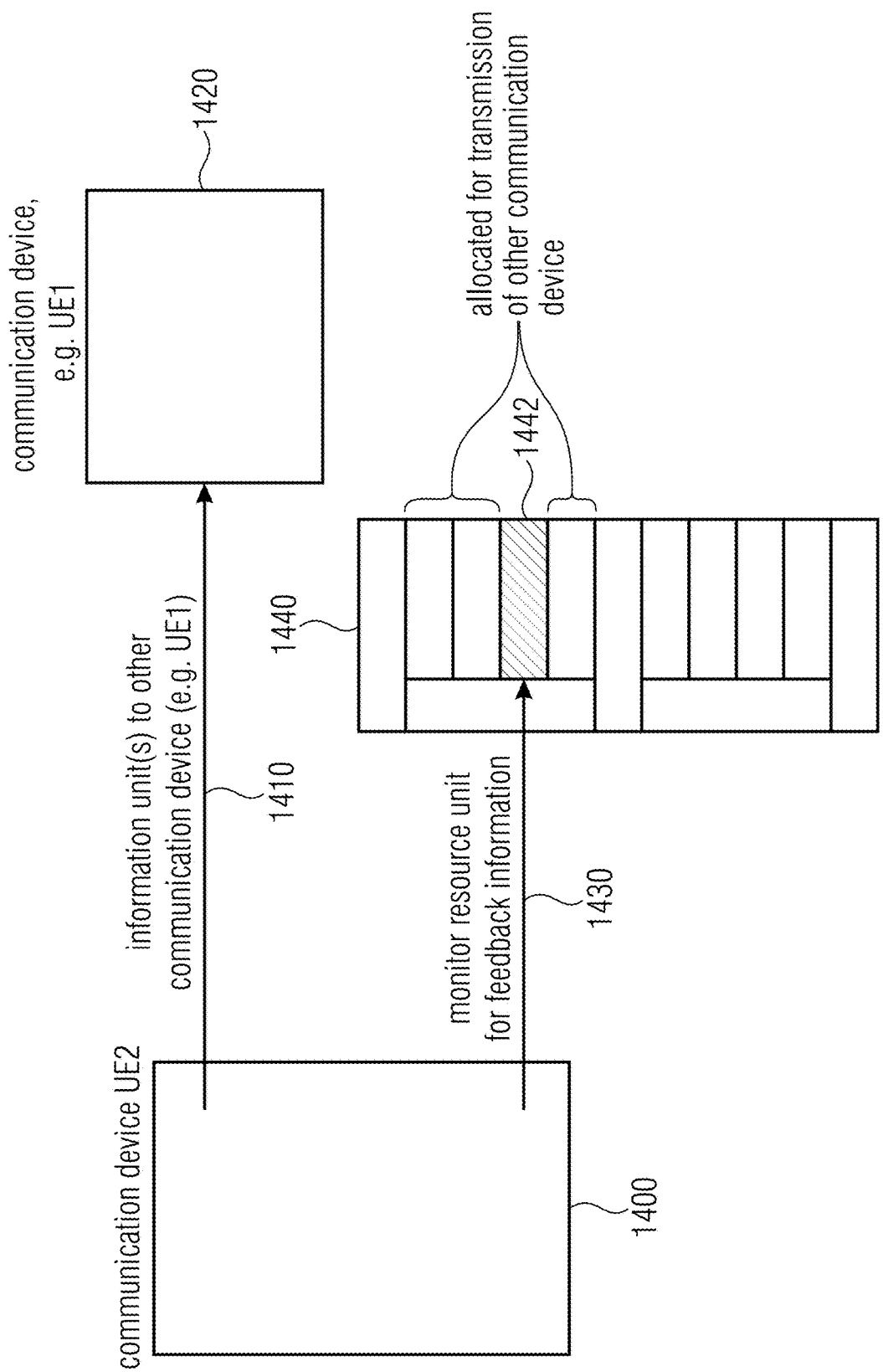
FIG. 14 shows a block diagram of another communication device according to another embodiment of the present invention.

FIG. 14 shows another embodiment following this concept, namely that a communication device 1400, which may be user equipment UE2, transmits information units 1410 to other communication devices, for example, user equipment 1420, e.g. UE1. This transmission may be performed directly via a sidelink. Communication device 1400 monitors a resource unit 1442, which may be a wireless resource unit. This resource unit 1442 may be a part of a transmission resource pool 1440, and this wireless resource unit 1442 is not allocated to the other communication device, e.g., UE1, but reserved for a different communication device (or reserved for preferential use by the different communication device). The monitoring comprises monitoring 1430 the resource unit for feedback information from the other communication device (even though the resource unit is reserved for preferential use by the different communication device).

Using this technique, feedback information can be transmitted to the communication device 1400 using a resource unit 1442 that is unused or at least partly unused.

Figure 15:
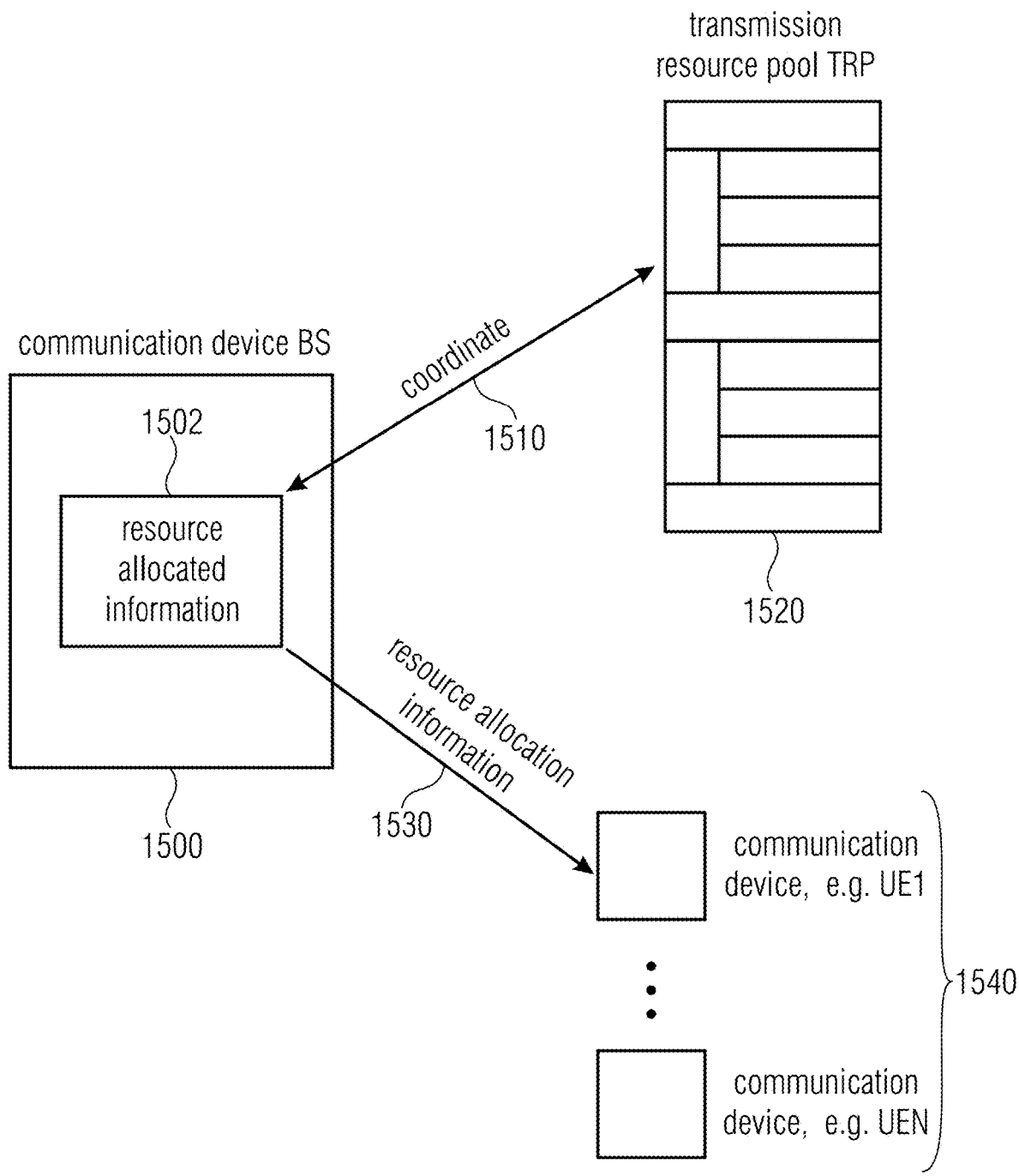
FIG. 15 shows a block diagram of a communication device according to a further embodiment of the present invention.

FIG. 15 shows a further embodiment according to the present application, where a communication device 1500, which may be a base station BS, coordinates 1510 a resource allocation, e.g., of the resources of a transmission resource pool, TRP, 1520. Communication device 1500 communicates with communication devices 1540 for which the communication device 1500 has coordinated the resource allocation. The communication device 1500 provides a resource allocation information 1502 to these communication devices 1540, wherein the resource allocation information 1502 describes an allocation of wireless communication resources to different communication devices and indicates which wireless communication resources are useable for a transmission of feedback information by other communication devices 1540. In particular, communication device 1500 may for example signal that wireless communication resources which are reserved for preferential use by a given communication device are also usable for a signaling by other communication devices which are different from the given communication device. In this manner, the communication device 1500 may authorize—by an appropriate signaling-a lower-ranking usage of wireless communication resources for signaling if these communication resources are not used by the devices which are scheduled as prior-ranking users of the respective wireless communication resources.

Figure 16:
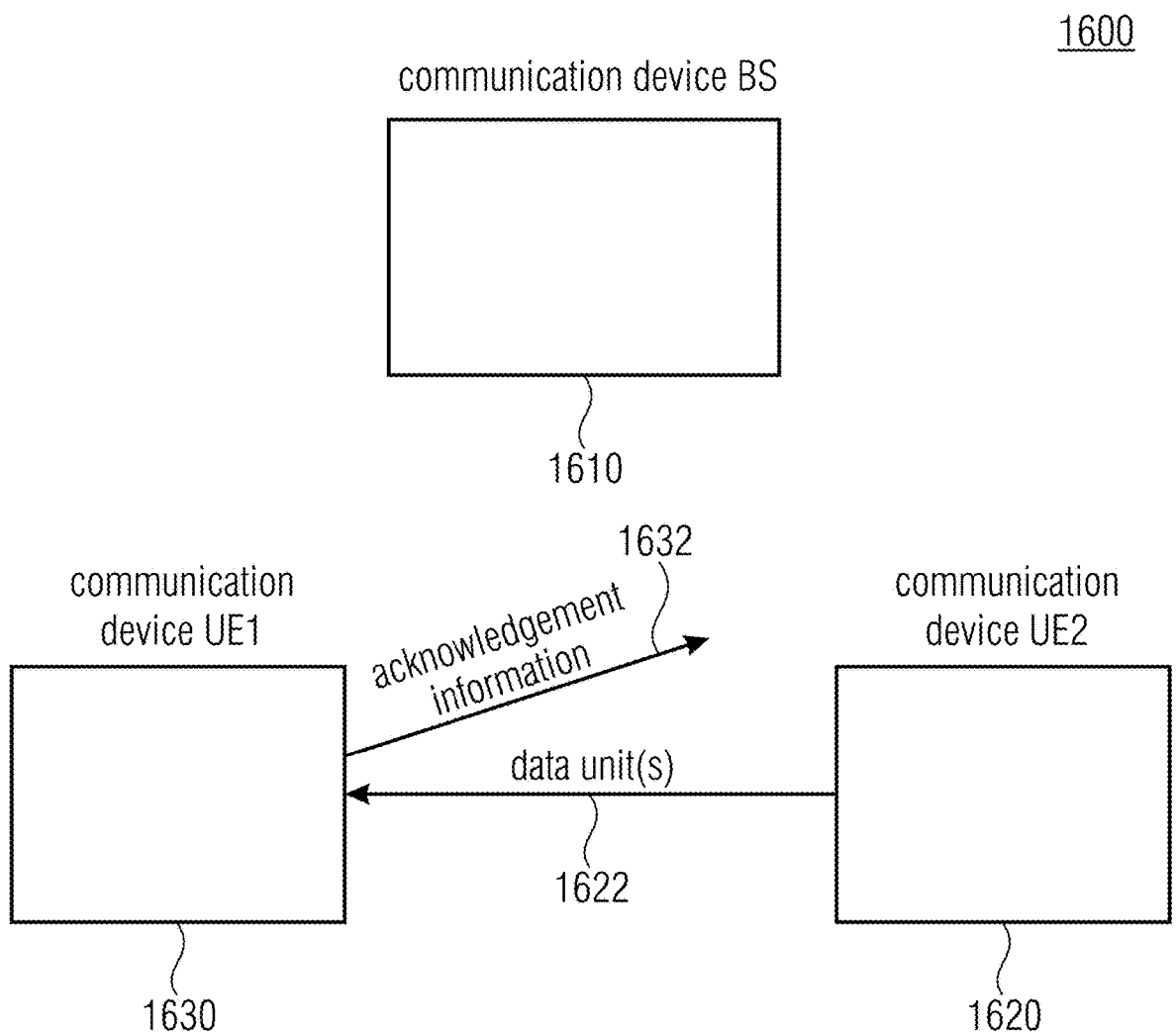
FIG. 16 shows a conceptual arrangement of a system according to a further embodiment of the present invention.

FIG. 16 shows a conceptual arrangement of a system 1600 comprising a communication device 1610 serving as a base station (for example having the functionality of the base station 1500 as described with reference to FIG. 15), a communication device 1620 serving as a data sender communication device (for example, having the functionality of the communication device 1400 as described with reference to FIG. 14), and a communication device 1630 acting a data receiver communication device (for example, having the functionality of the communication device 1300 as described with reference to FIG. 13). The data sender communication device 1620, for example, UE2, transmits one or more data units 1622 directly to the data receiver communication device 1630, e.g., UE1, via a sidelink. The data receiver communication device 1630 transmits an acknowledgement information 1632 that signals whether the information unit has been properly received or not. Here, data receiver communication device 1630 may use a wireless communication resource reserved for transmission of another wireless communication device for the signaling.

Figure 17:
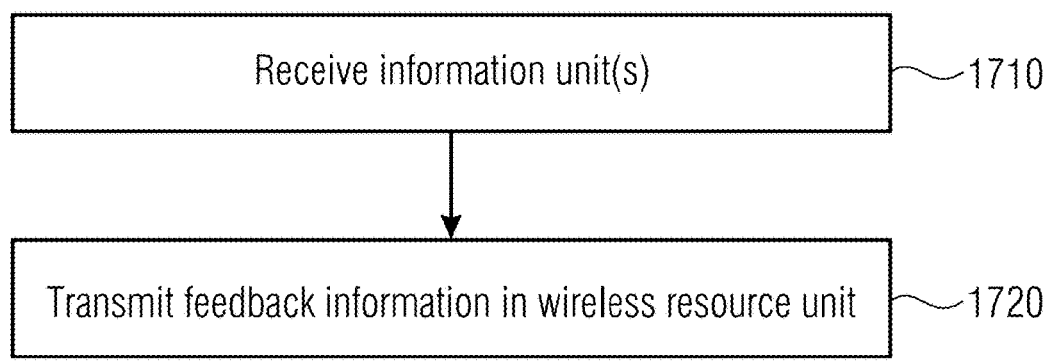
FIG. 17 shows a flow chart of a method for a communication device, e.g. an user equipment, according to an embodiment of the present invention.

FIG. 17 shows a flow chart of a method that may be performed by a communication device, for example by user equipment UE1, e.g. known from FIG. 13. The method comprises, in step 1710, that one or more information units are received at communication device UE1 from a second communication device, which may be UE2. UE1 then transmits feedback information in a wireless resource unit which is reserved for transmission of a different communication device but which is not or only partly used by the different communication device. By this technique, unused bandwidth can be used and feedback information can be transmitted without the need of allocating bandwidth to the communication device UE1 for transmitting the feedback information.

Figure 18:
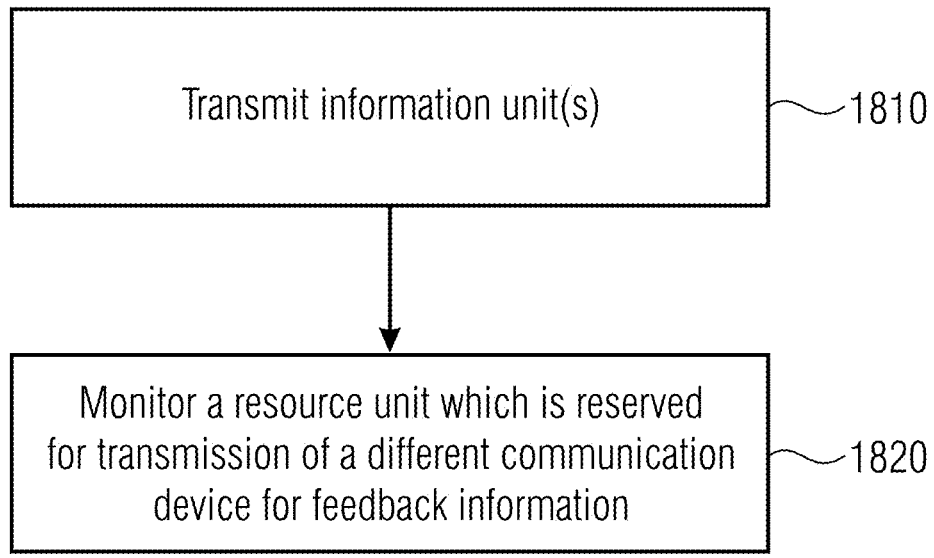
FIG. 18 shows a flow chart of a method for a communication device, e.g. an user equipment, according to a further embodiment of the present invention.

FIG. 18 shows a method that may be performed by a communication device, for example user equipment UE2, e.g. known from FIG. 14. Communication device UE2 transmits one or more data units to another communication device, which may be UE1, in step 1810. This transmission may be performed directly via a sidelink, e.g., without involving a base station. Communication device UE2 monitors in step 1820 a resource unit that is not allocated to the another communication device, but reserved for transmission of a different communication device for feedback information from the other communication device. By this way, the communication device UE2 monitors for the feedback information and may extract the feedback information that is destined for this communication device without having to allocate a resource unit for transmitting this feedback information.

Figure 19:
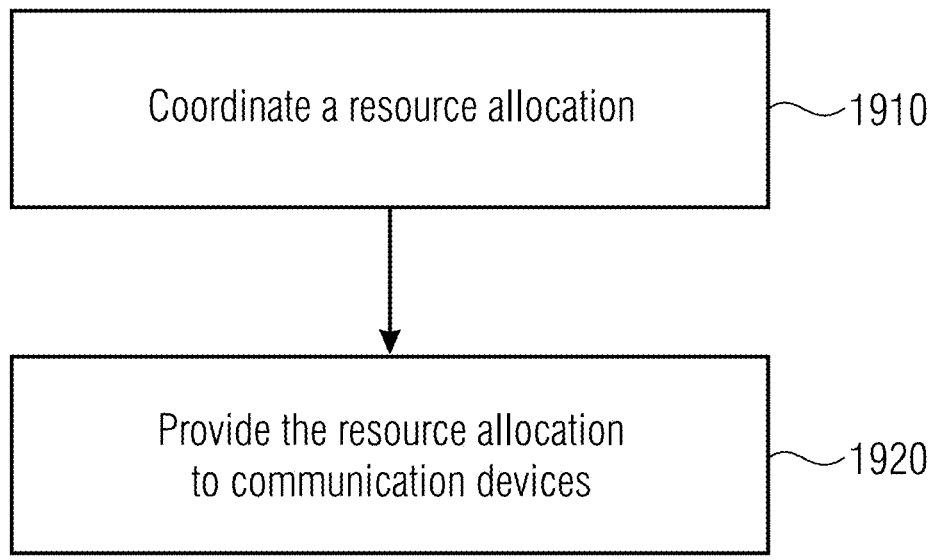
FIG. 19 shows a flow chart of a method for a communication device, e.g. a base station, according to another embodiment of the present invention.

In FIG. 19, a method is illustrated for a communication device, which may be a base station, for example, a gNB, e.g. known from FIG. 15. The communication device BS coordinates in step 1910 the resource allocation of a plurality of communication devices. The communication device BS provides in step 1920 a resource allocation information corresponding to the coordinated resource allocation, to the plurality of communication devices, wherein the resource allocation information describes an allocation or wireless communication resources to different communication devices and indicates which wireless communication resources are usable for transmission of feedback information by other communication devices.

FIG. 20 shows the structure of a transmission resource pool 2000 conceptually, namely an overview of a slot 2010 of a subframe. The slot 2010 is allocated for sidelink communications. In this particular example, the resources 2020 (for example, one or more groups of frequency ranges of a time-frequency grid, or one or more groups of orthogonal codes; generally speaking one or more blocks of wireless resource units 2022) scheduled for use by user equipment B may be completely unused, depicted by label 'unused portion' 2030. This can be detected by the user equipment 1 listening or sensing the respective resource. When it is sensed (e.g. by UE1) that the resource is unused, user equipment 1 uses the unused resource for feedback transmission. For example, a first part (or a first half) of the respective wireless resource units (for example, one or more sTTIs in an initial part of a 5G communication frame) may be used as a sensing period. In other words, UE1 may, for example, listen to the first or initial part of a wireless resource unit (for example, of a wireless resource unit allocated to another device for prior-ranking use, and signaled as being usable for signaling in a lower-ranking manner), and may transmit a signaling information in a later part (for example, in a second part or in a second half) of said wireless resource unit if the listening or "sensing" performed in the first part indicated a non-usage of the wireless resource unit.

Figure 21:
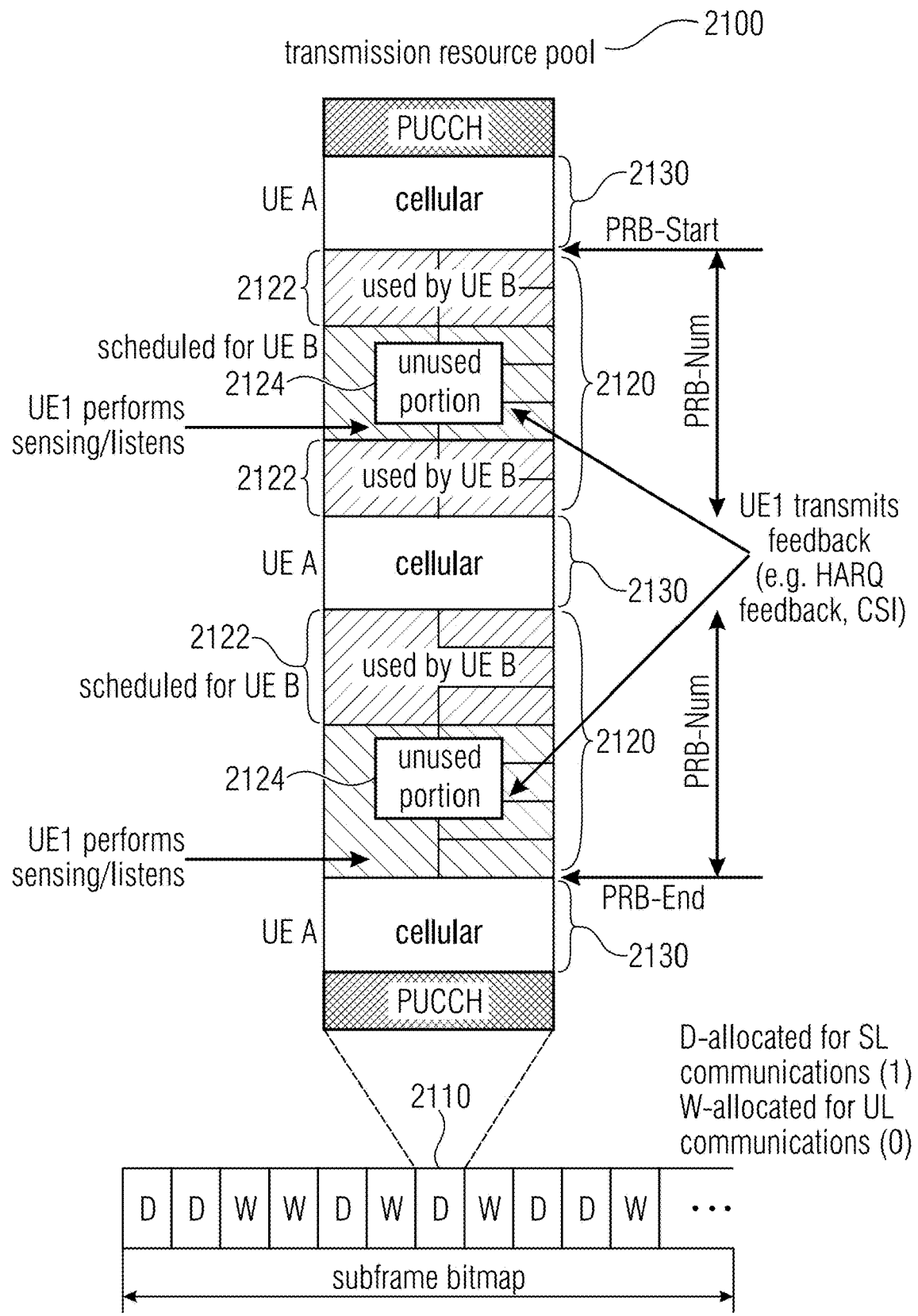
FIG. 21 shows a conceptual overview over the structure of a transmission resource pool for an embodiment of the present invention.

FIG. 21 shows a conceptual overview over the structure of a transmission resource pool 2100. As apparent from FIG. 21, the transmission resource pool 2100 is part of a subframe, in this case it is belonging to a slot 2110 allocated for sidelink communications. A part 2130 of the transmission resource pool (which may, for example, comprise multiple non-contiguous resource regions) is scheduled for user equipment UE A, the other part 2120 (which may, for example, comprise multiple non-contiguous resource regions) is scheduled for user equipment UE B. The part scheduled for UE B is not fully used by UE B, there are used portions 2122, but there are also unused portions 2124. A further user equipment, for example, UE1 performs a sensing/listening for such unused portions 2124. When UE1 has feedback information to be transmitted, for example HARQ feedback information or CSI information, the unused portions 2124 of the TRP 2100 may be used for transmitting this feedback information.

Again, in other words, according to an embodiment, e.g. as shown FIG. 20, it may be possible to search all resource block pools that are totally, i.e., 100% unused by UE B. As an example, resource block pools that are totally (100%) unused by UE B or by any other UE may be designated by the wording "unused portion" as shown in FIG. 20. In another embodiment, e.g. as shown in FIG. 21, it is not required that the resource block pools are totally unused, but also partially unused resource block pools are searched for. This is depicted in FIG. 21 where it is shown that a part of the transmission resource pool is used by UE B. Like in FIG. 20, UE1 performs sensing/listening and transmits feedback information like HARQ feedback or CSI on the detected unused portion of the resource.

The transmission resource pool shown in FIGS. 20 and 21 may, for example, be a physical resource block, PRB (e.g. of a 5G communication system).

In another embodiment, the UE receiving feedback may not search/sense all allocated reception pools (or all possible resources). For example, a rule can be devised at the UE transmitting the feedback and the UE receiving the feedback (wherein the "rule" may, for example be provided by the base station, for example in the form of a signaling of resources usable for signaling). As an example, this rule may include (for example a signaling) where the feedback is included and where it is to be searched for the feedback. For example, a signaling from a managing communication device may indicate which wireless resource units are usable for feedback.

According to an optional aspect of the present application, in order for the receiving UE, i.e., UE2 to dynamically detect the transmitted feedback from UE1, the base station may allocate this UE specific search space for the feedback to UE2. This may avoid the overhead for the feedback-receiving UE to blindly detect (or search) all sidelink resources for the feedback from UE1. The base station can allocate this UE specific search space according to the traffic or utilization of the resources, e.g., if certain aperiodic ultra-reliable low latency URLLC sidelink traffic is only used by 60% of the time compared to the periodic sidelink resources which are used 95% of the time, the base station would appropriately define the UE specific search space to be in the URLLC sidelink resources. The feedback receiving UE will search only the subset of resources relating to URLLC sidelink traffic. This may help to reduce the overhead and hence help to reduce the CPU load.

As mentioned before, for example, the allocation may also include resource block pools that are partially used by UE B.

In embodiments, unused PC5 resources may be used for one of the following:

transmitting HARQ feedback on PC5
  by listening on a first part of a subframe if this part is being used, and, if the first part not used, the second part of the subframe is used for transmitting the feedback. This mechanism may be used for HARQ or CSI reporting, any combination of sTTI or mini-slots. (It is noted that a similar mechanism has been mentioned in V2X and could optionally be used in embodiments according to the present invention. Transmission in the second part might cause problems to the automatic gain control, AGC, of legacy UEs, but devices used in the Internet of Things, IoT, might not have an AGC)

transmitting the embedded transmission of the feedback within the resource block pools for both the PSCCH and PSSCH in conjunction with the subframe bitmap may be examined and considered.

Bundled Broadcast HARQ to Multiple Transmitting UEs (D2D/V2X Bundled HARQ)

In the following, some other embodiments according to aspects of the invention will be described.

It is of course also possible that a communication device performs a device-to-device communication with many other communication devices. In this case, the device receiving multiple unicast transmission from other communication devices has to provides feedback information, like the HARQ feedback mentioned before, to the other communication devices.

Figure 22:
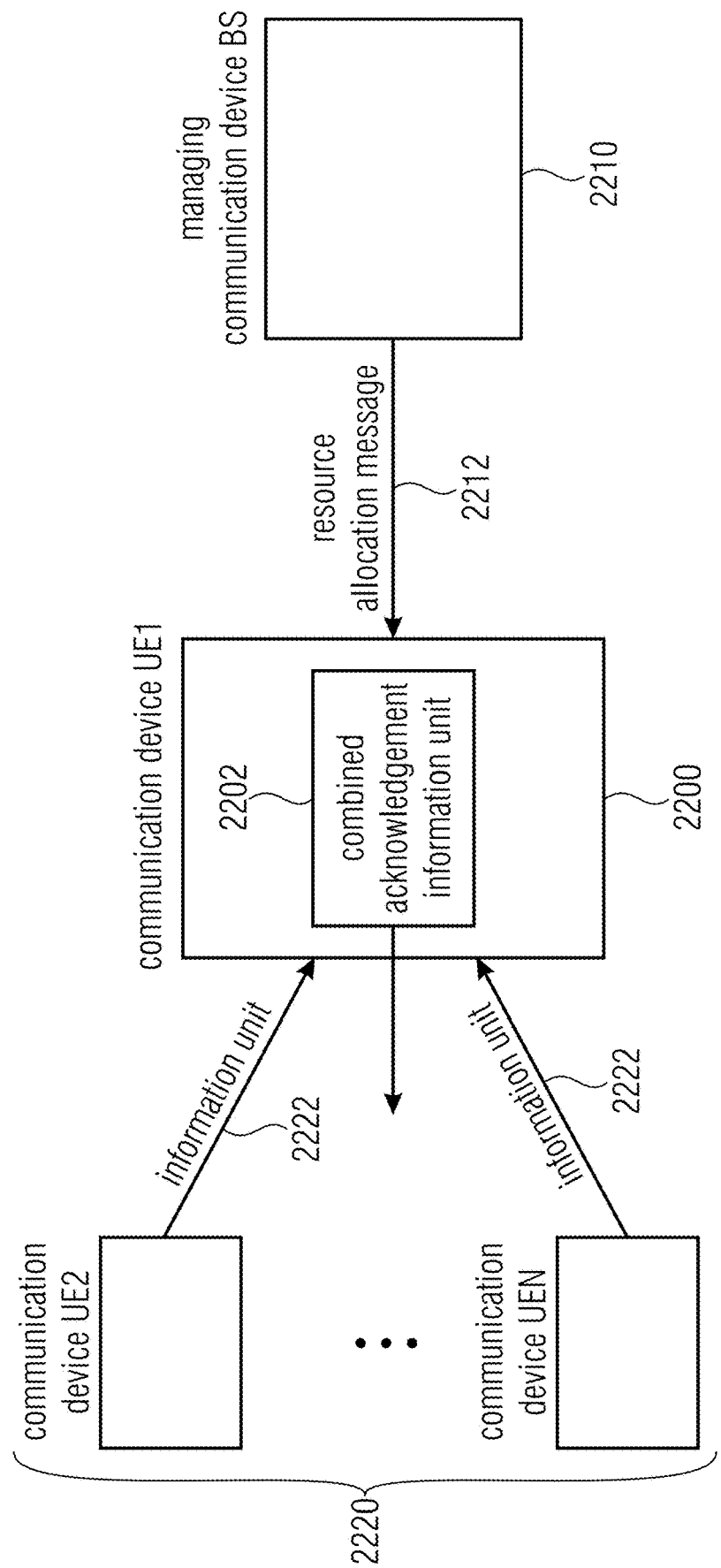
FIG. 22 shows a conceptual drawing of a communication device, e.g. a user equipment, according to an embodiment of the present invention.

FIG. 22 shows a conceptual drawing of a communication device 2200, for example, user equipment UE1 that receives one or more information units 2222 from a plurality of other communication devices 2220. These information units 2222 may be received via direct link without an involvement of a base station. Communication device 2200 receives a resource allocation message 2212 from a managing communication device 2210, which may be a base station BS. The resource allocation message 2212 defines an allocation of bit positions associated with an acknowledgment of information units received (e.g. by UE1) from the plurality of other communication devices 2220 in a combined acknowledgement information unit 2202. The communication device 2200 transmits such a combined acknowledgement information unit 2202 in response to the reception of the information units 2222 from the plurality of other communication devices 2220 using the allocation of bit positions defined in the resource allocation message. In this way, communication device 2200 can provide feedback information to the other communication devices 2220 from which it has received the information units 2222, and can signal in this way whether or not the information units have been properly received or not, for example. The communication device 2200 may, optionally, be supplemented by and of the features and functionalities described herein, either individually or in combination.

Figure 23:
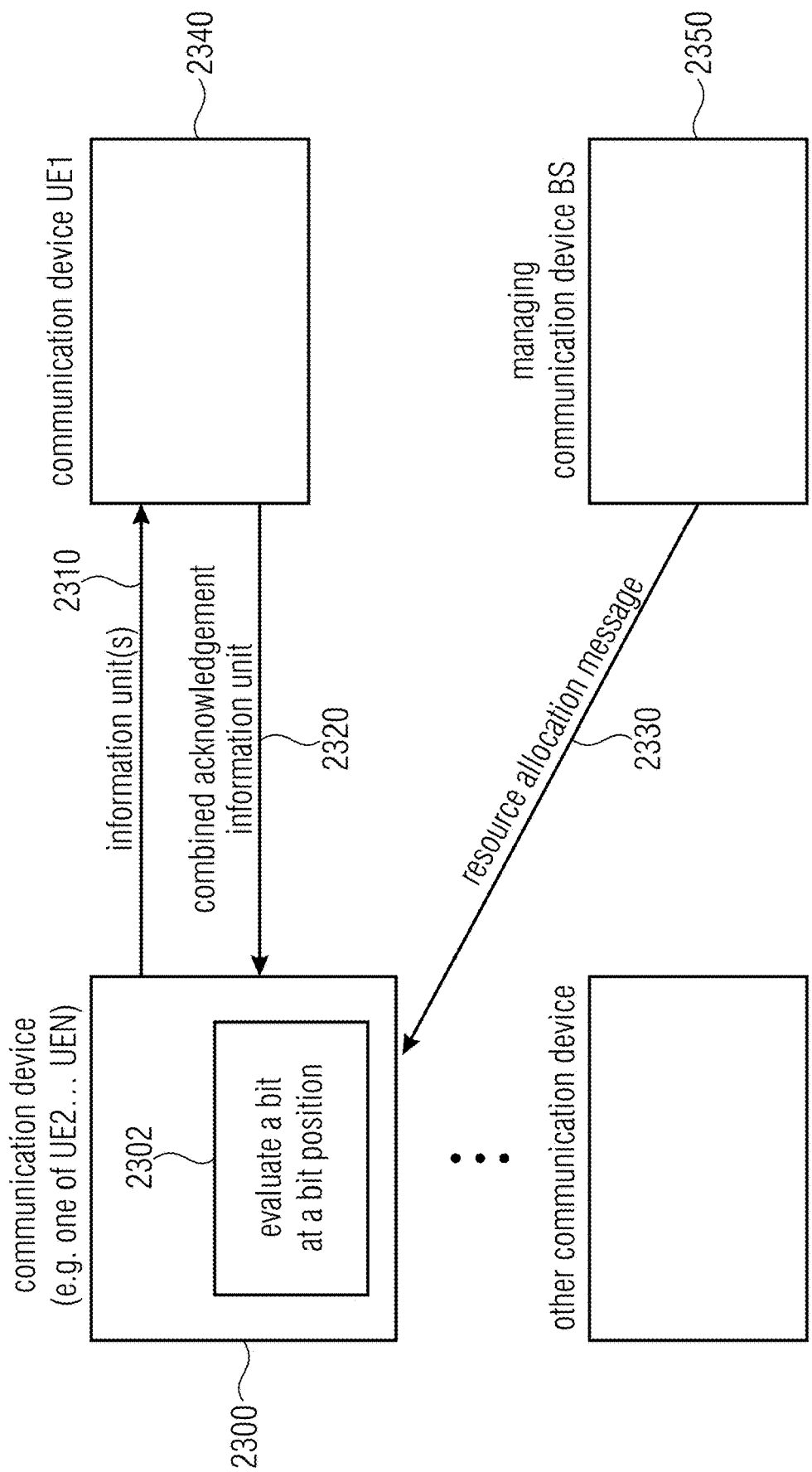
FIG. 23 shows a conceptual drawing of a communication device, e.g. a user equipment, according to an embodiment of the present invention.

FIG. 23 shows a communication device 2300, which may be a user equipment of a plurality of user equipments. The communication device 2300, for example, a user equipment, e.g. UE2, transmits one or more information units 2310 to another communication device 2340, which may be user equipment UE1, for example directly via a sidelink without involving a base station. Communication device 2300 receives a resource allocation message 2330 from a managing communication device 2350, e.g. a base station BS, the resource allocation message defining an allocation of bit positions associated with an acknowledgement of information units received by the other communication device UE1 in a combined acknowledgement information unit. Communication device UE2 receives such a combined acknowledgement information unit 2320 and evaluates (box 2302) a bit at a bit position defined by the resource allocation message 2330 to derive an information whether one or more information units transmitted by the communication device 2300 have been properly received by the other communication device 2340 or not. In this way, an efficient signaling of feedback information is provided. The communication device 2300 may, optionally, be supplemented by and of the features and functionalities described herein, either individually or in combination.

Figure 24:
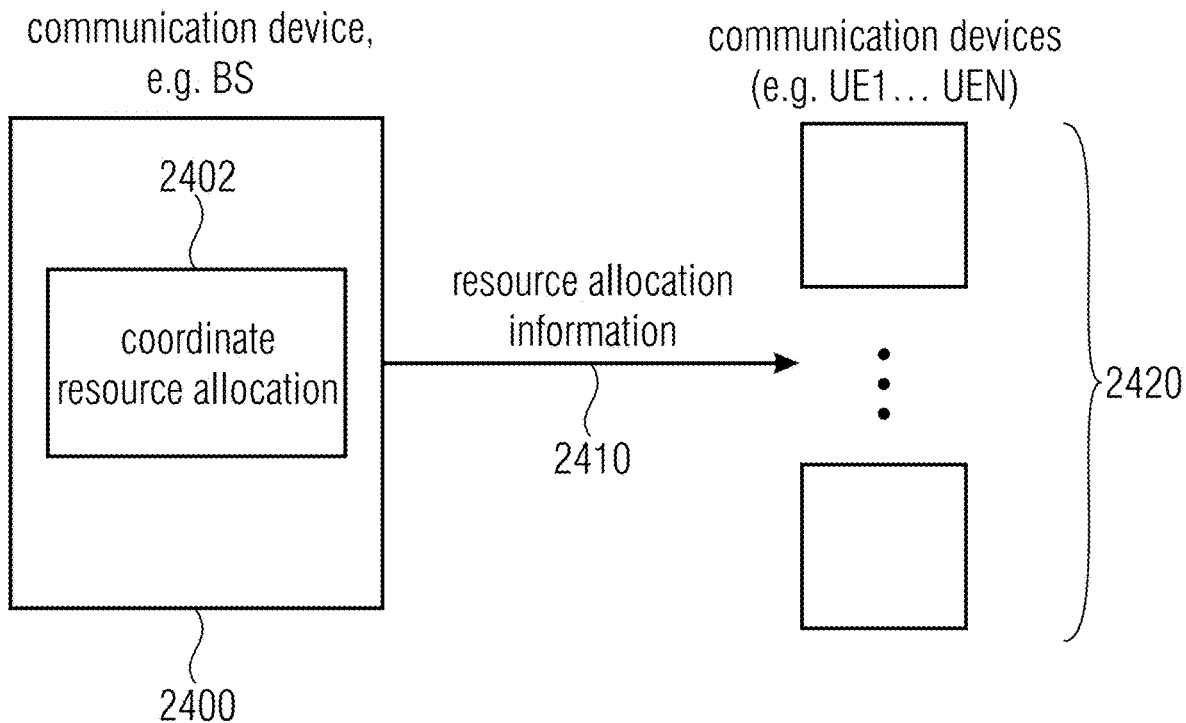
FIG. 24 shows a conceptual drawing of a communication device, e.g. a base station, according to an embodiment of the present invention.

FIG. 24 shows a conceptual communication device 2400 which may be the before mentioned managing communication device, e.g., a base station BS of FIGS. 22 and 23. Communication device 2400 coordinates (box 2402) the resource allocation of resources to a plurality of communication devices 2420, and communicates with this plurality of communication devices. Communication device 2400 provides a resource allocation information 2410 to the plurality of communication devices 2420, the resource allocation information 2410 defining an allocation of bit positions associated with an acknowledgement of information units received by a given communication device, e.g., UE1, from a plurality of other communication devices 2420, e.g., UE2 to UEN, in a combined acknowledgement information unit to be transmitted in response to the reception of information units from the plurality of other communication devices 2420.

The communication device 2400 may, optionally, be supplemented by and of the features and functionalities described herein, either individually or in combination.

Figure 25:
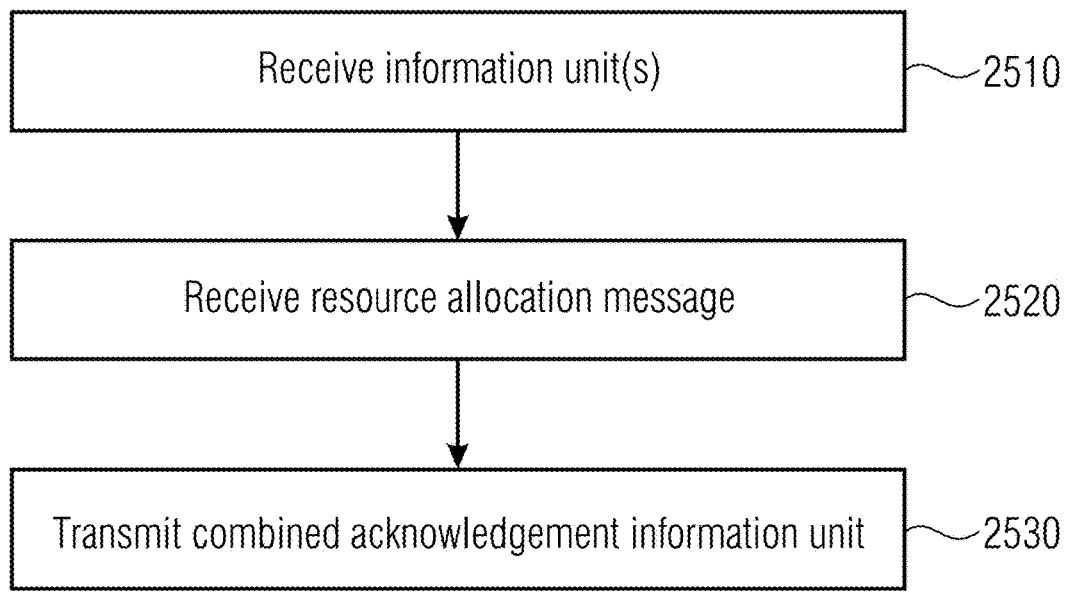
FIG. 25 shows a flow chart of a method for a communication device, e.g. a user equipment, according to an embodiment of the present invention.

FIG. 25 shows an illustrative method for a communication device, for example user equipment UE1 of FIG. 22. In step 2510, one or more information units are received from other communication devices, e.g., UE2 to UEN, the reception may be performed via direct links. Communication device UE1 receives a resource allocation message from a managing communication device, which may be communication device BS. The resource allocation message defines an allocation of bit positions in a combined acknowledgement information unit, the bit positions being associated with an acknowledgement of information units received from the plurality of other communication devices. Communication device UE1 transmits a combined acknowledgement information unit using the allocation of bit positions defined in the resource allocation message. In this way, a signaling of feedback information to the other communication devices is provided.

Figure 26:
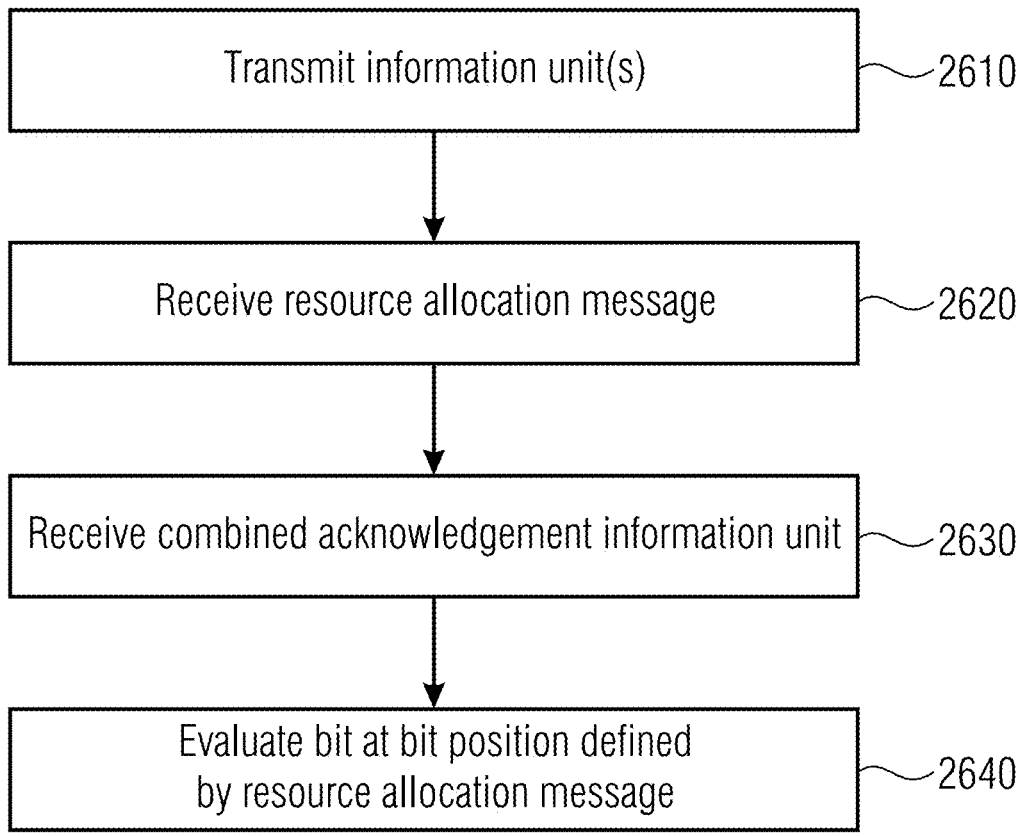
FIG. 26 shows a flow chart of a method for a communication device, e.g. a user equipment, according to an embodiment of the present invention.

FIG. 26 provides a method for a communication device, for example user equipment UE2 of FIG. 23, of a plurality of user equipments, that transmits one or more information units to another communication device, for example, user equipment UE1. Communication device UE2 receives a resource allocation message from a managing communication device, the managing communication device may be a base station. The resource allocation message defines the allocation of bit positions in a combined acknowledgement information unit as described above. Communication device UE2 receives a combined acknowledgement information unit, and evaluates a bit at a bit position defined by the resource allocation message in order to derive an information whether the one or more information units have been properly received by the other communication device or not.

Figure 27:
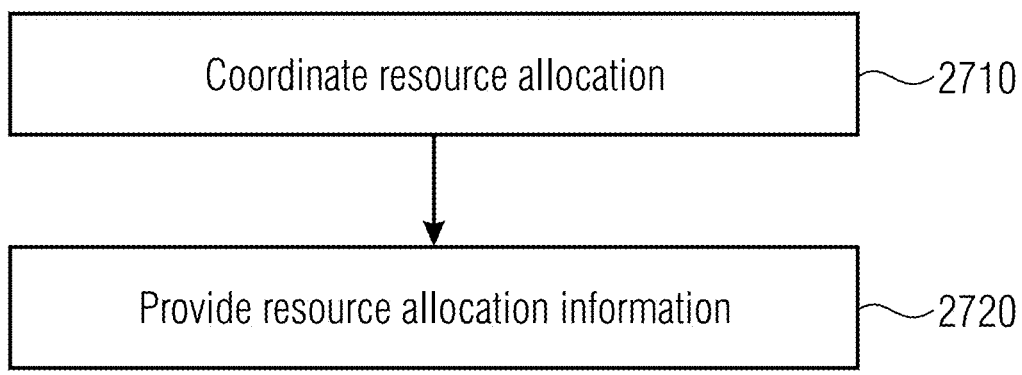
FIG. 27 shows a flow chart of a method for a communication device, e.g. a managing communication device, according to an embodiment of the present invention.

FIG. 27 shows a method for a communication device, which may be a managing communication device e.g. the base station BS of FIG. 24. Communication device BS coordinates the allocation of resources to a plurality of communication devices. The communication device BS provides a resource allocation information to the plurality of communication devices, the resource allocation information defines the allocation of bit positions associated with an acknowledgement of information units received by a given communication device in a combined acknowledgement information unit to be transmitted in response to the reception of information units.

Figure 28:
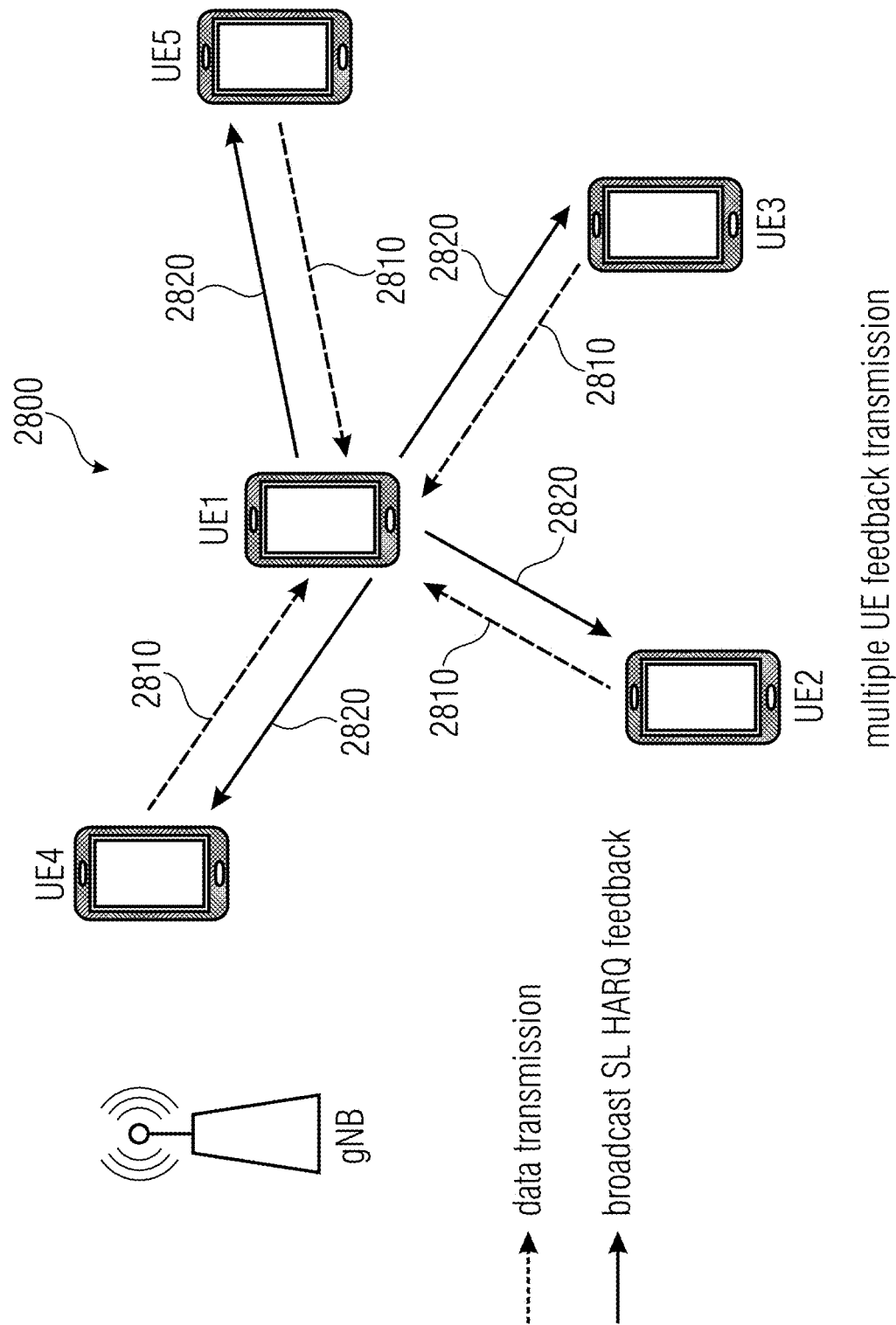
FIG. 28 shows an overview of a system comprising a plurality of communication devices according to an embodiment of the present invention.

FIG. 28 show a conceptual overview of a system 2800 comprising a plurality of communication devices, the communication devices being user equipments UE1 to UE5 and a base station gNB (which may, for example correspond to communication device 2400 mentioned above). Communication device UE1 (which may, for example correspond to communication device 2200 mentioned above) receives multiple data transmissions 2810 from user equipments UE2 to UE5 (which may, for example correspond to communication device 2300 mentioned above) and also provides multiple feedback transmissions 2820 as a broadcast sidelink HARQ feedback. For providing this feedback, the combined acknowledgement information unit as described above is used.

In the following, some alternative embodiments according to the invention and further details will be described.

A mobile communication device, like UE1 shown in FIG. 28, which is enabled to perform D2D or V2X, is expected to receive multiple unicast transmissions from a number of transmitting UEs depending on the number of allocated reception pools. In effect, single, multiple, transfer blocks, TBs, from different UEs which each need a feedback like the HARQ feedback discussed above. In order to provide such feedback, an asynchronous and adaptive approach for scheduling the HARQ feedback transmissions of multiple transmitting UEs is desired. Currently, the receiver processing time of a UE is approximately 3 ms, making the next possible transmission of feedback at n+4 subframes, where the $n^{th}$ subframe contained the original transmission.

According to an aspect of the application, in the case of high latency applications, UE1 can consider the broadcast of its feedback 2820 to multiple UEs in its vicinity like UE2 to UE5 shown in FIG. 28. FIG. 28 shows a system comprising five communication devices UE1 to UE5, which perform sidelink communications. A base station, gNB, is also depicted but does not participate in the communication among the mobile devices. This does not necessarily mean that the base station may be not necessary for this system, because some functionalities, like resource allocation, may be performed by the base station. The transmitting UEs, that means UEs 2-5, may, for example, blindly decode their respective feedback from the bundled feedback using UE-specific scrambling sequences. However, this is not essential. Furthermore, if all or most of the initial unicast transmissions 2810 from UEs 2-5 occur within a certain time interval, according to an embodiment, it would be beneficial from UE1's perspective, in terms of feedback overhead to broadcast it in a bundled fashion to the surrounding UEs. According to an aspect, there may be a content and resource allocation of broadcast messages, for example, defined in a resource allocation information.

In the following, a resource allocation for a HARQ broadcast message is discussed. There are two scenarios.

Figure 29:
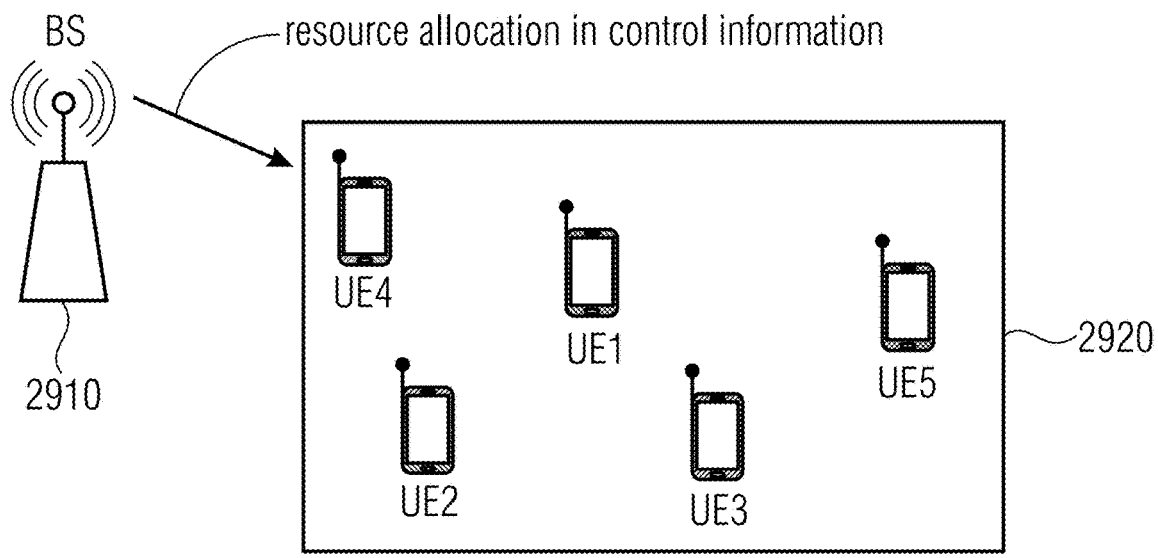
FIG. 29 shows a diagram of option 1 of a group multicast HARQ resource allocation according to an embodiment of the present invention.
Figure 29:
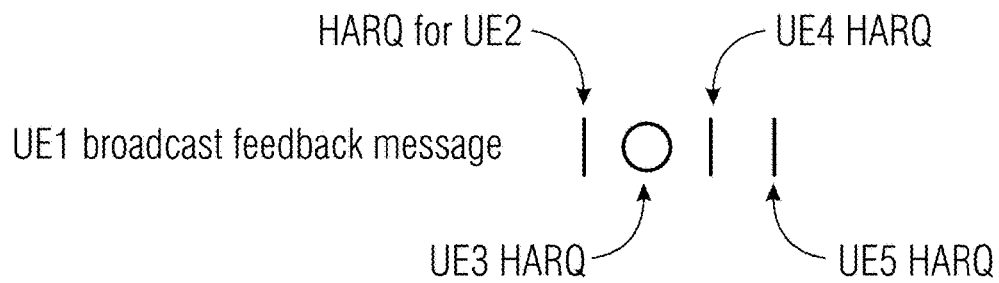

In scenario 1, possible resource allocation mechanisms and possible broadcast message structures which can be used in embodiments of the invention of the application are described. A base station multicasts the HARQ resource allocation, HARQ bit position, message size and so on via a group DCI. This may be a new DCI format. This information is multicast/groupcast to all UEs for the transmission and reception of the HARQ broadcast message. The base station, for example, includes the following elements in the multicast/groupcast control message:

a. sidelink transmission resources for which to transmit the broadcast HARQ feedback message for UE1, and/or b. sidelink reception pool resources for which to receive the broadcast HARQ feedback message from UE1 and/or c. HARQ bit position information for each HARQ feedback based on the transmissions received from the UE2 to UE5. FIG. 29 shows an illustrative structure and/or d. message size of aggregated HARQ feedback, which depends on the number of UEs that have transmitted to UE1 within a short period.

FIG. 29 shows an illustrative scenario for an HARQ broadcast feedback resource allocation and message structure. In this example, a group multicast/groupcast HARQ resource allocation is shown. The resource allocation is transmitted in control information. The base station 2910 may transmit this information to the user equipment of user equipments 2920. The information indicates the resource that can be expected to carry the HARQ information and bit positions for each user equipment 2920. The HARQ resource may be pre-allocated after UE2-5 have transmitted.

In other words, FIG. 29 shows option 1 of a group multicast HARQ resource allocation. The resource allocation is conveyed in control information to the user equipments 2920. It is indicated which resource is expected to have HARQ information, and bit positions for each user equipment are indicated. The HARQ resource is (optionally) reallocated after user equipments 2-5 have transmitted. User equipment UE1 provides a broadcast/multicast/groupcast feedback message, in this particular case the broadcast/multicast/groupcast feedback message may comprise four bits, each bit being assigned to one of the four user equipments that have sent information units to UE1. In the given example, the broadcast/multicast/groupcast feedback message comprises four bits 1011, this may signal an ACK for UE1, UE4, UE5 and a NACK for UE3.

Figure 30:
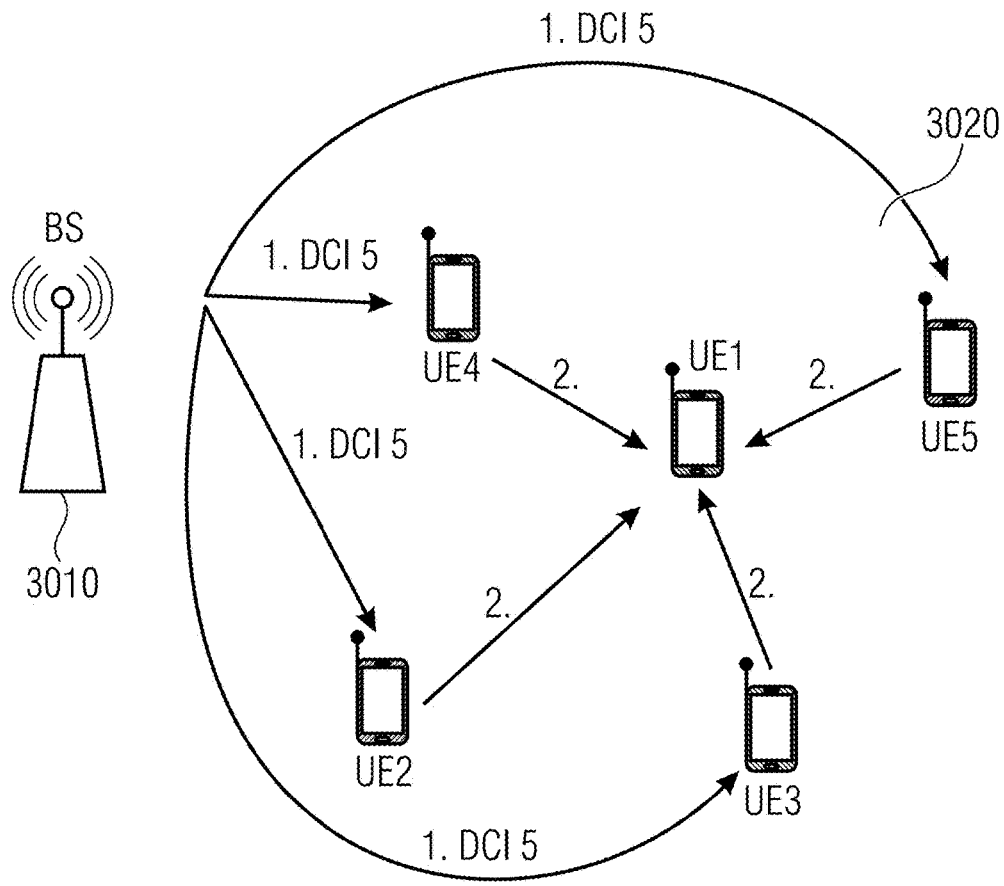
FIG. 30 shows a diagram of option 2 of a HARQ resource allocation via downlink control according to an embodiment of the present invention.
Figure 31:
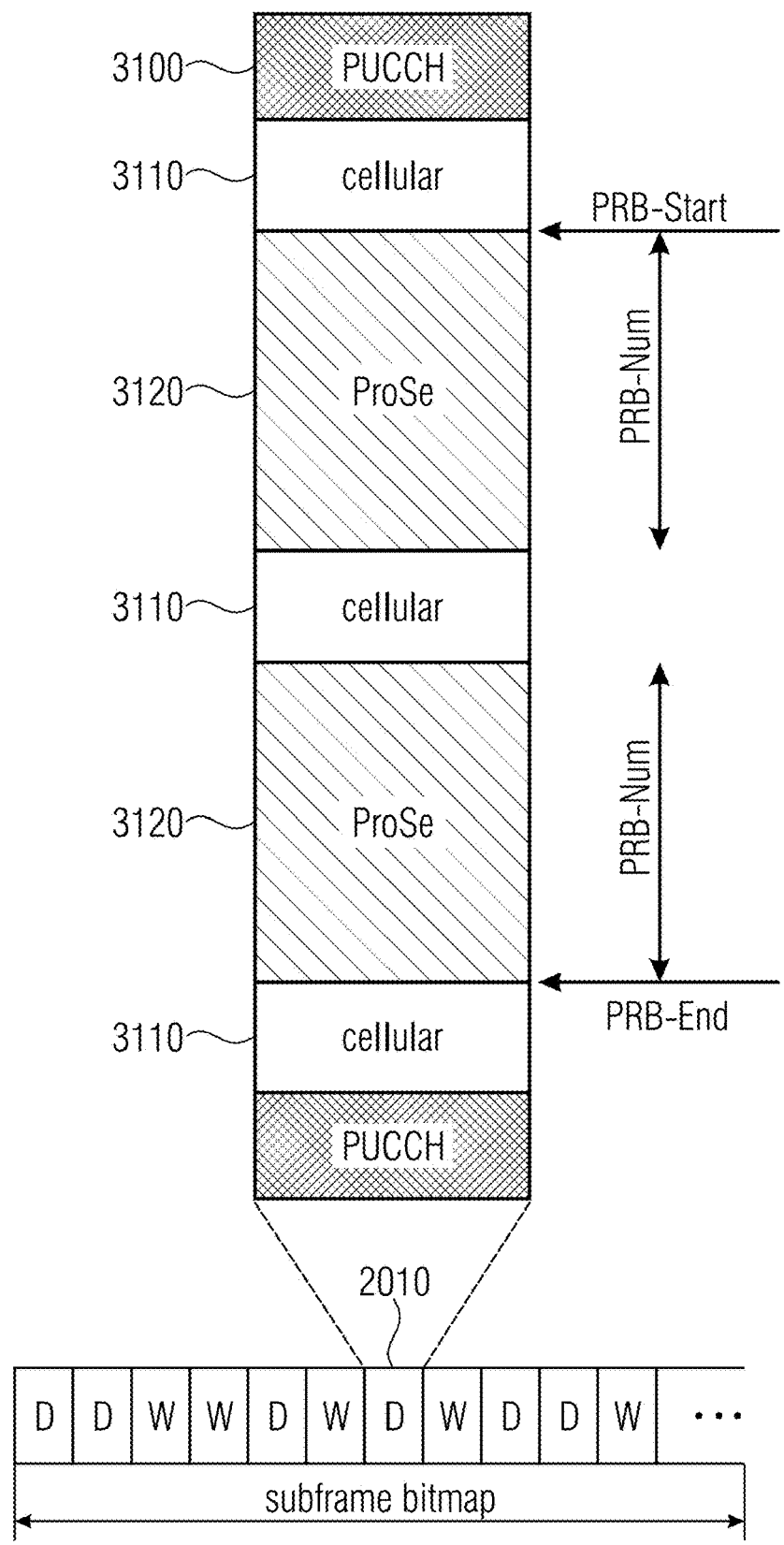
FIG. 31 shows a general structure of a subframe and resource block pool.

In scenario 2 depicted in FIG. 30, the HARQ resource allocation, HARQ bit positions and message size will be included in the existing DCI 5, downlink control signaling, by base station 3010 for each UE before initial data transmission. Each user equipment UE of user equipments 3020 would know its own bit position from which to extract its own HARQ feedback from the broadcast/multicast/groupcast HARQ feedback message of UE1.

In this case, the base station 3010 may pre-allocate resources for the HARQ broadcast/multicast/groupcast message pre-emptively. However, if only a subset of UEs 3020 transmit, e.g., only UE2 and UE5, then the following example occurs:

a. The base station HARQ broadcast allocation message format would be HARQ_Broadcast={UE2, UE3, UE4, UE5}.

b. However, only UE2 and UE5 transmit with both ACK messages, UE1 broadcasts the message HARQ_Broadcast=0xxx0 or 0xx0. In this case, 'x' refers to unused feedback and result in some overhead bits.

c. Alternatively, if UE1 only broadcasts the short broadcast HARQ message HARQ_Broadcast=00 corresponding to UE2 and UE5 that only transmit data, then UE3 would detect feedback having sent no data and UE5 would not even be able to receive its feedback. In this case a retransmission would be triggered by UE5 since no feedback has been received, see FIG. 30.

In this scenario, the data transmission may include HARQ feedback type, for example passed on from the base station. The DCI 5 may include a feedback toggle. This may be passed on to UE1 via piggybacking on the data. This may be used for feedback. In case of a decoding failure, the wrong HARQ feedback on a wrong position might be used, which may also lead to a retransmission.

Further Remarks

It should be noted that the embodiments and aspects disclosed herein can also be used in combination. In other words, any features and functionalities described herein with respect to UE1 may be combined in an extended functionality UE1. Similarly, any features and functionalities described herein with respect to UE2 to UE5 may be combined in a respective extended functionality communication device. Similarly, any features and functionalities described herein with respect to a gNB can be combined in an extended functionality communication device or base station.

Also, any of the features and functionalities described herein with respect to apparatuses can also be included in corresponding methods.

Furthermore, embodiments are defined by the enclosed claims. However, the embodiments described in the claims can be supplemented by any of the features and functionalities described herein (in particular, in sections 'Scrambling Feedback with UE Blind Decoding', 'Unused transmission resource pools for feedback transmission' and 'Bundled Broadcast/Multicast/Groupcast HARQ to Multiple Transmitting UEs/D2D Bundled HARQ/V2X Bundled HARQ', but also in the general sections), either individually or in combination.

In case of unclear abbreviations, reference is made to the abbreviations used in the 5G standardization process, and also in further communication standards (like 3GPP, LTE, and so on).

Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| LIST OF ACRONYMS AND SYMBOLS | |
|---|---|
| eNB | Evolved Node B (3G base station) |
| LTE | Long-Term Evolution |
| UE | User Equipment (User Terminal) like wearables, low-power nodes (e.g. NB-IoT devices) or any type of IoT device |

-continued

| LIST OF ACRONYMS AND SYMBOLS | |
|---|---|
| RSU | Road Side Unit |
| Uu | eNB-UE link |
| PC5 | UE-UE link |
| D2D | Device-to-Device |
| IE | Information Element |
| V2V | Vehicular-to-vehicular communications |
| V2X | Vehicular-to-everything communications |
| SL | Sidelink |
| HARQ | Hybrid-ARQ |
| PSCCH | Physical Sidelink Control Channel |
| PSSCH | Physical Sidelink Shared Channel |
| TB | Transport Block |
| RI | Rank Indicator |
| PMI | Precoder Matrix Indicator |
| CQI | Channel Quality Indicator |
| ARQ | Automatic Repeat Request |
| RSSI | Received Signal Strength Indicator |
| ACK | Acknowledgement Packet |
| NACK | Non-ACK (see above) |
| CRC | Cyclic Redundancy Check |
| MCS | Modulation and Coding Schema |
| LBT | Listen-before-Talk |
| CSMA/CA | Carrier Sense Multiple Access with Collision Avoidance |
| IoT | Internet of Things |

| REFERENCES | |
|---|---|
| [1] | Lenovo-Motorola Mobility, Sidelink feedback information, 3GPP Technical Document-R1-1707773, Hangzhou-P.R. China, May 2017. |
| [2] | Huawei, Sidelink link adaptation with feedback information for FeD2D, 3GPP Technical Document-R1-1707041, Hangzhou-P.R. China, May 2017. |
| [3] | ZTE, Discussion on FeD2D Feedback scheme, 3GPP Technical Document-R1-1707210, Hangzhou-P.R. China, May 2017. |
| [4] | Intel, Sidelink Feedback Information and Signalling for Wearable and IoT Use Cases, 3GPP Technical Document-R1-1707335, Hangzhou-P.R. China, May 2017. |
| [5] | LG Electronics, Discussion on feedback information on sidelink, 3GPP Technical Document-R1-1707586, Hangzhou-P.R. China, May 2017. |
| [6] | Sony, Discussion on sidelink adaptation and feedback information, 3GPP Technical Document-R1-1708265, Hangzhou-P.R. China, May 2017. |
| [7] | J. Schlienz and A. Roessler, Device to Device Communication in LTE, Whitepaper, Rohde-Schwarz, pp. 1-36. |
| [8] | Chairman's Notes, RAN1#88bis. |
| [9] | E. Dahlman, S. Parkvall and J. Skold, "4G LTE-Advanced Pro and the Road to 5G", Elsevier, $3^{rd}$ Edition, 2016. |
| [10] | 3GPP, "Physical Layer Measurements", TS 36.214 v. 14.2.0, April 2017. |

The invention claimed is:

1. A communication device comprising:
a processor circuit and a memory circuit, wherein the memory is arranged to store instructions for the processor circuit,
wherein the processor circuit is arranged to receive at least one information units from a plurality of second communication devices,
wherein the processor circuit is arranged to receive at least one resource allocation message from a third communication device,
wherein the at least one resource allocation message defines an allocation of bit positions associated with an acknowledgement of the at least one information units in a combined acknowledgement information unit,
wherein the processor circuit is arranged to transmit a combined acknowledgement information unit in response to a reception of the at least one information units using the allocation of bit positions defined in the at least one resource allocation message.

2. The communication device according to claim 1, wherein the processor circuit is arranged to broadcast or multicast the combined acknowledgement information unit.

3. The communication device according to claim 2, wherein the processor circuit is arranged to broadcast the combined acknowledgement information unit to the plurality of second communication devices via a side link.

4. The communication device according to claim 3, wherein the sidelink which does not use a base station.

5. The communication device according to claim 1,
wherein the processor circuit is arranged to set bits at bit positions associated with at least one of the plurality of second communication devices from which at least one information units were properly received to a first bit value,
wherein the processor circuit is arranged to set bits at bit positions associated with at least one of the plurality of second communication devices from which at least one information units were not properly received.

6. The communication device according to claim 1, wherein the processor circuit is arranged to transmit a combined acknowledgement information unit for the at least one information units received from fourth communication devices within a predetermined period of time.

7. The communication device according to claim 1,
wherein the at least one resource allocation message defines in which wireless resource unit the combined acknowledgement information unit is transmitted,
wherein the processor circuit is arranged to transmit the combined acknowledgement information unit in the wireless resource unit specified by the at least one resource allocation message.

8. The communication device according to claim 1,
wherein the processor circuit is arranged to evaluate at least one resource allocation message,
wherein the resource allocation message is piggybacked on a data.

9. The communication device according to claim 1,
wherein the processor circuit is arranged to set bits at bit positions associated with at least one of the plurality of second communication devices from which at least one information units were properly received to a first bit value,
wherein the processor circuit is arranged to set bits at bit positions associated with at least one of the plurality of second communication devices from which at least one information units were not received to a second bit value which is different from the first bit value.

10. A communication device comprising:
a processor circuit and a memory circuit, wherein the memory is arranged to store instructions for the processor circuit,
wherein the processor circuit is arranged to transmit at least one information units to fifth communication device,
wherein the processor circuit is arranged to receive at least one resource allocation message from a third communication device, wherein the at least one resource allocation message defines an allocation of bit positions associated with an acknowledgement of the at least one information units in a combined acknowledgement information unit, and wherein the processor circuit is arranged to receive a combined acknowledgement information unit, wherein the processor circuit is arranged to evaluate a bit at a bit position defined by the at least one resource allocation message so as to derive an information whether at least one information units have been received by the fifth communication device.

11. The communication device according to claim 10, wherein the processor circuit is arranged to retransmit an information unit to the fifth communication device when the evaluated bit of the combined acknowledgement information unit indicates that a previous transmission of the information unit has not been received by the fifth communication device.

12. The communication device according to claim 10, wherein the at least one resource allocation message defines in which wireless resource unit the combined acknowledgement information unit is transmitted, wherein the processor circuit is arranged to receive the combined acknowledgement information unit in the wireless resource unit specified by the at least one resource allocation message.

13. The communication device according to claim 12, wherein the processor circuit is arranged to evaluate at least one resource allocation message, wherein the resource allocation message is piggybacked on a data.

14. A communication device comprising:
a processor circuit and a memory circuit, wherein the memory is arranged to store instructions for the processor circuit, wherein the processor circuit is arranged to coordinate at least one resource allocation to a plurality of second communication devices, wherein the processor circuit is arranged to communicate with the plurality of second communication devices, wherein the processor circuit is arranged to provide at least one resource allocation information to the plurality of second communication devices, wherein the at least one resource allocation information defines an allocation of bit positions associated with an acknowledgement of the at least one information units received by a first communication device from a plurality of second communication devices in a combined acknowledgement information unit, wherein the processor circuit is arranged to transmit the combined acknowledgement information unit in response to a reception of the at least one information units from a plurality of the second communication devices.

15. The communication device according to claim 14, wherein the processor circuit is arranged to provide at least one resource allocation information, wherein the resource allocation information defines an allocation of wireless resource units for transmissions from a portion of the plurality of second communication devices to the first communication device via a side link which does not involve the communication device itself.

16. The communication device according to claim 15, wherein side link does not use the communication device.

17. The communication device according to claim 14, wherein the processor circuit is arranged identify a sixth communication device, wherein a plurality of second communication devices send the at least one information units on the basis of an allocation of wireless resource to the sixth communication device, wherein the processor circuit is arranged to reserve a wireless resource unit, wherein the first communication device transmits the combined acknowledgement information unit in response to the identification of the sixth communication device, wherein the sixth communication device is arranged to allocate the bit positions within the combined acknowledgement information unit based on a knowledge, wherein the knowledge comprises identifying which of the plurality of second communication devices have wireless resource units allocated for transmission to the sixth communication device.

18. The communication device according to claim 14, wherein the processor circuit is arranged to include the at least one resource allocation information into an individual device downlink control information.

19. The communication device according to claim 14, wherein the processor circuit is arranged to multicast at least one the resource allocation information to the plurality of second communication devices, wherein the at least one resource allocation information comprises:
an allocation of a seventh wireless resource unit for the combined acknowledgement information unit,
an allocation of bit positions associated with an acknowledgement of the at least one information units received by a first communication device from a plurality of second communication devices in a combined acknowledgement information unit,
a message size information describing a message size of the combined acknowledgement information unit.

20. The communication device according to claim 14, wherein the processor circuit is arranged to dynamically update the at least one the resource allocation information.

21. The communication device according to claim 14, wherein the processor circuit is arranged to monitor a communication between the plurality of second communication devices, wherein the processor circuit is arranged to identify an eighth communication device to which a plurality of second communication devices send the at least one information units within a predetermined period of time on the basis of the monitoring, wherein the processor circuit is arranged to reserve a ninth wireless resource unit, wherein the sixth communication device is arranged to transmit the combined acknowledgement information unit to the ninth wireless resource unit in response to the identification of the eighth communication device, wherein the processor circuit is arranged to allocate the bit positions within the combined acknowledgement information unit bases on a knowledge, wherein the knowledge comprises identifying which of the plurality of second communication devices have transmitted the at least one information units to the sixth communication device within the predetermined period of time.

22. The communication device according to claim 14,
wherein the processor circuit is arranged to provide at least a portion of the at least one resource allocation information,
wherein the resource allocation message is piggybacked on a data.

23. The communication device according to claim 14, wherein the processor circuit is arranged to include the at least one resource allocation information into a group downlink control information.

24. A method for communication comprising:
receiving at least one information units from a plurality of second communication devices,
receiving at least one message from a third communication device,
wherein the at least one resource allocation message defines an allocation of bit positions associated with an acknowledgement of the at least one information units received from the plurality of second communication devices in a combined acknowledgement information unit; and
transmitting a combined acknowledgement information unit in response to a reception of the at least one information units from a plurality of second communication using the allocation of bit positions defined in the at least one resource allocation message.

25. A computer program stored on a non-transitory medium, wherein the computer program when executed on a processor performs the method as claimed in claim 20.

26. A method for communication comprising:
transmitting at least one information units to fifth communication device,
receiving at least one resource allocation message from a third communication device, wherein the at least one resource allocation message defines an allocation of bit positions associated with an acknowledgement of the at least one information units from a plurality of second communication devices in a combined acknowledgement information unit;
receiving a combined acknowledgement information unit; and
evaluating a bit at a bit position defined by the at least one resource allocation message so as to derive an information whether at least one information units transmitted by the communication device have been received by the fifth communication device.

27. A computer program stored on a non-transitory medium, wherein the computer program when executed on a processor performs the method as claimed in claim 21.

28. A method for communication comprising:
coordinating a resource allocation to a plurality of second communication devices; and
providing at least one resource allocation information to the plurality of second communication devices,
wherein the at least one resource allocation information defines an allocation of bit positions associated with an acknowledgement of the at least one information units received by a first communication device from a plurality of second communication devices in a combined acknowledgement information unit,
transmitting the combined acknowledgement information unit using first communication device in response to a reception of the at least one information units from a plurality of the second communication devices.

* * * * *